United States Patent
Raman et al.

(10) Patent No.: US 6,829,473 B2
(45) Date of Patent: Dec. 7, 2004

(54) ROAMING AND HAND-OFF SUPPORT FOR PREPAID BILLING FOR WIRELESS DATA NETWORKS

(75) Inventors: Sundar Raman, Arlington Heights, IL (US); Michael Borella, Naperville, IL (US); Chandra Warrier, Schaumburg, IL (US)

(73) Assignee: Utstarcom, Inc., Alameda, CA (US)

( * ) Notice: Subject to any disclaimer, the term of this patent is extended or adjusted under 35 U.S.C. 154(b) by 71 days.

(21) Appl. No.: 10/322,027

(22) Filed: Dec. 17, 2002

(65) Prior Publication Data

US 2004/0018829 A1 Jan. 29, 2004

Related U.S. Application Data

(60) Provisional application No. 60/398,881, filed on Jul. 25, 2002, provisional application No. 60/398,859, filed on Jul. 25, 2002, and provisional application No. 60/398,877, filed on Jul. 25, 2002.

(51) Int. Cl.[7] .......................... H04M 15/00; H04Q 7/29
(52) U.S. Cl. .................... 455/406; 455/414; 455/432.1; 379/114.2
(58) Field of Search ................................ 455/406, 407, 455/408, 417, 432, 433, 435, 558, 922, 422, 416, 414; 379/114.05, 114.06, 114.2, 121.01, 144.01

(56) References Cited

U.S. PATENT DOCUMENTS

| | | | | |
|---|---|---|---|---|
| 5,839,076 A | * | 11/1998 | Becher | 455/461 |
| 5,867,788 A | * | 2/1999 | Joensuu | 455/445 |
| 5,978,678 A | * | 11/1999 | Houde et al. | 455/433 |
| 6,058,300 A | * | 5/2000 | Hanson | 455/406 |
| 6,070,067 A | * | 5/2000 | Nguyen et al. | 455/407 |

(List continued on next page.)

Primary Examiner—Binh Tieu
(74) Attorney, Agent, or Firm—Fitch, Even, Tabin & Flannery

(57) ABSTRACT

A method and apparatus for providing roaming and hand-off support for prepaid billing for wireless prepaid services on a data network may be provided by a first-network-access device carrying on session activity of a wireless communication session with a wireless-mobile node within a first coverage area. The first-network-access device receives blocks of credits drawn from a user account having a cache of available credits for the prepaid-services.

The first-network-access device periodically measures usage of the session activity in terms of a first of a plurality of measurement-method parameters. The first-network-access device debits the usage of the session activity from the blocks of credits.

After entering its coverage area, the second-network-access device establishes connectivity with the wireless-mobile node. The first-network-access device tunnels to the second-network-access device the session activity and any unused credits. The second-network-access device periodically measures usage of the tunneled session activity in terms of tunneled measurement-method parameters. The second-network-access device debits the usage of the tunneled session activity from the tunneled unused credits.

The second-network-access device then establishes independent network access for the session activity. The second-network-access device receives blocks of credits. The second-network-access device periodically measures the usage of the session activity in terms of another of the plurality of measurement-method parameters. The second-network-access device debits the usage of the session activity from the blocks of credits it receives.

After hand-off, the first-network-access device may receive from indications to terminate session activity, to stop debiting the usage of the session activity, and/or to return unused credits.

64 Claims, 16 Drawing Sheets

U.S. PATENT DOCUMENTS

| | | | |
|---|---|---|---|
| 6,078,805 A | * | 6/2000 | Scott .......................... 455/406 |
| 6,185,198 B1 | * | 2/2001 | LaDue ....................... 370/329 |
| 6,185,414 B1 | * | 2/2001 | Brunner et al. ............. 455/406 |
| 6,208,851 B1 | * | 3/2001 | Hanson ...................... 455/405 |
| 6,226,364 B1 | * | 5/2001 | O'Neil .................... 379/114.2 |
| 6,330,443 B1 | * | 12/2001 | Kirby ...................... 455/432.2 |
| 6,625,438 B2 | * | 9/2003 | Hanson ...................... 455/405 |
| 6,684,072 B1 | * | 1/2004 | Anvekar et al. ......... 455/432.1 |

* cited by examiner

PROTOCOL STACK

ROAMING AND HAND-OFF SUPPORT FOR PREPAID BILLING FOR WIRELESS DATA NETWORKS

This application hereby claims the benefit of the following three previously filed and copending provisional applications:

60/398,881 filed on Jul. 25, 2002
60/398,859 filed on Jul. 25, 2002
60/398,877 filed on Jul. 25, 2002

BACKGROUND

1. Field

The claimed invention relates to communications of computer networks. More specifically, it relates to a method and system for prepaid billing for wireless mobile services in communications networks.

2. Description of Related Art

In legacy prepaid billing scenarios, control of user access to the network is performed by elements of the Signaling System 7 (SS7) network. To enable such services, wired networks have adopted te advanced intelligent network ("AIN") approach. The AIN approach provides for centrally located call control information and call processing logic, including the logic for prepaid billing, and a set of standardized messages between the network elements for accessing and using prepaid services, among other things.

Wireless telecommunications networks have been developed on a similar model. In some legacy wireless networks, the switching of calls and the signaling for call control may be performed by mobile switching centers (MSCs). Each MSC typically controls one or more base stations or base transceiver stations (BTSs), sometimes via one or more base station controllers (MSCs). Each BTS provides a wireless coverage area within which wireless mobile nodes, such as mobile phones, personal digital/data assistants, and other mobile devices, can communicate with the BTS over an air interface. Alternatively, the functions of the MSC may be integrated into or integral to the BSC, thereby eliminating the MSC. In such case, the functions performed by the MSC may be performed by one or more BSCs.

Each wireless mobile node typically has a "home" wireless network in which a home location register (HLR) serves as a centralized repository of information about the wireless mobile node. Typically, the HLR contains a user profile for the wireless mobile node, the last reported location of the mobile station, and the current status of the mobile station, such as whether it is active or inactive. The user profile may also contain indications or attributes of the enhanced services to which the wireless mobile node subscribes. Further, the user profile may be cataloged by the Mobile Identification Number (MIN), the dialed number, the Mobile Directory Number (MDN), the wireless mobile node's unique 32-bit Electronic Serial Number (ESN), or any other wireless mobile node identifier.

When an MSC (or alternatively a BSC) needs to find information about a wireless mobile node, such as where it is located or what services it subscribes to, it queries the HLR corresponding to that wireless mobile node. Thus, to inquire about a wireless mobile node prepaid services, the MSC or BSC queries the HLR.

In a manner analogous to the AIN approach used in wireline networks, an MSC or a BSC may also query a Wireless Intelligent Network ("WIN") device for call processing instructions, in the course of either originating a call from or terminating a call to the wireless mobile node. Such queries can arise from trigger points set by the wireless mobile node's service profile that the MSC or BSC downloaded from the wireless mobile node's HLR. Moreover, the MSC or BSC use such queries to obtain the call processing instructions needed to provide enhanced telecommunications services to the wireless mobile node. In response to such queries, the WIN network devices will typically execute the appropriate service logic and consult the wireless mobile node's service profile to formulate the call processing instructions that the WIN network devices then send to the MSC.

This is acceptable for voice services since-the Home Location Register (HLR) controls authorization of voice services. Units of use in the voice networks are typically time-based. And since voice activity inherently involves the SS7 network, the draw down of the usage units is reported to the HLR on a regular basis, which can provide for reasonable accounting of the usage.

Today, second generation ("2G") networks provide communication services to mobile nodes. These 2G networks have their foundation in older circuit-switched or packet-switched technologies that make the transmission of video and data quite slow, and thus, limit the type of multimedia, video and data services that can be used. In addition to the 2G networks, newer second-and-a-half generation ("2.5G") network services are currently providing communication services to mobile nodes. These 2.5G networks use newer packet-switched services, which allow for increased transmission speeds for video and data as compared to 2G networks. Like the 2G networks, current 2.5G networks have similar limitations on the types of multimedia, video, and data services that can be used.

Mobile nodes may take advantage of third generation ("3G") network services, which allow for significantly faster data rates that in turn allow for a broader range of multimedia, video and data services to be used on a roaming mobile node. The 3G networks provide packet switched services with the capability of providing Internet Protocol traffic, such as Mobile Internet Protocol ("Mobile IP") traffic; symmetrical and asymmetrical data rates; multimedia services such as video conferencing and streaming video; international roaming among different 3G operating environments; and more. Typical 3G systems include packet-based transmission of digitized voice, data and video. 3G networks encompass a range of wireless technologies such as Code Division Multiple Access ("CDMA"), Universal Mobile Telecommunications Service ("UMTS"), Wide-band CDMA ("WCDMA"), and others.

In 3G networks, communications originating and terminating from mobile nodes may use Mobile IP to establish a voice, video and/or data call from a mobile node that has roamed from its home network to a foreign network. Mobile IP allows mobile nodes to transparently move between different Internet Protocol sub-networks ("subnets"). For a mobile node to use the services of the network, it has to connect to its home subnet. The home subnet provides access to an external network, such as the Internet, through a "home agent" that serves as the subnet's gateway router.

To register on the 3G network, the mobile node may periodically transmit "agent solicitation" messages to the home agent. The mobile node also listens for "agent advertisement" messages from the PDSN. When a mobile node receives an agent advertisement message it registers with the PDSN that sent the agent advertisement message.

To provide services to the mobile node when the mobile node "roams," (i.e., dynamically changes its physical location), the mobile node periodically transmits "agent solicitation" messages to other gateway routers, and also listens for "agent advertisement" messages from the other gateway routers. When a mobile node receives an agent advertisement message indicating that it is now on a foreign subnet, it registers with the foreign gateway router or "foreign agent," and with its home agent. The registration with the foreign agent allows the mobile node to receive data on the foreign subnet. Whereas, the concurrent registration with the home agent provides an indication to the home subnet that the mobile node is not at home. This may allow for forwarding to the foreign subnet the data directed to the mobile node received on its home subnet.

As noted above, 2G and later networks provide packet data services in addition to the current voice services. Further, migration of voice services to a Voice over IP model complicates matters because the packet data network may and most likely will become the carrier for voice traffic, in contrast to the current circuit based mechanism, where voice traffic is controlled by SS7 and/or Wireless Intelligent Network (WIN) elements.

However, there are several problems associated with establishing voice, video or data calls on 3G networks. One problem is that users currently cannot easily buy, use or replenish prepaid services, such as pre-paid calling accounts on mobile nodes some 3G networks. Such problems occur when legacy billing systems do not work on 3G networks, or the provider of the 3G networks access will not undertake providing 3G services to high-risk users. Further, without prepaid billing systems, large delays in receiving payments and/or bills can result in suspension or discontinuation of a user's 3G network services. And after fees are paid, it may be difficult for users of mobile nodes on to re-establish service, when pre-paid billing systems are not implemented.

Moreover, without prepaid billing system in 3G networks, providers may have difficulty in disconnecting active users of mobile nodes when outstanding fees are owed. This difficulty is further complicated when the active users of the mobile nodes are constantly roaming from one foreign network to another because usage on each of the foreign networks may not be reported until a later date. In such case, it is possible for a user to overuse the amount of allotted network services. Conversely, users may be overcharged for actual usage if multiple network elements charger for the same service. While the aforementioned issues are common to both the data and voice services, the growth of data services and the demand for prepaid services in global markets will result in a need to satisfy these deficiencies.

Packet data traffic in the 3G networks are typically served to wireless mobile nodes by a Packet Data Serving Node ("PDSN"). The PDSN provides the same type of call control responsibility in the packet data network that the HLR provides in the circuit voice WINs network. Unlike the HLR, however, for the mobile nodes that it serves, packet data traffic may pass through the PDSN. Being in the packet-data-traffic path allows the PDSN to directly monitor and measure the usage of the wireless prepaid service. The PDSN need not be in the packet-data-traffic path, however, because the PDSN may receive usage information from another PDSN over a PDSN to PDSN link. Further details regarding inter-PDSN transfer are provided by co-pending U.S. application Ser. No. 10/097796, filed on Mar. 14, 2002, and titled "Method and System for Re-Direction and hand-off for Pre-Paid Mobile Services in Third Generation Networks," which is fully incorporated herein by reference.

Current 3G network models presently suffer from having (i) no mechanism for tracking the consumption or usage of prepaid wireless services in near real time (e.g., most systems have monthly bill reconciliation); (ii) no mechanism for varying the measurement unit (in near real time) for the type of data, (e.g., time units for voice services and/or byte units for data services); (iii) no mechanism for scaling the usage measurement unit (in near real time) on foreign or brokered networks to provide "marking-up" or discounting of services when on a brokered network or foreign network; and (iv) inadequate mechanisms for conveniently handing-off an ongoing communication session.

Thus, it is desirable to provide a method and system to support prepaid accounting and billing services that work correctly with mobile nodes on 3G networks.

SUMMARY

According to one embodiment, a method for providing roaming and hand-off support for prepaid billing for wireless prepaid services on a data network for wireless prepaid services may be carried out by a first-network-access device, such as a PDSN, carrying on session activity of a wireless communication session with a wireless mobile node within a first coverage area. A second-network-access device establishes connectivity with the wireless mobile node after the wireless mobile node moves into the second-network-access device's coverage area. In response to moving into the coverage area of the second-network access device, the first-network-access device tunnels the session activity to the second-network-access device.

Before and after tunneling the session activity, the first-network-access device receives from a network-access-control device one or more block of credits, which may be drawn from a user account having a cache of available credits. Each of these blocks of credits may be all of the credits or less than all of the credits in the cache of available credits.

In addition, the first-network-access device may also receive one or more measurement-method parameters with each block of credits. These measurement-method parameters may include an indication for determining the usage units for the wireless communication session.

After receiving a block of credits and the measurement-method parameters, the network-access device periodically measures usage of the session activity for the wireless communication session. The first-network-access device may measure the usage of the session activity while the wireless mobile node is in the first coverage area in terms of a first of the measurement-method parameters. Additionally, the first-network-access device may measure the usage of the session activity tunneled to the second-network-access device in terms of a second of the measurement-method parameters. The first of the measurement-method parameters, however, may be the same as the second of the measurement-method parameters.

While session activity is ongoing, the first-network-access device debits the usage of the session activity from the blocks of credits. While the credits in the received blocks remain above a predetermined threshold, the first-network-access device may continue to debit the session activity from the blocks of credits.

In another embodiment, the first-network-access device carries on or engages in session activity for a wireless communication session with a wireless mobile node within a first coverage area. The first-network-access device receives from the network-access-control device one or more blocks of credits, which may be drawn from a user account having a cache of available credits. Each of these blocks of credits may be all of the credits or less than all of the credits in the cache of available credits.

In addition, the first-network-access device may also receive one or more measurement-method parameters with each block of credits. These measurement-method parameters may include an indication for determining the usage units for the wireless communication session.

After receiving a block of credits and the measurement-method parameters, the first-network-access device periodically measures usage of the session activity for the wireless communication session. The first-network-access device may measure the usage of the session activity while in the first coverage area in terms of a first of the measurement-method parameters.

While session activity is ongoing, the first-network-access device debits the usage of the session activity from the blocks of credits. While the credits in the received blocks remain above a predetermined threshold, the first-network-access device may continue to debit the session activity from the blocks of credits.

Sometime during the wireless communication session, but after the wireless mobile node moves into a second coverage area, a second-network-access device requests network access from the network-access-control device for the session activity of the wireless communication session. After receiving network access, the second-network-access device establishes the session activity for the wireless communication session. While the mobile node operates in the second coverage area, the second-network-access device receives from the network-access-control device one or more blocks of credits.

In addition, the second-network-access device may also receive one or more measurement-method parameters with each block of credits. Like the measurement-method parameters received by the first-network-access device, if any, these parameters the may include an indication for determining the usage units for the wireless communication session.

After receiving a block of credits and measurement-method parameters, the second-network-access device periodically measures usage of the session activity for the wireless communication session. The second-network-access device may measure the usage of the session activity while the wireless mobile node is in the second coverage area in terms of a second of the measurement-method parameters, which may differ from the first of the measurement-method parameters. The first of the measurement-method parameters, however, may be the same as the second of the measurement-method parameters.

The second-network-access device debits the usage of the session activity from the blocks of credits it receives. The second-network-access device may continue to debit the session activity from the blocks of credits while the credits in the received blocks remain above a predetermined threshold.

After the second-network-access device establishes the session activity for the wireless communication session, the first-network-access device may receive from the network-access-control device a first indication that causes the first-network-access device to stop debiting the usage of the session activity from the blocks of credits. This indication may be, for example, a stop accounting message, or a terminate session activity message.

The first-network-access device may also receive from the network-access-control device a second indication that causes the first-network-access device to return any remaining (i.e., unused) credits to the network-access-control device. These unused credits may be returned to the cache of available credits or reallocated to the session activity on the second-network-access device or any other eligible session activity.

Alternatively, after the second-network-access device establishes the session activity for the wireless communication session, the first-network-access device may request from the network-access-control device an additional block of credits. In response, the first-network-access device receives from the network-access-control device another indication that causes the first-network-access device to stop debiting the usage of the session activity from the first block of credits, and/or return any remaining credits to the network-access-control device. As before, these remaining credits may be returned to the cache of available credits or reallocated to the session activity on the second-network-access device or any other eligible session activity.

In another alternative, the first-network-access device may not receive from the network-access-control device a responsive indication to the request for additional block of credits. Without the responsive indication and upon expiry of remaining credits, session activity on the first-network-access device may terminate. In yet another alternative, when the first-network-access device does not receive from the network-access-control device a responsive indication to the request for additional block of credits, it may terminate the session activity, and return any unused credits to the network-access-control device.

In another embodiment, the first-network-access device carries on session activity of a wireless communication session with a wireless mobile node within a first coverage area. The first-network-access device receives from a network-access-control device one or more blocks of credits, which may be drawn from a user account having a cache of available credits. Each of these blocks of credits may be all of the credits or less than all of the credits in the cache of available credits.

In addition, the first-network-access device may also receive one or more measurement-method parameters with each block of credits. These measurement-method parameters may include an indication for determining the usage units for the wireless communication session.

After receiving a block of credits and the measurement-method parameters, the first-network-access device periodically measures usage of the session activity for the wireless communication session. The first-network-access device may measure the usage of the session activity while in the first coverage area in terms of a first of the measurement-method parameters.

While session activity is ongoing, the first-network-access device debits the usage of the session activity from the blocks of credits. The first-network-access device may continue to debit the session activity from the blocks of credits while the credits in the received blocks remain above a predetermined threshold.

Sometime during the wireless communication session, but after the wireless mobile node moves into a second coverage area, a second-network-access device establishes connectivity with the wireless mobile node. In response, the first-network-access device tunnels the session activity and any unused credits to the second-network-access device.

In addition, the second-network-access device may also receive from the first-network-access device one or more measurement-method parameters with each block of credits. Like the measurement-method parameters received by the first-network-access device, if any, these parameters the may include an indication for determining the usage units for the wireless communication session.

After receiving the tunneled credits, tunneled measurement-method parameters, and tunneled session activity, the second-network-access device periodically measures usage of the tunneled session activity for the wireless communication session. The second-network-access device may measure the usage of the tunneled session activity while in the second coverage area in terms of a second of the tunneled measurement-method parameters, which may differ from the first of the measurement-method parameters. The first of the measurement-method parameters, however, may be the same as the second of the tunneled measurement-method parameters. While in the second coverage area, the second-network-access device debits the usage of the tunneled session activity from the tunneled unused credits.

The second-network-access device may request network access from the network-access-control device for the session activity of the wireless communication session during a state transition in the session activity or at any other time. After receiving network access, the second-network-access device establishes independent network access for the session activity. In addition to receiving independent network access for the tunneled session activity, the second-network-access device receives from the network-access-control device one or more blocks of credits. The second-network-access device may also receive one or more measurement-method parameters with each block of credits. These measurement-method parameters received may include an indication for determining the usage units for the wireless communication session.

Thereafter, the second-network-access device periodically measures the usage of the session activity. The second-network-access device may measure the usage of the session activity after establishing independent network access in terms of a third of the measurement-method parameters, which may, but need not, differ from the first and the second of the measurement-method parameters.

The second-network-access device debits the usage of the session activity from the blocks of credits it receives. The second-network-access device may continue to debit the session activity from the blocks of credits while the credits in the received blocks remain above a predetermined threshold.

After the second-network-access device establishes independent network access, the first-network-access device may receive from the network-access-control device a first indication, such as a terminate session activity message, that causes the first-network-access device to stop debiting the usage of the session activity from the first block of credits, and/or that causes the first-network-access device to return any remaining (i.e., unused) credits to the network-access-control device. These unused credits may be returned to the cache of available credits or reallocated to the session activity on the second-network-access device or any other eligible session activity.

In a preferred embodiment, the first network-access device is carrying on session activity for a wireless communication session with a mobile node. The first network-access device has been allocated a block of credits by the network-access-control device. The mobile node roams to a second coverage area and initiates a session with a second network-access device. The second network-access device requests from the network-access-control device network access to support handoff activity of the wireless communications session. The network-access-control device retrieves from the first network-access device at least some of any remaining credits, then grants a new block of credits to the second network-access device. If desired, the first network-access device may also terminate its session in combination with its return of the remaining credits.

These as well as other embodiments will become apparent to those of ordinary skill in the art by reading the following detailed description, with appropriate reference to the accompanying drawings.

BRIEF DESCRIPTION OF THE DRAWINGS

Preferred embodiments of the invention are described below in conjunction with the appended figures, wherein like reference numerals refer to like elements in the various figures, and wherein.

DETAILED DESCRIPTION OF EXEMPLARY EMBODIMENTS

1. Exemplary Architecture for Prepaid Billing

Figure 1:
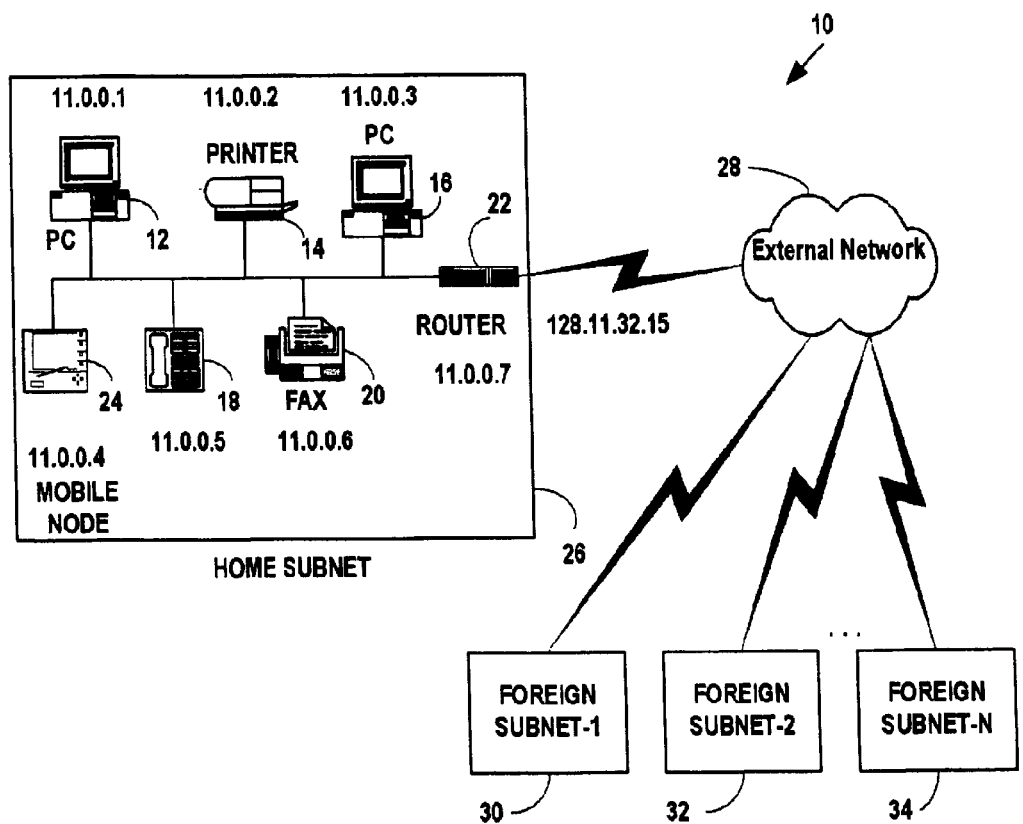
FIG. 1 is a first block diagram illustrating an exemplary network system in accordance with an exemplary embodiment.

FIG. 1 is a block diagram illustrating an exemplary network system 10 in accordance with an exemplary embodiment. The network system 10 includes one or more local network devices 12, 14, 16, 18, 20, 22, 24. More or fewer local network devices can also be used. Each of the local network devices may be assigned network addresses (e.g., 11.0.0.x) on a local subnet 26. The local subnet 26 includes, but is not limited to, a wireless network, a wired network, a wireless or wired LAN, an optical network or a cable network. However, other computer networks can also be used.

The local subnet 26 is connected to an external network 28, such as the Internet or an intranet, via gateway router 22. The gateway router 22 may connect local subnet 26 to other computer networks using different networking protocols or operating at different transmission capacities. The gateway router 22 may also translate the data of a communication session between differing network protocols, and may provide for routing data (in the form of data packets) to an appropriate network node or network device. Local network devices on the local subnet 26 can reach one or more remote network devices on foreign subnets 30, 32, 34, via the external network 28.

Figure 3:
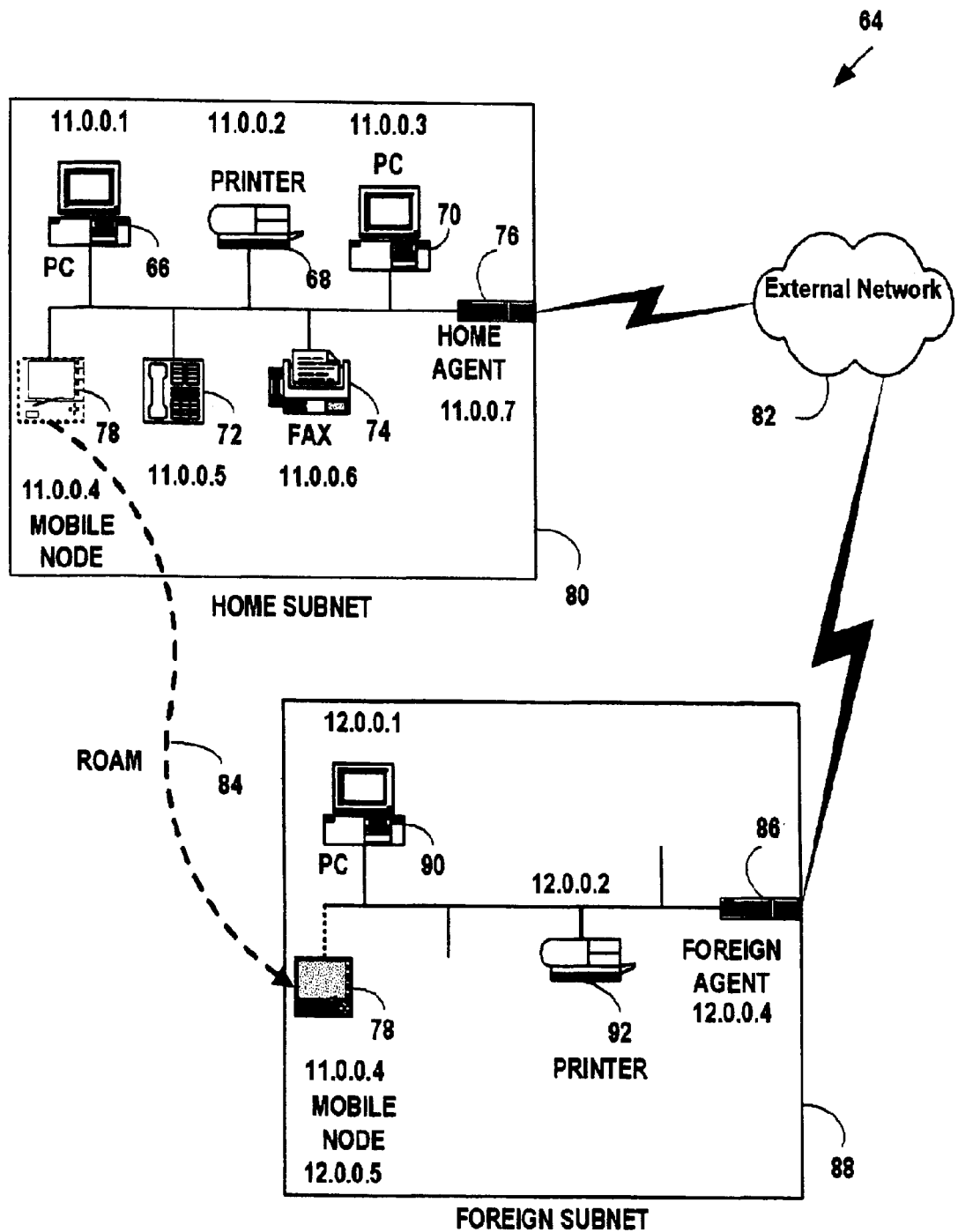
FIG. 3 is a third block diagram illustrating an exemplary Mobile IP system according to an exemplary embodiment.

Exemplary network devices include those that can interact with network system 10 and with the exemplary mobile network system illustrated in FIG. 3. Further, these exemplary network devices can communicate with the system 10 and the system illustrated in FIG. 3 according to all or selected portions of standards proposed by (i) the Data-Over-Cable-Service-Interface-Specification ("DOCSIS") standards from the Multimedia Cable Network Systems ("MCNS"), (ii) the Institute of Electrical and Electronic Engineers ("IEEE"), (iii) International Telecommunications Union-Telecommunication Standardization Sector ("ITU"), Telecommunications Industry Association ("TIA"), (iii) Internet Engineering Task Force ("IETF"), (iv) Wireless Application Protocol ("WAP") Forum, (v) the Third Generation Partnership Project 2 ("3GPP2") and/or (vi) the Third Generation Partnership Project ("3GPP") standards. Network devices based on other standards, however, may also be used.

DOCSIS standards can be found on the World Wide Web at the Universal Resource Locator ("URL") "www.cablemodem.com." IEEE standards can be found at the URL "www.ieee.org." The ITU, (formerly known as the CCITT) standards can be found at the URL "www.itu.ch." TIA standards can be found at the URL "www.tiaonline.org." IETF standards can be found at the URL "www.ietf org." The WAP standards can be found at the URL "www.wap-forum.org." The 3GPP standards may be found at the URL "www.3gpp.org." The 3GPP2 standards may be found at the URL "www.3gpp2.org."

Each network device may contain a processing system with at least one high speed Central Processing Unit ("CPU"), data storage, and memory. Furthermore, an operating system may manage the resources of each network device. The data storage may include computer readable medium devices such as magnetic disks, optical disks, organic memory, and/or any other volatile (e.g., Random Access Memory ("RAM")) or non-volatile (e.g., Read-Only Memory ("ROM")) mass storage systems. The data storage may be concentrated or, conversely, it may be distributed. Data maintained by network devices may be stored in the concentrated data storage as well as in the distributed data storage.

2. Exemplary Protocol Stack

Figure 2:
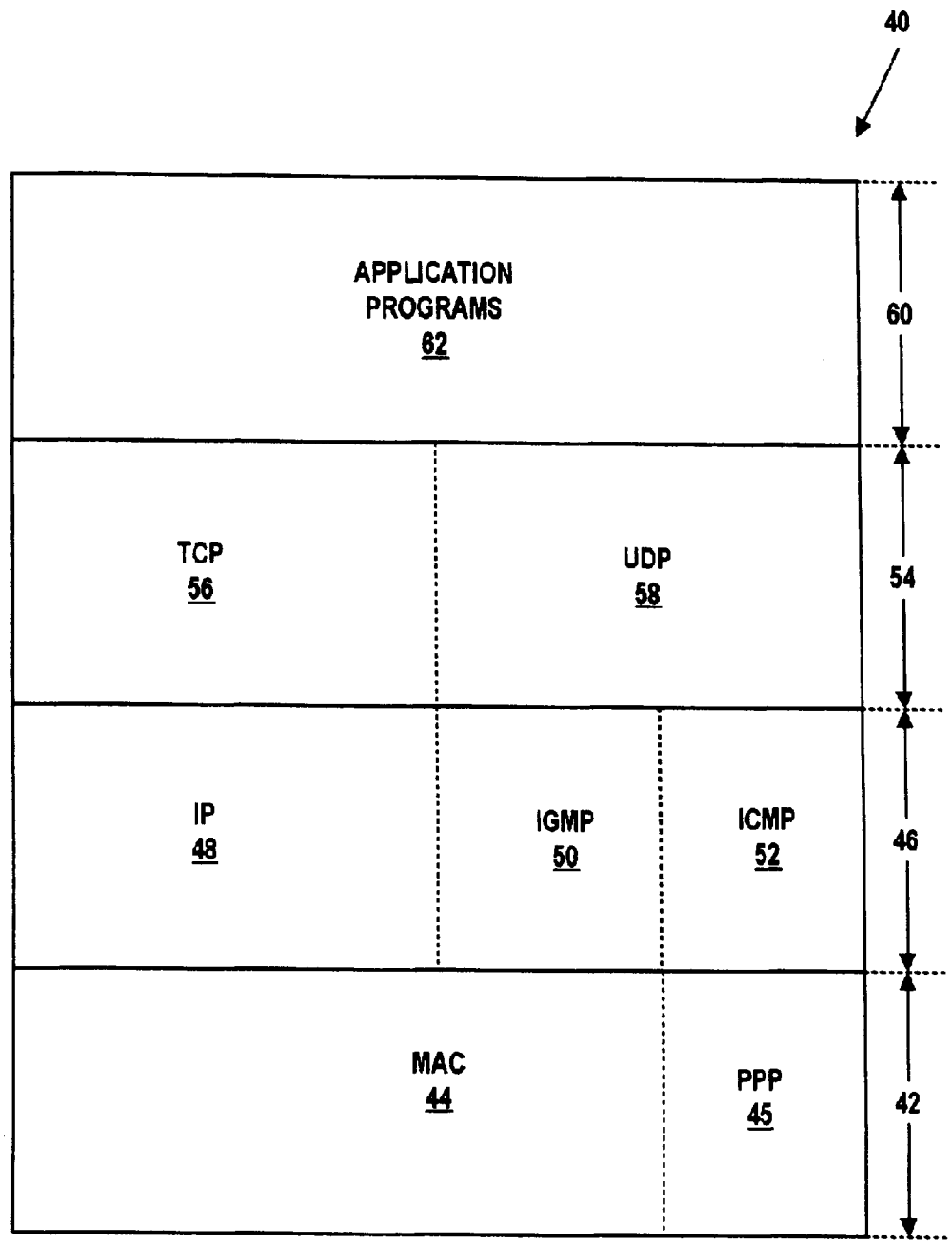
FIG. 2 is second block diagram illustrating an exemplary layered-protocol stack according to an exemplary embodiment.

FIG. 2 is a block diagram illustrating an exemplary layered-protocol stack for communication sessions originating and terminating from mobile and non-mobile network devices used in the exemplary network system 10 (FIG. 1) and in the exemplary mobile network system illustrated in FIG. 3. The layered-protocol stack 40 is described with respect to Internet Protocol (IP) suites comprising from lowest-to-highest, a link, a network, a transport and an application layer. The layered-protocol stack 40, however, may contain more or fewer layers may be used. Layer designations other than those of the IP suite may be used for the layers in the protocol stack 40, as well. For example, layering based on the seven layer Open Systems Interconnection ("OSI") model may be used.

The layered-protocol stack 40 provides a way to connect one network device to another using an underlying physical transmission medium comprising a wireless network, wired network, wireless or wired LAN, an optical network, a cable network, and/or any other computer network. The underlying physical transmission medium, which may be referred to as a physical layer (not illustrated in FIG. 2), defines the electrical and physical properties of an underlying transmission medium.

Link layer 42 provides a connection mechanism for network devices to the underlying physical transmission medium or physical layer. The link layer 42 includes a Medium Access Control ("MAC") protocol layer 44, which controls access to the underlying transmission medium via a physical layer. For more information on the MAC layer protocol, see IEEE 802.3. IEEE 802.3 is fully incorporated herein by reference. Link layer 42, however, is not limited to the MAC layer protocol 44, and other link layer protocols may be used. (e.g., other IEEE 802.x protocols).

The link layer 42 also includes a Point-to-Point Protocol ("PPP") layer 45 (referred to hereinafter as PPP 45). Generally, in operation, PPP 45 encapsulates higher-level protocols in PPP headers for transporting communications. PPP 45 may be used to provide dial-up access over a serial communications link, and to provide synchronous as well as asynchronous communications. Details on PPP 45 may be found at Internet Engineering Task Force ("IETF") Request for Comments ("RFC"), RFC-1661, RFC-1662 and RFC-1663, all of which are fully incorporated herein by reference.

Above the link layer 42 is a network layer 46 (also called the "Internet Layer" for Internet Protocol suites). The network layer 46 includes an internet protocol ("IP") layer 48, which uses an IP addressing protocol designed to route traffic within a network and between networks. IP layer 48 (referred to hereinafter IP 48) is described in IETF RFC-791, and is fully incorporated herein by reference. As will be described below, the IP 48 contains support for Mobile IP.

The network layer 46 also includes an Internet Group Management Protocol ("IGMP") layer 50, an Internet Control Message Protocol ("ICMP") layer 52. IGMP layer 50, hereinafter IGMP 50, is responsible for multicasting. For more information on IGMP 50, see IETF RFC-1112, which is fully incorporated herein by reference. ICMP layer 52, hereinafter ICMP 52, is used for Internet Protocol control. The main functions of ICMP 52 include error reporting, reachability testing (e.g., "pinging"), route-change notification, performance, subnet addressing and other maintenance. Details regarding ICMP 52 may be found in IETF RFC-792, which is fully incorporated herein by reference. ICMP 52 can be used without IGMP 50. Both ICMP 52 and IGMP 50 are not required in protocol stack 40.

The network layer 46 may also include a Generic Routing Encapsulation ("GRE") layer (not illustrated). GRE is a protocol for performing encapsulation of data from one arbitrary network layer protocol in another arbitrary network layer protocol. Details regarding GRE may be found in IETF RFC-1701–1702, which is fully incorporated herein by reference.

Above network layer 46 is a transport layer 54. The transport layer 54 includes a Transmission Control Protocol ("TCP") layer 56 and/or a User Datagram Protocol ("UDP") layer 58. The TCP layer 56, hereinafter TCP 56, provides a connection-oriented, end-to-end, reliable protocol designed to fit into a layered hierarchy of protocols which support multi-network applications. TCP 56 provides for reliable inter-process communication between pairs of processes in network devices attached to distinct, but interconnected networks.

The UDP layer 58, hereinafter UDP 58, provides a connectionless mode of communications using datagrams in an interconnected set of computer networks. UDP 58 provides a transaction oriented datagram protocol, where delivery and duplicate packet protection are not guaranteed. Both TCP 56 and UDP 58 are not required in protocol stack 40. And either TCP 56 or UDP 58 can be used without the other.

Above the transport layer 54 is an application layer 60. The application layer 60 may include one or more application programs 62. These application programs 62 provide to a network device desired functionality, such as telephony or other communications functionality. The application programs 62 may include voice, video, audio, data or other applications. The application layer 60 may also include application-layer-protocol layers. These application-layer-protocol layers typically provide a subset of the functionality provided by an application program.

In one embodiment, the application layer 60 includes a Mobile IP application program 62. For Details regarding Mobile IP see "Mobile IP: The Internet Unplugged," by J. D. Solomon, Prentice-Hall, 1998, ISBN-0-13-856246-6. See also Mobile IP, as defined by IETF RFCs 2002–2006, all of which are incorporated herein by reference.

The application layer 60 may also include a Dynamic Host Configuration Protocol ("DHCP") application program 62, which provides a mechanism/standard for passing configuration information such as IP 48 addresses to network devices on an IP 48 network and other networks. For more information on DHCP see, RFC-1541, and RFC-2131 and RFC-2132, which are fully incorporated herein by reference.

The application layer 60 may also include a Service Location Protocol ("SLP") application program 62, which provides a scalable framework for the discovery and selection of network services. Using SLP, network devices using the Internet need little or no static configuration of network services for network based applications. For more information on SLP see IETF RFC-2608, which is fully incorporated herein by reference.

The application layer 60 may also include a Session Initiation Protocol ("SIP") application program 62, which is an application-layer 60 control protocol for creating, modifying, and terminating sessions with one or more participants. SIP sessions may include Internet multimedia conferences, Internet telephone calls (e.g., Voice over IP, "VoIP"), and multimedia distribution. Members in a SIP session can communicate via multicast or via a mesh of unicast relations, or a combination of these. SIP invitations used to create sessions carry SIP session descriptions, which allow participants to agree on a set of compatible media types.

SIP supports user mobility by proxying and re-directing requests to a mobile node's current location. Consequently, mobile nodes can register their current location. Furthermore, SIP is not tied to any particular conference control protocol. SIP is designed to be independent of a lower-layer transport protocols, and SIP may be extended. For more information on SIP, see IETF RFC-2543, "SIP: Session Initiation Protocol", the contents of which are incorporated by reference.

The application layer 60 may also include ITU-T H.323 or H.324 application programs 62. H.323 is the main family of video conferencing recommendations for IP networks. The ITU-T H.323 standard is fully incorporated herein by reference. H.324 is a video conferencing recommendation for using plain-old-telephone-service ("POTS") lines. The ITU-T H.324 standard is incorporated by reference.

The application layer 60 may also include a VoIP application program 62, which in turn may include several other application programs 62, such as H.323 and SIP. The VoIP application program 62 converts a voice signal into a stream of packets, such as IP 48 packets, for transmission into a packet network. The VoIP application 62 may also convert the stream of packets back into a voice signal.

VoIP services typically provide connectivity to traditional circuit-switched voice networks. As noted above, VoIP is typically used with the H.323 protocol and other multimedia protocols. H.323 terminals such as multimedia computers, handheld devices, personal digital/data assistants ("PDA") or other devices, such as mobile phones connect to existing wired and wireless networks, such as PSTNs, private wired and wireless networks, and public wireless networks.

H.323 terminals may be LAN-based end terminals for voice transmission. H.323 terminals may support real-time, two-way voice communications. H.323 terminals implement voice transmission functions and may include at least one voice Coder-Decoder ("CODEC") for sending and receiving packetized voice. Examples of such CODECs include (i) Pulse Code Modulation (PCM), (ii) Adaptive Differential Pulse Code Modulation (ADPCM), (iii) Code-Excited Linear Predictive (CELP), (iv) Adaptive Code-Excited Linear Predictive (ACELP), (v) Relaxed Code-Excited Linear Predictive (RCELP), (vi) Selective Mode Vocoder (SMV), (vii) Linear Predictive Coding (LPC), (viii) Sinusoidal Transform Coder (STC), (ix) Improved Multiband Excitation (IMBE), (x) CDMA Qualcomm Code-Excited Linear Predictive (QCELP), (xi) CDMA4000-SMV, (xii) Adaptive Multirate GSM (AMR-GSM), (xiii) Federal Standard 1017, (xiv) IS-54, (xv) IS-641, and/or other CODEC, such as those found in ITU-T CODECS, G.711, G.723, G.726, G.728, G.729.

The application layer 60 may also include a Domain Name System ("DNS") application program 62, which provides replicated distributed secure hierarchical databases for hierarchically storing resource records under domain names. The application layer 60 may also include an Authentication, Authorization, and Accounting ("AAA") application program 62. AAA application programs 62 provide a classification scheme and exchange format for providing accounting data records (e.g., for call billing, etc.). For more information on AAA applications, see, "Accounting Attributes and Record Formats," IETF RFC-2924, the contents of which are fully incorporated herein by reference.

AAA applications include, but are not limited to, "Remote Authentication Dial In User Service (RADIUS)" described in IETF RFC-2865, or the DIAMETER protocol, which is used for AAA for Mobile-IP, described in IETF draft<draft-calhoun-diameter-impl-guide-04.txt> entitled "DIAMETER Implementation Guidelines," July 2000, and IETF draft<draft-calhoun-diameter-mobileip-11.txt>, entitled "DIAMETER Mobile IP Extensions," September 2000, all of which are incorporated herein by reference. Other protocols or implementations, and other or equivalent AAA protocols can be used as well.

The application layer 60 may also include a Simple Network Management Protocol ("SNMP") application program 62, which is used to support network management functions. For more information on SNMP layer 62 see IETF RFC-1157, which is fully incorporated herein by reference.

In one embodiment, one or more of network devices may be configured as act as an application server by distributing one or more of the application programs 62 among the network devices. In another embodiment, a single network device may be the application server. Examples of such application servers include SIP servers, H.323 servers, AAA servers, DNS servers, VoIP servers, and/or any other type server. In such an embodiment, network devices may include only an application program layer (e.g., SIP) that communicates with an application program (e.g., SIP) running on the stand-alone application server to provide application functionality. Other or equivalent embodiments may be used as well.

3. Mobile IP

Mobile IP allows "mobile" nodes to transparently move between different IP sub-networks. Mobile IP allows a mobile node to dynamically change its network connectivity in a manner that is transparent to protocol layers above the network layer 46 (e.g., TCP 56 or UDP 58). In an exemplary embodiment, support for Mobile IP application programs 62 or Mobile IP application layers is included in the IP 48 layer.

FIG. 3 is a block diagram illustrating an exemplary Mobile IP system 64. The Mobile IP system 64 includes one or more "non-mobile" network devices 66, 68, 70, 72, 74, 76, and a mobile node 78. Hereinafter the mobile node 78 is called "mobile node 78." The Mobile IP System 64, however, may include hundreds or thousands of mobile nodes. More or fewer non-mobile network devices and more mobile nodes may be used as well.

The non-mobile network devices 66, 68, 70, 72, 74, 76, and the mobile node 78 are assigned a network addresses, such as IP 48 addresses on a home subnet 80. The home subnet 80 may include a wireless network, a wired LAN, an optical network, a cable network, and/or other computer network. The home subnet 80 is communicatively coupled to an external network 82, such as the Internet or an intranet, via a home agent ("HA") 76. The HA 76 may provide a "gateway router" function for the home subnet 80.

When mobile node 78 "roams" 84 from its home subnet 80, it periodically transmits Mobile IP "agent solicitation" messages to foreign agents, such as foreign agent ("FA") 86 via external network 82. The FA 86 is foreign with respect to home subnet 80 and resides on a foreign subnet 88 along with one or more foreign non-mobile network devices such as non-mobile network device 90 and 92. The foreign subnet 88 may also include one or more mobile nodes (not illustrated). Like the HA 76, the FA 86 provides a gateway router function for the foreign subnet 88. The foreign non-mobile network devices 90 and 92 are assigned network addresses, such as IP 48 addresses, on the foreign subnet 88.

In addition to transmitting "agent solicitation" messages while roaming, mobile node 78 listens for Mobile IP "agent advertisement" messages from foreign agents, such as such as FA 86. When roaming, mobile node 78 receives an agent advertisement message from FA 86 indicating that it is now on a foreign subnet 88. At some point, the mobile nodes 78 registers with the FA 86 and the HA 76. By registering with the HA 76, the mobile node 78 notifies the HA 76 that it has roamed 84 away from its home subnet 80.

On home subnet 80, mobile node 78 has a network address, such as IP 48 address 11.0.0.4., and the HA 76 has a network address, such as IP 48 address 11.0.0.7. Mobile and non-mobile network devices having network addresses beginning with a network access prefix of 11.0.0 and a prefix length of 24 bits (i.e., 11.0.0.X/24) belong to home subnet 80. Since the HA 76 is advertising a route to the home subnet 80 at 11.0.0.X/24, it will accept data packets from external network 82 for network addresses with the network access prefix 11.0.0X/24. For example, the HA 76 may accept data packets for the mobile node 78, given that the home network address of the mobile node 78 is of 11.0.0.4.

The FA 86, on the other hand, has a network address of 12.0.0.4 on the foreign subnet 88. The FA 86 advertises a route to the foreign subnet 88 with network access prefix length of 12.0.0.Y/24. Thus, FA 86 will accept data packets that have a network address of 12.0.0.Y/24 on the foreign subnet 88. For example, the FA 86 will accept data packets for the non-mobile network devices 90 and 92 having a network address of 12.0.0.1. and 12.0.0.2., respectively.

The mobile node 78 uses its home network address of 11.0.0.4 on the home subnet 80 to register with the FA 86 and the HA 76. After registration of the mobile node 78, the FA 86 will also accept data packets for the mobile node 78 at the specific home network address 11.0.0.4 as well as data packets that have a network prefix of 12.0.0/24. Third Generation Mobile Architecture Third-generation ("3G") architecture, supports data rates ranging from about 114K bits-per-second to about 2M bits-per-second, ("bps") packet switched services. As noted above, 3G networks encompass a range of wireless technologies including Code Division Multiple Access ("CDMA"), Universal Mobile Telecommunications Service ("UMTS") Wide-band CDMA ("WCDMA"), and others.

The ITU-T guidelines for 3G networks are included in the IMT-2000 standard. The ITU-T IMT-2000 standard is incorporated herein by reference. See also, the TIA TSB115, Wireless IP Network Architecture standard, TIA IS-835, Wireless IP Network Standard, and IS2000 and IS2001 standards for CDMA2000, the contents of all of which are incorporated by reference.

3G networks implementing IS2000 and IS2001 allow mobile nodes to roam from network-to-network using Mobile IP. Many of these mobile nodes may be wireless phones, wireless PDAs, or similar devices that need to establish, maintain, and terminate call or communication sessions. Call control protocols, such as SIP or H.323, may be used for session control. These call control protocols may allow a local proxy to be used on foreign networks so that local policy and/or bandwidth management can be applied to local and remote sessions. In the current generation of 3G networks, a local proxy is typically used on all foreign networks. A local proxy may be included in the FA 86 or in a stand-alone local proxy server or application program on the foreign network 88.

Figure 4:
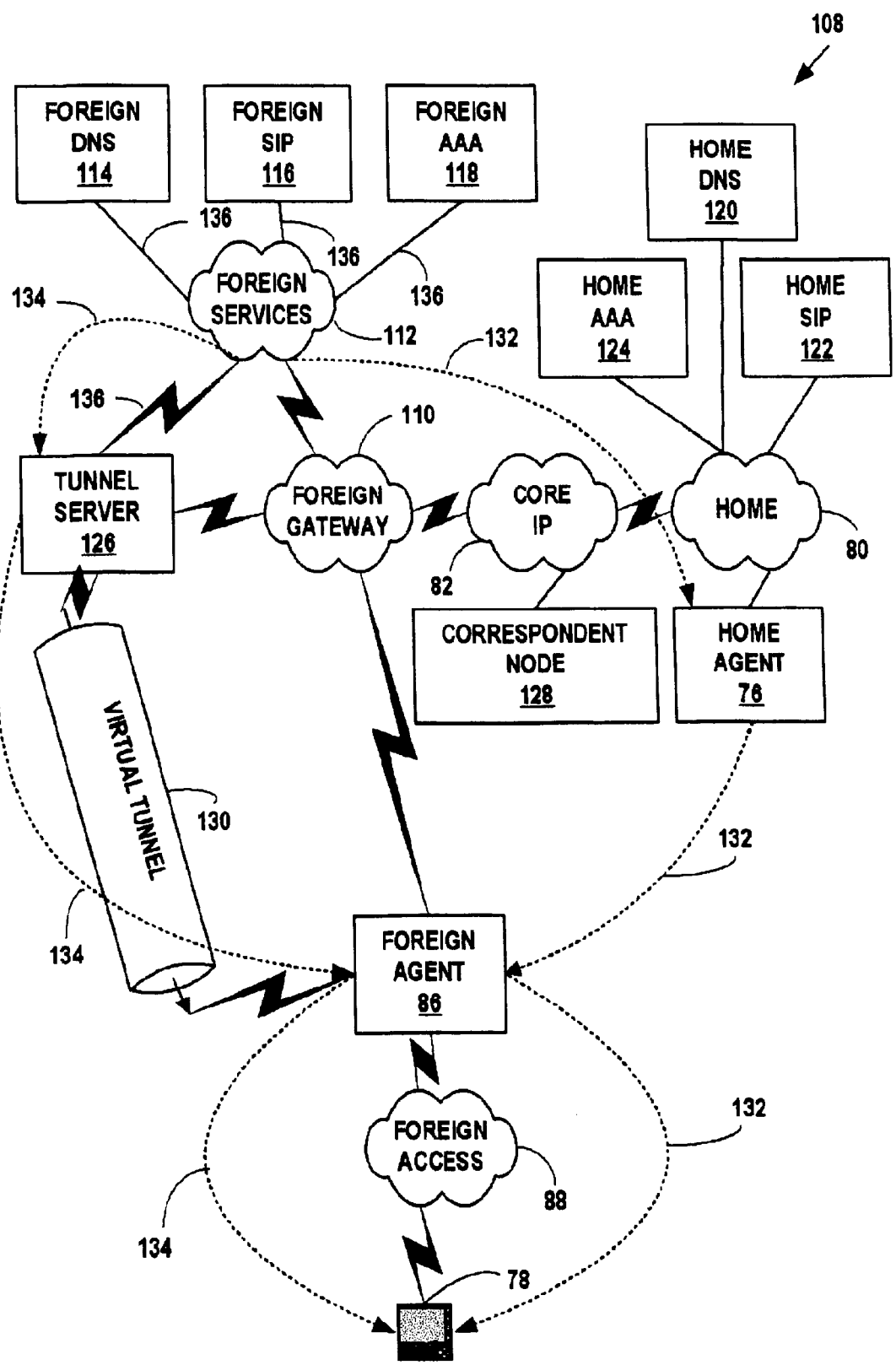
FIG. 4 is a fourth block diagram illustrating an exemplary data network according to an exemplary embodiment.

FIG. 4 is a block diagram illustrating an exemplary 3G system 108. The exemplary 3G system 108 includes a foreign gateway network 110, a foreign services network 112, a foreign DNS application 114, a foreign SIP application 116 and a foreign AAA application 118. The exemplary 3G system 108 also includes a home DNS application 120, a home SIP application 122, a home AAA application 124, a tunnel server ("TS") 126 and a correspondence node ("CN") 128. Other embodiments having more, fewer or other components may also be used in 3G system 108.

The home DNS application 120, home SIP application 122, home AAA application 124, tunnel server 126 and correspondence node 128 are illustrated as separate components. In other embodiments, all or selected ones of these components may be combined into a single or smaller number of components. For example, some of the other components may be integrated into HA 76.

The foreign gateway network 110 and foreign services network 112 are illustrated as separate from foreign network 88. The foreign gateway network 110 may include an IP 48 network or other network, the foreign services network 112 may include (i) an IP 48 network, (ii) a Public Switched Telephone Network ("PSTN"), (iii) a packet data serving node ("PDSN"), and/or (iii) other network or network device. In one embodiment, the FA 86 is associated with a PDSN. Other types of foreign agents may be used. Further, the foreign gateway network 110 and the foreign services network 112 may all be integral to foreign network 88.

In an exemplary embodiment, the foreign gateway network 110 and the foreign services network 112 may be integral to foreign network 88. Alternatively, the foreign network 88, foreign gateway network 110 and foreign services network 112 are separate networks, as shown. For simplicity, the separate foreign networks are collectively referred to as "foreign network 88."

Generally, a PDSN is a required component in most, but not all 3G networks 108. For mobile node 78, a PDSN is the point of entry into the wireless packet data network. The PDSN performs two basic functions: (1) it exchanges packets with mobile node 78 over a wireless network; and (2) it exchanges packets with other IP 48 networks. The PDSN uses associated AAA servers for user authentication and traffic management. Further, the PDSN forwards traffic to a gateway router/home agent (GR/HA) at the designated IP network. Other network access devices or servers may carry out the functionality of a PDSN, as well.

The PDSN may be coupled with a Packet Control Function ("PCF"). The PCF separates multiple IP 48 data transmissions and connects them to a core IP infrastructure 82. A PCF allows mobile VoIP and IP multimedia calls to continue through the core IP network 82.

The exemplary 3G system 108 also includes a virtual tunnel 130, a default communications path 132 a new communications path 134, and a tunnel server communications path 136. The default communications path 132 includes a communications path from the foreign services applications 114, 116, 118 on a foreign network to the HA 76 on the home network 80 to the FA 86 on the foreign network 88, and on to the mobile node 78 on the foreign network 88.

The new communications path 134 includes a communications path from the foreign services applications 114, 116, 118 to the tunnel server 126 on a foreign network to the FA 86, and on to the mobile node 78 on the foreign network 88. The tunnel-server-communications path 136 includes a communications path or a reverse communications between the foreign service applications 114, 116, 118 and the tunnel server 126.

Also illustrated in FIG. 4 is HA 76, mobile node 78, home network 80, external network 82, FA 86 and foreign network 88 as described above (see FIG. 3). The home network 80 and the foreign network 88 may be a wireless network, a LAN, an optical network, a cable network, and/or other equivalent high-speed computer network.

FIG. 4 illustrates only one FA 86. In most implementations, however, plural FAs are used since large numbers of mobile nodes are supported. Further, the exemplary 3G systems may contain more, fewer or equivalent components.

In one embodiment, the exemplary 3G system 108 includes an all IP 48 network comprising of an IP 48 radio access network ("IP-RAN"), a PDSN, a PCF and an IP Mobility Core Network 82. Other embodiments with more or fewer components may also be used. These exemplary networks may support 2G, 2.5G and 3G wireless interface technologies including Code Division Multiple Access 95 and 2000 ("CDMA95" and "CDMA2000"), Global System for Mobile Communications, ("GSM"), Generic Packet Radio Services ("GPRS"), Personal Communications Services ("PCS"), a Cellular Digital Packet Data ("CDPD"), Wireless Application Protocol ("WAP"), Digital Audio Broadcasting ("DAB"), Bluetooth, 802.11a, Wireless LAN, Wifi/802.1b, or other types of wireless network interfaces. These multigenerational wireless interface technologies support telephony, Short Message Services ("SMS"), paging, voice mail, call forwarding, faxing, caller ID, Internet access, and e-mail, to name a few of the services available.

4. Mobile Node Communication in a Data Network

Figure 5:
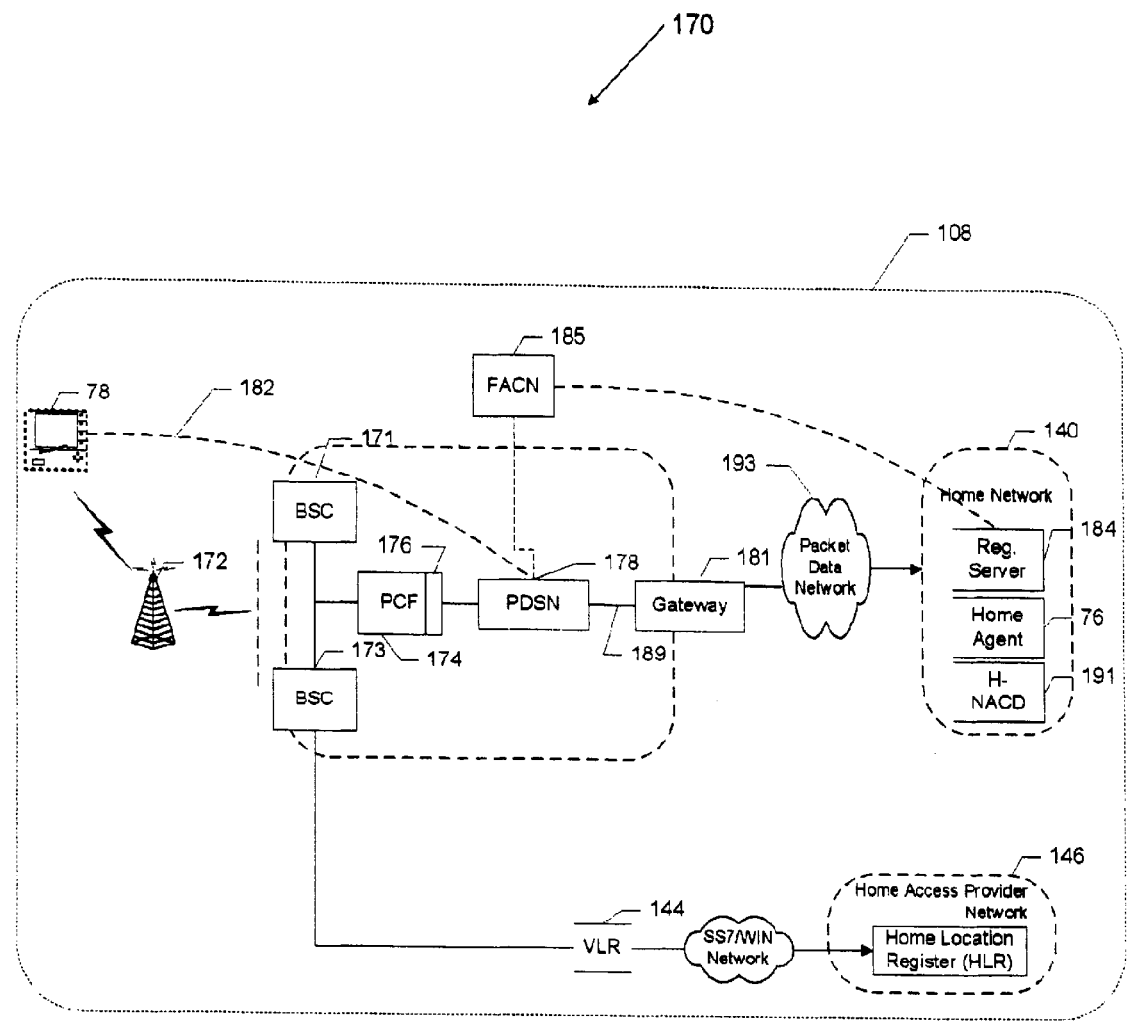
FIG. 5 is a fifth block diagram illustrating an exemplary portion of a data network according to an exemplary embodiment.

FIG. 5 is a block diagram illustrating an exemplary portion 150 of the data network 108, which provides support for communication between wireless mobile node 78 and the data network 108. The portion includes the wireless mobile node 78, a first radio access network ("RANI") 151, a first-network-access device 152, a first gateway 153, a second radio access network ("RAN2") 154, a second-network-acess device 155, a second gateway 156, a home network 157, and a broker network 158.

Although FIG. 5 shows only two RANs, i.e., RANI 151 and RAN2 154, the portion 150 of the data network 108 typically includes a large number of RANs. Moreover, although FIG. 5 shows only two network-access devices, i.e., first-network-access device 152, and second-network-access device 155, more, or less network-network-access devices may be included in portion 150.

The wireless mobile node 78 is communicatively coupled with the RANI 151 via an air interface. Communications transmitted across the air interface conform to an air interface protocol of the wireless communication format. The RANI 151 in turn may be communicatively coupled to the first-access-control device 152. Communications transmitted across the interface connecting the RAN 151 and first-network-access device 152 may be transmitted according a protocol, such as IS-2001 A10/A11 or other wireless communication formats.

RAN 151 may also provide packet data signaling. This packet data signaling may separated from the data using two logical channels, such as an A10 channel for data and A11 channel for signaling. The A11 signaling may be based on Mobile IP messages or other signaling system messages. Data from the wireless mobile node 78 may be encapsulated in GRE packets and tunneled to the first-network-access device over the A10 channel, where it is un-encapsulated and processed further.

The first-network-access device 152 is in communication with the first gateway 153 via a first Pi interface 159. Similarly, second-network-access device 155 is in communication with the second gateway 156 via a second Pi interface 160. Communications transmitted over the first Pi interface 159 and the second Pi interface 160 may be transmitted according to IP. Data sent over these Pi interfaces may be transmitted as UDP over Mobile IP; however, other transmission protocols may be used. The first gateway 153 is in communication with the packet data network (PDN) 193. Communications exchanged between the first gateway 153 and PDN 193 may use IP 48 or another transport protocol.

The wireless mobile node 78 may establish a PPP 45 session that terminates at the first-network-access device 152. This data link is used to help provide a "keep-alive" point-to-point-data link for higher-level application services 62.

PDN 193 is in communication with the home network 157. Similar to the Pi interfaces 159 and 160, communications exchanged between the PDN 193 and the home network 157 may use IP, and/or other transmission protocols.

The home network 157 may contain a home-network-access-control device (H-NACD) 162. The H-NACD 162 may comprise one or more network-access servers that communicate according to the RADIUS protocol or the DIAMETER protocol. The H-NACD 162, however, may use other protocols.

The first-network-access device 152 is in communication with the H-NACD 162 via the first gateway 153 and the PDN 193. The H-NACD 162 may maintain wireless mobile node 78 packet-data-provisioning information. This packet-data provisioning information may be stored in a user-profile record (hereinafter referred to as "user profile") in a data store that is accessible to the H-NACD 162. Further, the H-NACD 162 may be used to authenticate and determine the parameters of a wireless mobile node's 78 packet-data session.

Broker network 158 is also in communication with the PDN 193. Communications exchanged between the PDN 193 and broker network 158 may use IP, and/or other transmission protocols.

Broker network 158 may contain a broker-network-access-control device (B-NACD) 157. The B-NACD 157 may comprise one or more network-access servers that communicate according to the RADIUS protocol or the DIAMETER protocol. The B-NACD 157, however, may use other protocols. Similar to the H-NACD 162, the B-NACD 157 may have access to and/or maintain a copy of wireless mobile node 78 packet-data-provisioning information that is extracted from the user profile.

The first-network-access control device 152 is in communication with second-network-access device 155. Communications passed between first-network-access control device 152 and the second-network-access device 153 may be sent and received according to an inter-network-access-device protocol. Communications over this link may be passed according to other transmission protocols as well.

5. Support for Prepaid Billing for Wireless Mobile Nodes on a Data Network

Figure 6:
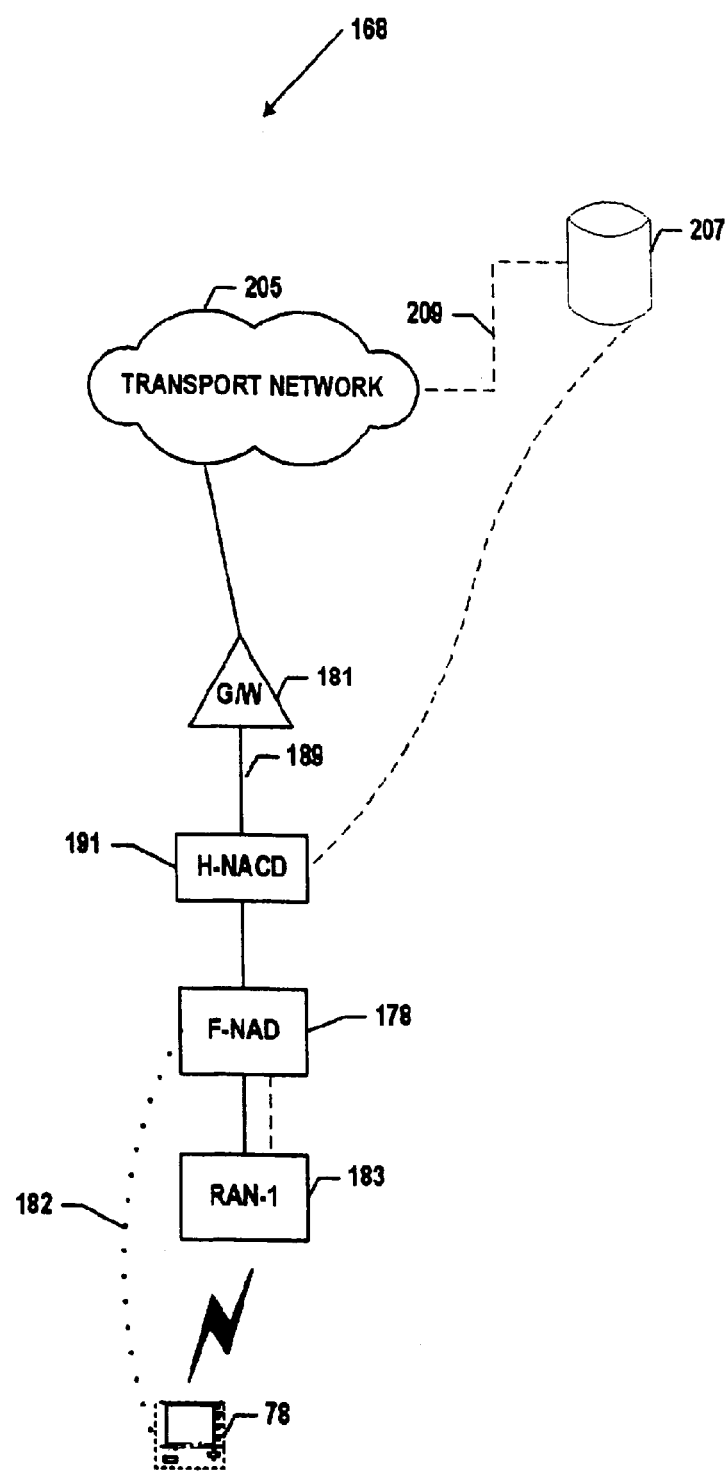
FIG. 6 is a first flow diagram illustrating a method for providing hand-offs for wireless prepaid services on a data network using prepaid billing according to an exemplary embodiment.

FIG. 6 is a flow diagram illustrating a method 200 for providing hand-offs for wireless prepaid services on network portion 150 of data network 108 using prepaid billing in accordance with an exemplary embodiment. In FIG. 6, at step 210, the first-network-access device 151, requests network access from the H-NACD 162, to establish connectivity for a wireless communication session for mobile node 98 within the coverage area of the first-network-access device 151. At step 212, the HNACD 162 receives the request for network access from the first-network-access device 151, and in response, determines if the wireless communication session is eligible for wireless prepaid services.

If eligible, at step 214, the H-NACD 162 sends to the first-network-access device 151 authorization or other approval for serving wireless prepaid services to the mobile NODE 78 device for the wireless communication session. In addition, at step 216, the H-NACD 162 sends to the first-network-access device 151 a first block of credits, withdrawn from a user account having a cache of available credits.

The size of the first block of credits and any other block of credits sent from the network-access-control device may vary. For example, the block of credits may contain fractional credits, whole credits, or some combination of the factional and whole credits. Moreover, the number of credits may vary from block to block. In one instance, the H-NACD 162 may send (as the first block of credits) a block of credits containing a plurality of whole credits. In another instance, the H-NACD 162 may send (as the first block) of credits a block of credits containing only a fraction of a credit.

The H-NACD 162 may vary the size of the blocks of credits based on a supply of available credits contained in a cache of available credits. Alternatively, the H-NACD 162 may vary the size of the blocks of credits based on the type of session activity for the wireless communication session. For example, voice content may use one block size, while non-voice data may use another block size. Other conditions may cause the H-NACD 162 may vary the size of the blocks of credits as well.

At step 218, the first-network-access device 151 receives the authorization or other approval for network access for the wireless communication session. And in addition to receiving the authorization or other approval, at step 220, the first-network-access device 151 receives from the H-NACD 162 the first block of credits After receiving authorization for the wireless communication session, the network-access device 151, at step 222, establishes session activity for the wireless communication session. In an exemplary embodiment, the first-network-access device 151 is in the path of the wireless communication session. Being in the path of the wireless communication session allows the first-network access device 151 to directly monitor the usage of the wireless prepaid service used by the wireless communication session. The first-network-access device 151, however, need not be in the path of the wireless communication session. In such case, the first-network-access device 151 indirectly monitors the usage of the wireless communication session. For example, the first-network-access device 151 may receive the usage of the wireless communication session from another network-access device (e.g., another PDSN).

At 224, the H-NACD 162 may also send to the first-network-access device 151 measurement-method parameters in conjunction with first block of credits. At 226, the first-network-access device 151 receives from the H-NACD 162, the measurement-method parameters.

Measurement-method parameters received in conjunction with a block of credits, such as those received with the first block of credits, may only apply to the first block of credits. This type of measurement-method parameters may be referred to as local-measurement-method parameters because they only apply to the corresponding block of credits. The measurement-method parameters, however, may be "global" measurement-method parameters. As global-measurement-method parameters, the parameters may apply to the block they were received with as well as with other blocks.

In an alternative embodiment, the network-access device may contain its own predetermined-measurement-method parameters. In such case, the network-access control device 151 might not send the measurement-method parameters. However, despite having the predetermined-measurement-method parameters, the H-NACD 162 may still send the measurement-method parameters to the first-network-access device 151. Doing so, leaves open the option of changing the measurement methods for determining usage of a prepaid wireless communication session.

The measurement-method parameters passed to the first-network-access device 151 from the H-NACD 162 may include an indication for determining which of the plurality of predetermined-measurement methods the first-network-access device 151 should select for determining the usage units for the wireless communication session. For instance, the measurement-method parameters may include one or more bits, bytes, pointers, algorithms, instructions, and/or other indicators that the network-access device may use for selecting one or more of the plurality of predetermined-measurement methods. Each of the plurality of predetermined-measurement methods may include methods for measuring the session activity of the wireless communication session in terms of time used, time connected, bytes received, bytes transmitted, packets received, packets transmitted, and/or any other measurement method for wireless communication services.

In another alternative, the measurement-method parameters passed to the first-network-access device 151 from the H-NACD 162 may include an algorithm, conversion factor, and/or other instruction for determining the usage units for the wireless communication session. Similar to the plurality of predetermined-measurement methods contained within first-network-access device 151, these measurement-method parameters may provide the first-network-access device 151 with one or more methods for measuring the session activity of the wireless communication session. The methods for measuring the session activity may be in terms of the time used, the time connected, the number of bytes received, the number of bytes transmitted, the number of packets received, the number of packets transmitted, and/or any other measurement method for wireless communication services.

For example, the first-network-access device 151 may receive from the H-NACD 162 as one of the measurement-method parameters an algorithm that applies different usage units to the session activity of the wireless communication session depending on the type of data being passed. By processing the algorithm, the first-network-access device 151 may use a first type of usage units for a first type of data, a second type of usage unit for a second type of data, and $n^{th}$ type usage unit for an $n^{th}$ type of data (where n is any integer) for the data being passed in the wireless communication session.

At step 228, the mobile node 78 roams or otherwise moves into the coverage area of a second-network-access device 155, which in turn establishes connectivity with the mobile node 78. In response to moving into the coverage area of the second-network access device 155, the first-network-access device 151, at step 230, tunnels the session activity to the second-network-access device 155.

At step 232, the first-network-access device 151 periodically measures the usage of the session activity for the wireless communication session. Periodically measuring usage of the session activity may include the first-network-access device 151 measuring the usage of the session activity while in the first coverage area in terms of a first of the measurement-method parameters. Alternatively, periodically measuring the usage of the session activity may include the first-network-access device 151 measuring the usage of the session activity tunneled to the second-network-access device 155 in terms of a second of the measurement-method parameters.

In one embodiment, the first of the measurement-method parameters and the second of the measurement-method parameters are the same. These measurement-method parameters, however, may vary. For instance, the second-network-access device might not belong to the home network 157 of the mobile node 78. In such case, second-network-access device 155 may be part of the broker network 158. In this broker network 158, the broker network policies may determine which of the measurement-method parameters to use for the session activity. These measurement-method parameters may be multiples of the measurement-method parameters used for the session activity in the first coverage area. For instance, the measurement-method parameters for the session activity on the broker network 158 may be used to measure usage at twice the rate of the session activity in the first coverage area. This scalability allows for continued connectivity of the session activity when the mobile node 78 roams into areas not covered by the mobile node's 78 home network.

At step 234, the first-network-access device 151 debits the usage of the session activity for the wireless communication from the first block of credits. The first-network-access 151 device may debit the usage of the session activity from the first block of credits for the session activity occurring in the first coverage area and for the session activity that the first-network-access device tunnels to the second-network-access device 155.

The foregoing steps illustrate method 200 with an exemplary embodiment. The method 200, however, is not limited to these steps. Other embodiments with other steps can be used to practice method 200, as well.

Figure 7:
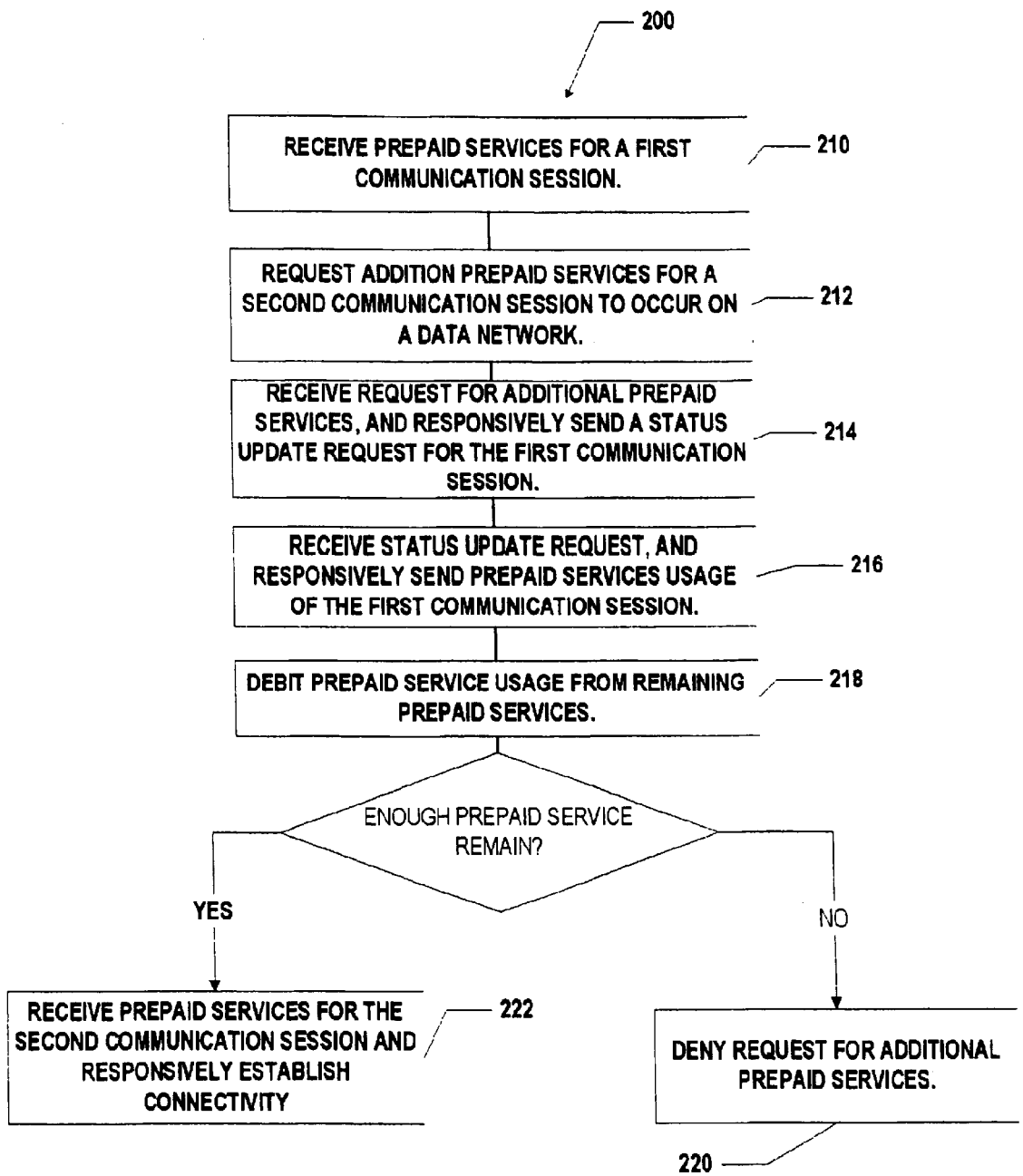
FIG. 7 is a second flow diagram illustrating a method for providing hand-offs for wireless prepaid services on a data network using prepaid billing according to an exemplary embodiment.

FIG. 7 is a flow diagram illustrating the method 200 for providing hand-offs for wireless prepaid services on network portion 150 of data network 108 using prepaid billing in accordance with another exemplary embodiment. In addition to the steps illustrated in FIG. 6, FIG. 7 illustrates other steps for carrying out method 200.

At step 250, the first-network-access device 151 sends to the H-NACD 162 a request for an additional block of credits. The first-network-access device 151 may make the request at a predetermined threshold, for example, when a predetermined number of the credits remain in the block of credits. The first-network-access device 151 may make the request for additional credits proactively. That is, the first-network-access device 151 may make the request at any time before depletion of the block of credits. Alternatively, the first-network-access device 151 may make the request for additional credits when the no credits remain in the block. In another alternative, the first-network-access device 151 may make the request for additional credits based on an algorithm that insures that as long as available credits remain, it will receive additional blocks of credits. Other algorithms are possible, as well.

The H-NACD 162, at step 252, receives from the first-network-access device 151 the request for the second or additional block of credits. At step 254, the H-NACD 162 determines if enough credits remain in the cache of available credits to withdraw the requested additional block of credits. If available credits remain, at step 256, the H-NACD 162 fulfills the request by sending to the first-network-access device the additional block of credits.

At step 258, the first-network-access device 151 receives from the H-NACD 162 the additional block of credits. At step 260, the first-network-access device 151 debits the usage of the session activity for the wireless communication session from the additional block of credits. In an exemplary embodiment, the first-network-access device 151 is in the path of the wireless communication session. Because the network-access device 151 may be in the path of the wireless communication session, it may directly measure the usage of the wireless prepaid service used by the wireless communication session.

At step 262, H-NACD 162 may also send to the first-network-access device 151 one or more measurement-method parameters. These measurement-method parameters may vary from the measurement-method parameters sent to the first-network-access device 151 in conjunction with the first block of credits. In an exemplary embodiment, the measurement-method parameters are local-measurement-method parameters. Alternatively, the measurement-method parameters sent to the first-network-access device may be global-measurement-method parameters.

Step 262 may be omitted if, for example, the H-NACD 162 sent to the first-network-access device 151 the global-measurement-method parameters in conjunction with the sending the first block of credits, and the measurement-method parameters for the additional block of credits are also global-measurement-method parameters. In yet another alternative, step 262 may be omitted if, for example, the first-network-access-device 151 contains a plurality of its predetermined-measurement methods, and the H-NACD 162 has already selected one of a plurality of its predetermined-measurement methods for determining usage units for the wireless communication session. Step 262 may be omitted for various other reasons as well.

At step 264, the first-network-access device 151 may receive from the H-NACD 162 the measurement-method parameters. As noted above, the measurement-method parameters may be either local-measurement-method parameters or global-measurement-method parameters. Depending on the type of measurement-method parameters received, the method by which the network-access device determines the usage units for the session activity may vary.

In the local-measurement-method parameter case, the measurement-method parameters may differ from the measurement-method parameters received by the first-network-access device 151 in conjunction with receiving the first block of credits. The difference between the measurement-method parameters received in step 226 (FIG. 6) and those received in step 264 may include different algorithms, conversion factors, and/or other instructions for determining the usage units for the wireless communication session.

The measurement-method parameters, however, may include one or more identical or similar algorithms, conversion factors, and/or other instructions for determining the usage units for the wireless communication session. These measurement-method parameters may provide methods for measuring the session activity of the wireless communication session in terms of the time used, the time connected, the number of bytes received, the number of bytes transmitted, the number of packets received, the number of packets transmitted, and/or any other measurement method for wireless communication services.

Alternatively, at block 266, in response to receiving one or more measurement-method parameters, the first-network-access device 151 may select one of a plurality of its predetermined-measurement methods for determining usage units for the wireless communication session. Paralleling step 226, the measurement-method parameters passed to the first-network-access device 151 from the H-NACD 162 may include an indication for determining which of the plurality of predetermined-measurement methods that the first-network-access device 151 should select for determining the usage units for the wireless communication session. These indications may include one or more bits, bytes, pointers, algorithms, instructions, and/or other indicators that the first-network-access device 151 may use in selecting a particular (e.g., the first) predetermined-measurement methods.

The global-measurement-method parameter case is similar to the local-measurement-method parameter case except that the measurement-method parameters passed to the first-network-access device 151 from H-NACD 162 in conjunction with the additional block of credits do not differ from those passed in conjunction with the first block of credits. Step 266 might be omitted if the measurement-method parameters are global-measurement-method parameters.

At step 268, the first-network-access device 151 periodically measures usage of the session activity. This may include the measuring the usage of the session activity while in the first coverage area in terms of a first of the measurement-method parameters and measuring the usage of the session activity tunneled to the second-network-access device 155 in terms of a second of the measurement-method parameters. In one embodiment, the first of the measurement-method parameters and the second of the measurement-method parameters may be the same. These measurement-method parameters, however, may vary.

The foregoing steps illustrate method 200 with an exemplary embodiment. The method 200, however, is not limited to these steps. Other embodiments with other steps can be used to practice method 200, as well.

Figure 8A:
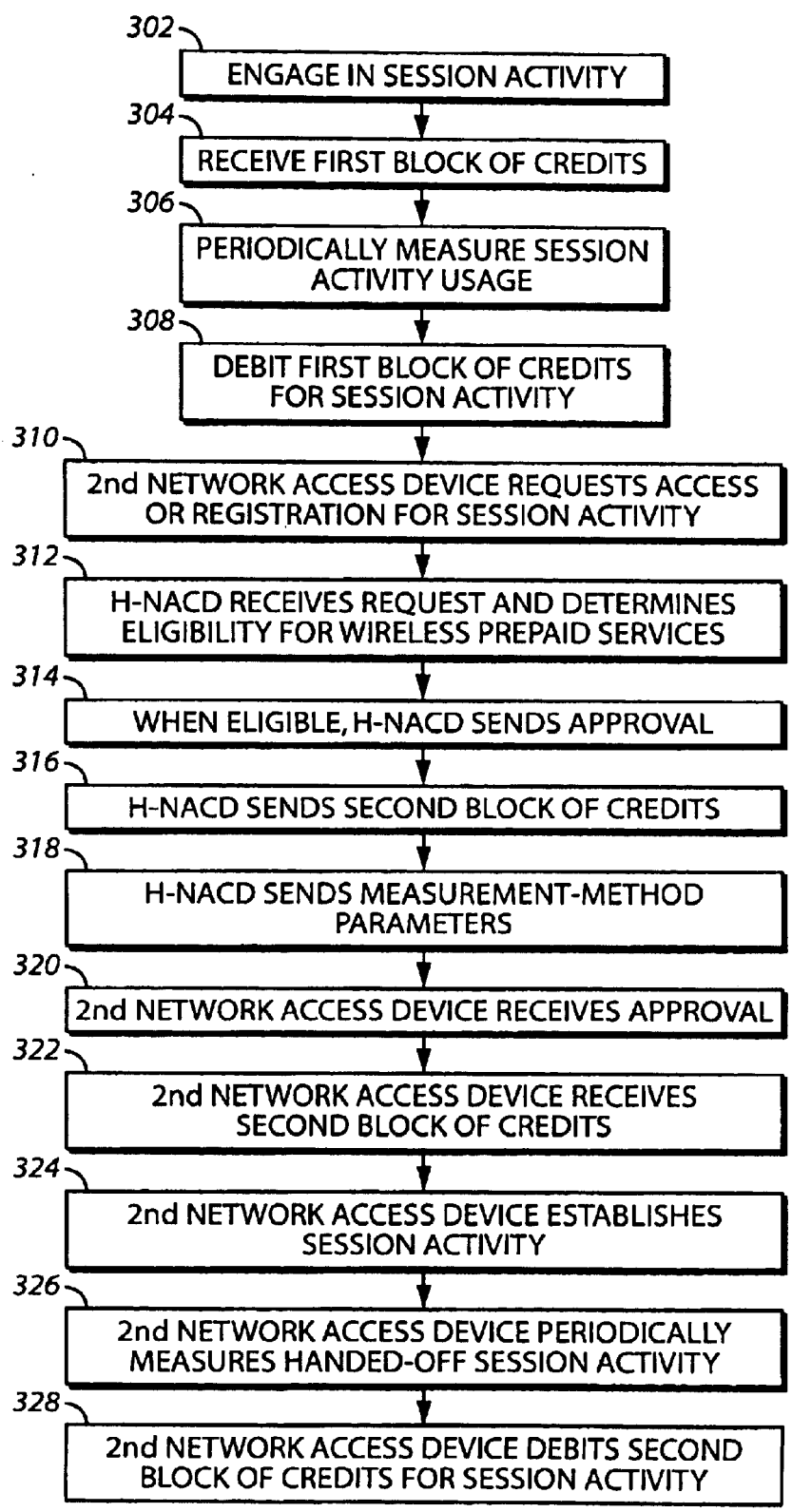
FIG. 8a is a third flow diagram illustrating a method for providing hand-offs for wireless prepaid services on a data network using prepaid billing according to an exemplary embodiment.
Figure 8B:
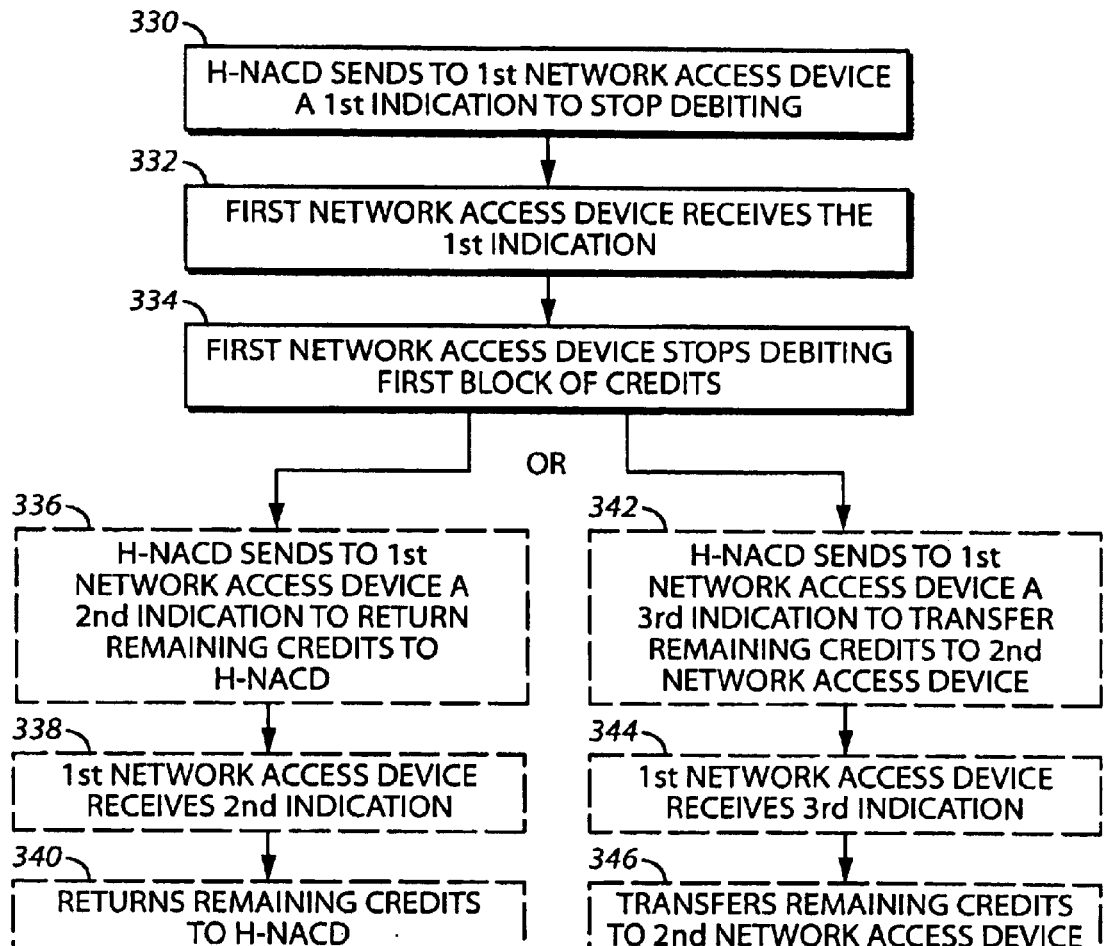
FIG. 8b is a fourth flow diagram illustrating a method for providing hand-offs for wireless prepaid services on a data network using prepaid billing according to an exemplary embodiment.
Figure 8C:
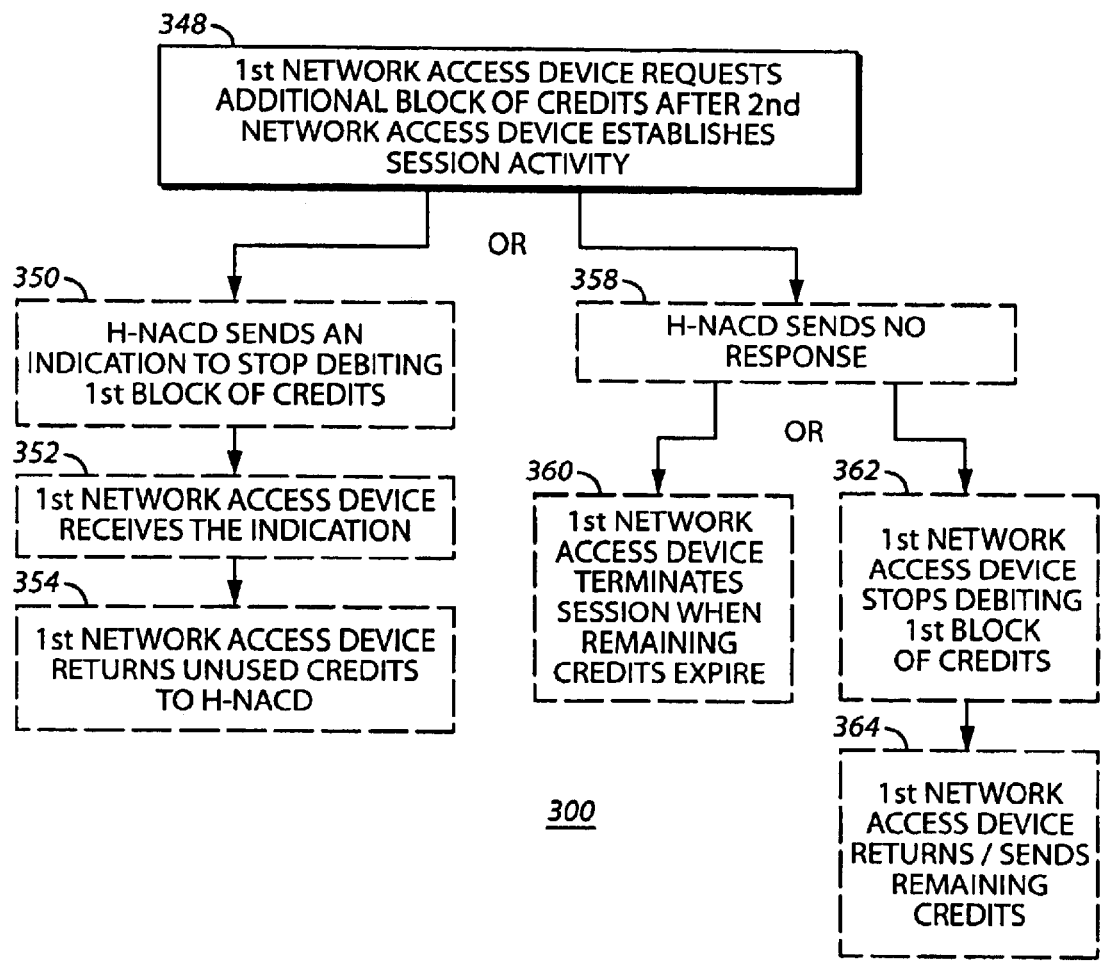
FIG. 8c is a fifth flow diagram illustrating a method for providing hand-offs for wireless prepaid services on a data network using prepaid billing according to an exemplary embodiment.

FIGS. 8a, 8b, and 8c are flow diagrams illustrating a method 300 for providing hand-offs for wireless prepaid services on network portion 150 data network 108 using prepaid billing in accordance with another exemplary embodiment. FIGS. 8a, 8b, and 8c show exemplary method 300, which is similar to exemplary method 200, except as described herein.

In FIG. 8a, at step 302, the first-network-access device 151 engages in session activity for a wireless communication session with the mobile node 78 within the first coverage area. At some point, (e.g., during registration with the H-NACD 162) the first-network-access device 151 receives from the H-NACD 162 a first block of credits, as illustrated in step 304. At step 306, the first-network-access device 151 may thereafter periodically measures usage of the session activity. In turn, at step 308, the first-network-access device 151 debits the usage of the session activity from the first block of credits.

At step 310, the second-network-access device 155, requests from the H-NACD 162 network access or registration for the session activity of the wireless communication session after the mobile node 78 moves into a second coverage area. The request for network access may be made during a state transition of the session activity of the wireless communication session. For example, the request may be made when the session activity goes from active to dormant state, from an active to inactive state, or any other state transition. Alternatively, the request for network access may be made at any time.

At step 312, the H-NACD 162 receives the request for network access from the second-network-access device 155, and in response, determines if the wireless communication session is eligible for wireless prepaid services. The H-NACD 162 may determine whether the session activity is a new communication or whether the request for network access is a hand-off of the ongoing session activity originally carried by the first-network-access device 151.

Alternatively, the second-network-access device 151 may send to the H-NACD 162 information indicative of the session activity. This information may contain indications that inform the H-NACD 162 that the session activity is either session activity for a new communication or the session activity that is handed-off. Details for an exemplary hand-off mechanism for informing the H-NACD 162 are provided by the commonly assigned, and co-pending U.S. application Ser. No. 10/097796, filed on Mar. 14, 2002, and titled "Method and System for Re-Direction and Hand-off for Pre-Paid Mobile Services in Third Generation Networks."

If eligible, at step 314, the H-NACD 162 sends to the second-network-access device 155 authorization or other approval for serving wireless prepaid services to the wireless mobile device for the wireless communication session. In addition, at step 316, the H-NACD 162 sends to the second-network-access device 155 a second block of credits.

At step 318, the H-NACD 162 may also send to the second-network-access device 155 measurement-method parameters in conjunction with second block of credits. These measurement-method parameters may be local-measurement-method parameters or may be global-measurement-method parameters.

At step 320, the second-network-access device 155 receives the authorization or other approval for network access for the handed-off session activity. And in addition to receiving the authorization or other approval, at step 322, the second-network-access device 155 receives from the H-NACD 162 the second block of credits.

In an alternative embodiment, the second-network-access device 155 may contain its own predetermined-measurement-method parameters. In such case, the second-network-access control device 155 might not send the measurement-method parameters. However, despite the second-network-access device 155 having the predetermined-measurement-method parameters, the H-NACD 162 may still send the measurement-method parameters.

The measurement-method parameters passed to the second-network-access device 155 from H-NACD 162 may include an indication for determining which of the plurality of predetermined-measurement methods the second-network-access device 155 should select for determining the usage units for the wireless communication session. In one exemplary embodiment, the measurement-method parameters may include one or more bits, bytes, pointers, algorithms, instructions, and/or other indicators that the second-network-access device may use for selecting one of the plurality predetermined-measurement methods.

Each of the plurality of predetermined-measurement methods may include methods for measuring the session activity of the wireless communication session in terms of time used, time connected, bytes received, bytes transmitted, packets received, packets transmitted, and/or any other measurement method for wireless communication services.

In another alternative, the measurement-method parameters passed to the second-network-access device 155 may include an algorithm, conversion factor, and/or other instruction for determining the usage units for the wireless communication session. Similar to the plurality of predetermined-measurement methods contained within first-network-access device, these measurement-method parameters may provide the second-network-access device 155 with one or more methods for measuring the session activity of the wireless communication session. These methods may be in terms of the time used, the time connected, the number of bytes received, the number of bytes transmitted, the number of packets received, the number of packets transmitted, and/or any other measurement method for wireless communication services.

After receiving the authorization for network access for the handed-off session activity, the second-network-access device 155, at step 324, establishes session activity for the wireless communication session. Thereafter, while the session activity is ongoing on the second-network access device 155, at step 326, the second-network-access device periodically measures the usage of the handed-off session activity. Periodically measuring the usage of the handed-off session activity may include the second-network-access device 155 measuring the usage in terms of one or more of the measurement-method parameters.

The second-network-access device 155 may use different measurement-method parameters than those used or received by the first-network-access device 151 before the session activity is handed-off. The second-network-access device 155, however, may use the same measurement-method parameters. As noted above, the second-network-access device 155 might not belong to the home network 157 of the wireless mobile node. In such case, the second-network-access device 155 can be part of a broker network 158. The broker network policies may determine which of the measurement-method parameters to use for the handed-off session activity. These measurement-method parameters may be multiples of the measurement-method parameters used for the session activity in the first coverage area. At step 328, the second-network-access device 155 debits the usage of the session activity from the second block of credits.

Referring to FIG. 8b, at some time after the second-network-access device 155 establishes the session activity for the wireless communication session, the H-NACD 162, at 330, sends to the first-network-access device 151 a first indication that will causes the first-network-access device 151 to stop debiting the usage of the session activity. At 332, the first-network-access device 155 receives from the H-NACD 162 the first indication. In response, at 334, the first-network-access device 151 stops debiting the usage of the session activity from the first block of credits. This first indication may include a stop accounting message, a terminate session activity message, a disconnect message or another type of message.

In addition to the sending to the first-network-access device 151 the first indication, after the second-networkaccess device 155 establishes the session activity, H-NACD 162, at step 336, sends to the first-network-access device 151 a second indication that causes the first-network-access device 151 to return any remaining credits to the H-NACD 162. The first-network-access device 151, at step 338, receives this second indication, and at step 340, returns any remaining credits to the H-NACD 162. This second indication may include a stop accounting message, a terminate session activity message, a disconnect message or another type of message.

In another alternative, at step 342, after the second-network-access device 155 establishes the session activity for the wireless communication session, the H-NACD 162 sends to the first-network-access device 151 a third indication that causes the first-network-access device 151 to transfer any remaining credits to the second-network-access device 155 or other network-access device. At step 344, the first-network-access device 151 receives from the H-NACD 162 this second indication. At step 346, the first-network-access device 151 transfers any remaining credits to the second-network-access device 155 or other network-access device. The second-network-access device 155 or other network-access device may debit the usage of session activity of the wireless communication session or other eligible wireless communication session from these transferred credits.

Referring to FIG. 8c, in yet another alternative, the first-network-access device 151, at step 348, requests an additional block of credits after the second-network-access device 155 establishes the session activity for the wireless communication session. The first-network-access device 151 may make the request after transferring the remaining credits to the second-network-access device 155. Alternatively, the first-network-access device 151 may make the request at a predetermined threshold.

At step 350, in response to receiving the request for additional block of credits, the H-NACD 162 sends to the first-network-access device 151 an indication that will cause the first-network-access device 151 to stop debiting the usage of the session activity from the first block of credits. The first-network-access device 151, at step 352, receives from the H-NACD 162 this indication. Responsive to receiving the indication, the first-network-access device 151 stops debiting the usage of the session activity from the first block of credits. At step 354, the first-network-access device 151 returns any unused credits to the H-NACD 162.

In another alternative, at step 358, in response to receiving the request for additional block of credits, the H-NACD 162 does not send a response to the request. At step 360, upon not receiving a responsive, the session activity on the first-network-access device 151 terminates when the remaining credits expire. In another alternative, upon not receiving a response to the request for additional credits, the first-network-access device, 151 at step 362 may stop debiting the usage of the session activity from the first block of credits. And at step 364, the first-network-access device 151 (i) may return any remaining credits to the network-access-control device, (ii) may send any remaining credits to the second-network-access device 155, and/or (iii) may send to the another network-access device any remaining credits.

The foregoing steps illustrate method 300 with an exemplary embodiment. The method 300, however, is not limited to these steps. For instance, while carrying on and before handing-off the session activity, the first-network-access device may (i) request and receive additional blocks of credits, (ii) receive additional measurement-method parameters, (iii) measure the session activity, (iv) debit usage of the session activity against the additional blocks of credits, and/or (v) purchase additional credits. Other embodiments with other steps can be used to practice method 300, as well.

Referring back to FIG. 7, at step 250, the second-network-access device 155 may request from the H-NACD 162 an additional block of credits after hand-off the session activity. The second-network-access device may make the request at a predetermined threshold. Further, the second-network-access device 155 may make the request (i) proactively, i.e., at any time before depletion of the block of credits; (ii) when the no credits remain in the block; (iii) based on an algorithm that insures that as long as available credits remain, the second-network-access device will receive additional blocks of credits; and/or (iv) based on other algorithms.

The H-NACD 162, at step 252, receives from the second-network-access device 155 the request for the second or additional block of credits. At step 254, the H-NACD 162 determines if enough credits remain in the cache of available credits to withdraw the requested additional block of credits. If available credits remain, at step 256, the H-NACD 162 fulfills the request by sending to the second-network-access device 155 the additional block of credits.

At step 258, the second-network-access device 155 receives the additional block of credits. At step 260, the second-network-access device 155 debits the usage of the session activity for the wireless communication session from the additional block of credits.

At step 262, the H-NACD 162 may also send to the second-network-access device 155 one or more measurement-method parameters. These measurement-method parameters may vary from the measurement-method parameters sent to the first-network-access device 151 in conjunction with the first block of credits, and those sent to the second-network-access device in conjunction with the second block of credits. The measurement-method parameters may be local-measurement-method parameters or may be global-measurement-method parameters.

At step 264, the second-network-access device 155 may receive from the H-NACD 162 the measurement-method parameters. These measurement-method parameters may include one or more algorithms, conversion factors, and/or other instructions for determining the usage units for the wireless communication session. These measurement-method parameters may provide methods for measuring the session activity of the wireless communication session in terms of the time used, the time connected, the number of bytes received, the number of bytes transmitted, the number of packets received, the number of packets transmitted, and/or any other measurement method for wireless communication services.

Alternatively, at step 266, in response to receiving one or more measurement-method parameters, the second-network-access device 155 may select one of a plurality of its predetermined-measurement methods for determining usage units for the wireless communication session. Paralleling step 226 (FIG. 6), the measurement-method parameters passed to the second-network-access device 155 from the H-NACD 162 may include an indication for determining which of the plurality of predetermined-measurement methods that the second-network-access device 155 should select for determining the usage units for the wireless communication session.

At step 268, the second-network-access device 155 periodically measures usage of the session activity. This may include measuring the usage of the session activity in terms of a third of the measurement-method parameters. The third of the measurement-method parameters may be, but need not be, different from those received in conjunction with the first-block of credits or the second block of credits.

The foregoing steps illustrate method 300 with an exemplary embodiment. The method 300, however, is not limited to these steps. Other embodiments with other steps can be used to practice method 300, as well.

Figure 9:
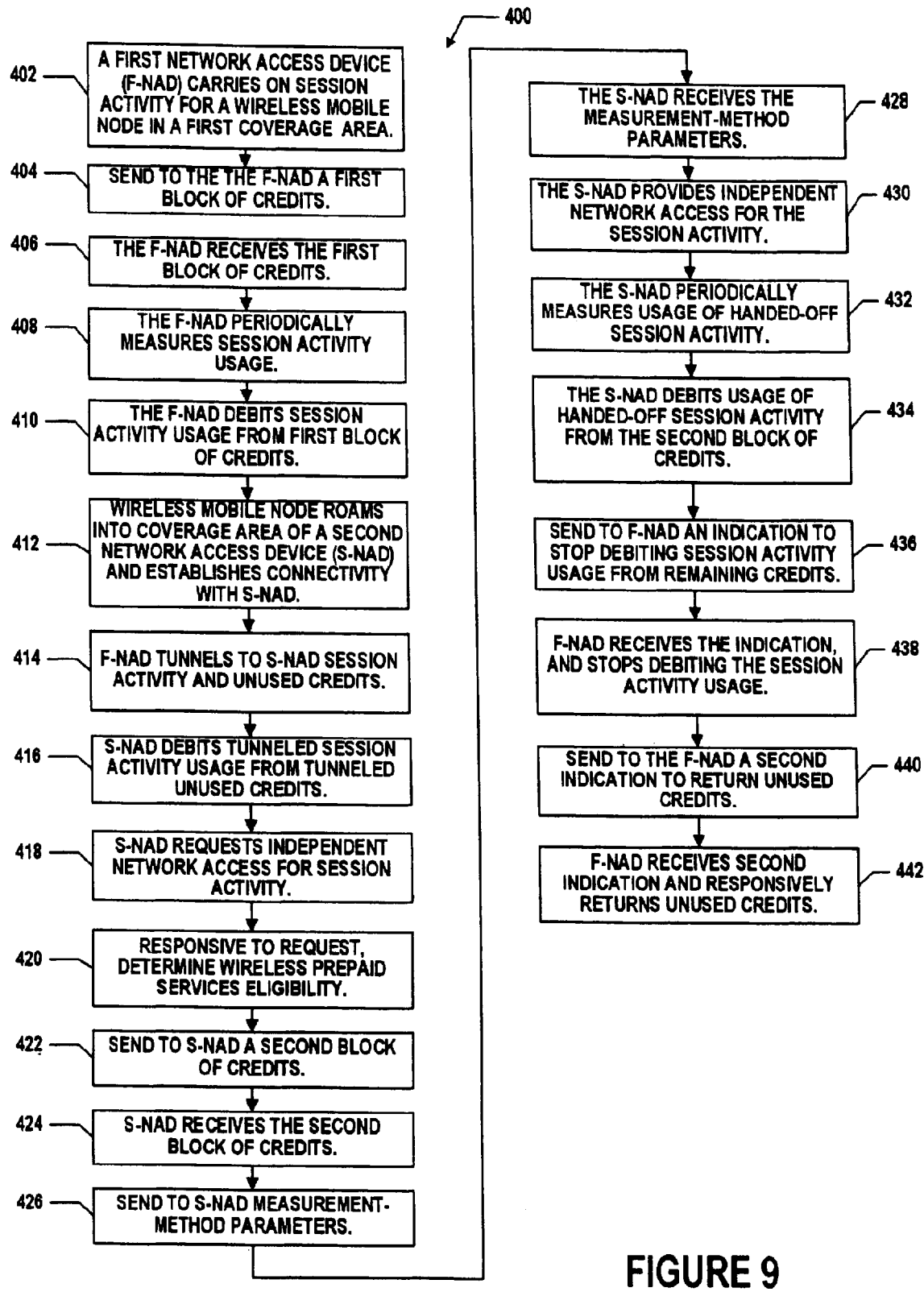
FIG. 9 is a sixth flow diagram illustrating a method for providing hand-offs for wireless prepaid services on a data network using prepaid billing according to an exemplary embodiment.

FIG. 9 is a flow diagram illustrating a method 400 for providing hand-offs for wireless prepaid services on a data network using prepaid billing in accordance with another exemplary embodiment. FIG. 9 shows exemplary method 400, which is similar to exemplary method 300, except as described herein.

Referring to FIG. 9, at step 402, the first-network-access device 151 engages in session activity of a wireless communication session with mobile node 78 within a first coverage area. At step 404, after granting network access for the session activity, a H-NACD 162 sends to the first-network-access device 151 a first block of credits. At step, 406, first-network-access device 151 receives from the H-NACD 162 the first block of credits. The first-network-access device 151 periodically measures usage of the session activity at step 408. The first-network-access device 151 then debits the usage of the session activity from the first block of credits at step 410.

At some point, the mobile node 78 roams or moves into a second coverage area, and at step 412, the second-network-access device 155 establishes connectivity with the mobile node 78. In response to roaming into the coverage area of the second-network access device 155, at step 414, the first-network-access device 155 tunnels the session activity and unused credits to the second-network-access device 155. Then, the second-network-access device 155 debits the usage of the tunneled session activity from the tunneled unused credits at step 416.

Sometime after the mobile node 78 roams in the second coverage area, the second-network-access device 155, at step 418, requests from the H-NACD 162 network access for the session activity. The second-network-access device 155 may make the request for network access after a state transition in the session activity, such as when the session activity goes from active to dormant state, from an active to inactive state, or any other state transition. The request for network access, however, may be made at any time At step 420, the H-NACD 162 receives the request for network access from the second-network-access device 155, and in response, determines if the wireless communication session is eligible for wireless prepaid services. The 162 may determine whether the session activity is a new communication or whether the network access is a hand-off of the ongoing session activity originally carried by the first-network-access device 151.

Alternatively, the second-network-access device 155 may send to the H-NACD 162 information indicative of the session activity in addition to the request for network access. This information may contain indications that inform the H-NACD 162 that the session activity is either session activity for a new communication or the session activity that is handed-off.

After determining that the wireless communication session is eligible for wireless prepaid services, at step 422, the H-NACD 162 sends to the second-network-access-control device 155 a second block of credits. At step 424, the second-network-access device 155 receives the second block of credits.

At step 426, the H-NACD 162 may also send to the second-network-access device 155 one or more measurement-method parameters. These measurement-method parameters may vary from the measurement-method parameters sent to the first-network-access device 151 in conjunction with the first block of credits, and may be local-measurement-method parameters or may be global-measurement-method parameters.

At step 428, the second-network-access device 155 receives the measurement-method parameters. These measurement-method parameters may include one or more algorithms, conversion factors, and/or other instructions for determining the usage units for the wireless communication session. The measurement-method parameters may provide methods for measuring the session activity of the wireless communication session in terms of the time used, the time connected, the number of bytes received, the number of bytes transmitted, the number of packets received, the number of packets transmitted, and/or any other measurement method for wireless communication services.

Alternatively, in response to receiving one or more measurement-method parameters, the second-network-access device 155 may select one of a plurality of its predetermined-measurement methods for determining usage units for the wireless communication session. Paralleling step 226 (FIG. 6), the measurement-method parameters passed to the second-network-access device 155 may include an indication for determining which of the plurality of predetermined-measurement methods that the second-network-access device 155 should select for determining the usage units for the wireless communication session. These indications may include one or more bits, bytes, pointers, algorithms, instructions, and/or other indicators that the network-access device may use in selecting a particular predetermined-measurement methods.

At step 430, the second-network-access device 155 provides independent network access for the session activity. At step 430, the second-network-access device 155 periodically measures usage of the session activity. This may include measuring the usage of the handed-off session activity in terms of a third of the measurement-method parameters. These measurement-method parameters may be, but need not be, different from those received in conjunction with the first-block of credits. At step 434, the second-network-access device 155 debits the usage of the handed-off session activity from the second block of credits.

After the second-network-access device 155 establishes independent network access, the H-NACD 162, at step 436, may send to the first-network-access device 151 an indication that it to stop debiting the usage of the session activity from the first block of credits, if any credits remain. The H-NACD 162 may send the indication in response to determining that the session activity now carried by the second-network-access device 155 results from a hand-off. At step 438, the first-network-access device 151 receives from the H-NACD 162 the first indication, and stops debiting the usage of the session activity from the first block of credits. This indication may be a stop accounting message, a terminate session activity message, a disconnect message or another type of message. In addition to the sending to the first-network-access device 151 the first indication and after the second-network-access device 155 establishes the session activity, the H-NACD 162, at step 440, sends to the first-network-access device 151 a second indication that causes the it to return any remaining credits. The first-network-access device 151, at step 442, receives the second indication, and returns any remaining credits to the H-NACD 162. This second indication may include a stop accounting message, a terminate session activity message, a disconnect message or another type of message.

Referring back to FIG. 8c, at step 348, the first-network-access device 151 requests an additional block of credits after the second-network-access device 155 establishes the session activity for the wireless communication session. The first-network-access device 151 may make the request after transferring the remaining credit to the second-network-access device. Alternatively, the first-network-access device 151 may make the request at a predetermined threshold.

At step 350, in response to receiving the request for additional block of credits, the H-NACD 162 sends to the first-network-access device 151 an indication that will cause it to stop debiting the usage of the session activity from the first block of credits. The first-network-access device 151, at step 352, receives this indication. Responsive to receiving the indication, the first-network-access device 151 stops debiting the usage of the session activity from the first block of credits. At step 354, the first-network-access device to returns any remaining credits to the H-NACD 162.

In another alternative, at step 358, in response to receiving the request for additional block of credits, the H-NACD 162 sends no response to the request. At step 360, upon not receiving a responsive indication to the request, the session activity on the first-network-access device 151 terminates when the remaining credits expire. In another alternative, upon not receiving a response to the request for additional credits, the first-network-access device 151, at step 362, may stop debiting the usage of the session activity from the first block of credits. And at step 364, the first-network-access device (i) may return any remaining credits, (ii) may send any remaining credits to the second-network-access device 155, and/or (iii) may send to another network-access device any remaining credits.

The foregoing steps illustrate method 400 with an exemplary embodiment. The method 400, however, is not limited to these steps. Other embodiments with other steps can be used to practice method 400, as well.

Further, the foregoing description indicates carrying out method 200, method 300 and method 400 for one wireless communications session. The method 200, however, may be carried out for multiple, simultaneous wireless communications sessions. Since each wireless communication session is considered a separate communication session, method 200, method 300, and method 400 may be carried out for each wireless communication session in the identical or similar manner as described above, but method 200, method 300, and method 400 may be carried out in other ways as well. The multiple, simultaneous wireless communication sessions may (i) originate and terminate from the one or more wireless mobile nodes, (ii) connect through the one or more network-access devices, (iii) tunnel from one network-access device to other network-access devices, (iv) be handed-off (e.g., soft, fast or hard hand-off) from one network-access device other access devices, and/or (v) be eligible to receive prepaid wireless services from the same user profile and/or cache of available credits.

Moreover, it is contemplated that during multiple, simultaneous wireless communication sessions, the network-access-control device may initiate a request to terminate one or more wireless communication sessions so that the portions of the block of credits allotted to such wireless communication sessions may be used by another communication session. The network-access-control device may initiate the request to terminate based on prepaid plan policies, such as communication session importance, or may initiate the request to terminate in response to a user request.

6. Mobile Node Communication in A 3G Network

Figure 10:
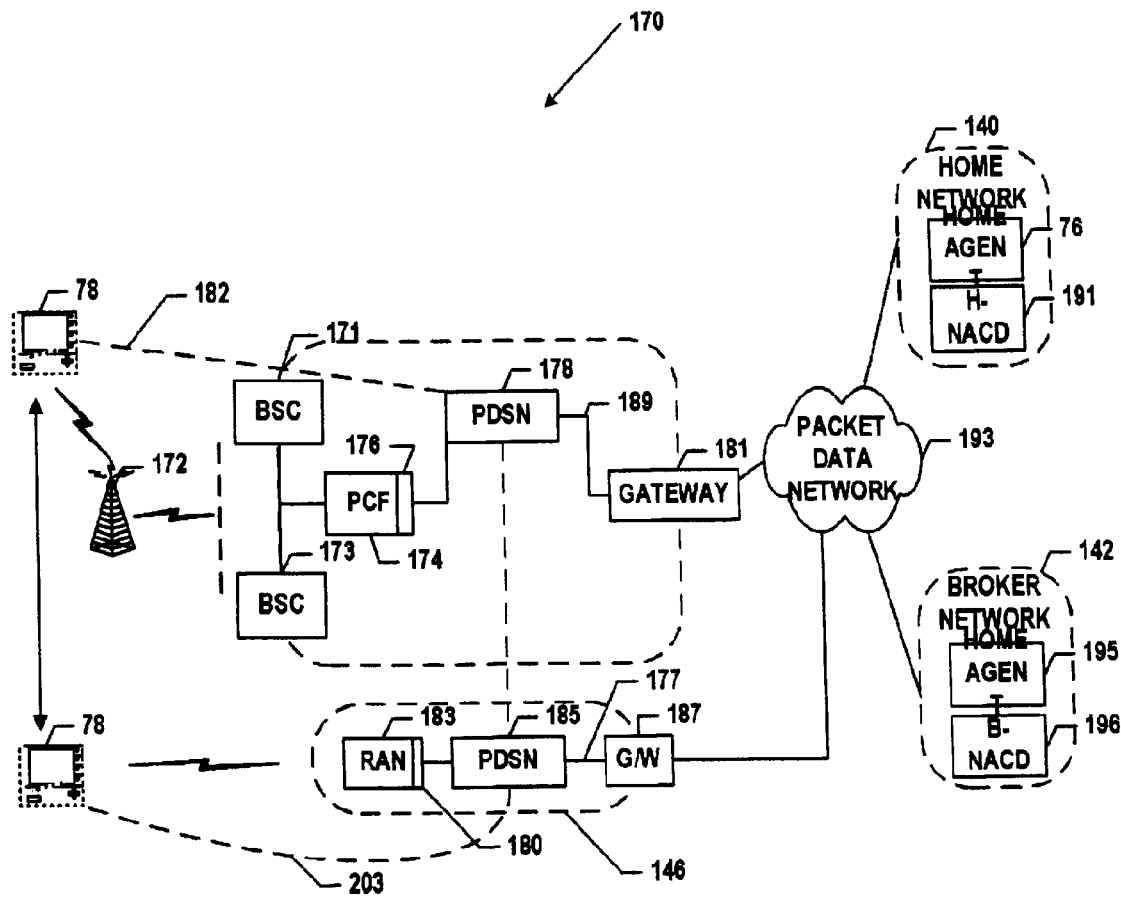
FIG. 10 is a sixth block diagram illustrating an exemplary portion of a 3G network that supports communication between a wireless mobile node and the 3G network according to an exemplary embodiment.

FIG. 10 is a block diagram illustrating an exemplary portion 170 of the 3G network 108, which provides support for communication between wireless mobile node 78 and the 3G network 108. The portion 170 includes a wireless mobile node 78, a base station ("BTS") 172, base station controllers ("BSC") 171 and 173, a PCF 174, a radio packet interface ("RPI") 176, a source PSDN 178, a source gateway 181, a radio access network ("RAN") 183, a foreign PCF/RPI 180, a foreign PDSN 185, a foreign gateway 187, a home network 140, and a broker network 142.

Although FIG. 10 shows only two BSCs, i.e., BSCs 171 and 173, the portion 170 of the 3G system typically includes a large number of BSCs. Further, although FIG. 10 shows only a single BTS, i.e., BTS 172 coupled to BSC 173, each BSC may be connected to a greater or a fewer number of BTSs. Moreover, although FIG. 10 shows only two PDSNs, i.e., PDSN 178 and PDSN 185, more, or less PDSNs may be included in portion 170.

The wireless mobile node 78 is communicatively coupled with the BTS 172 over an air interface. Communications transmitted across the air interface conform to the air interface protocol of for the wireless communication format. For instance, in a CDMA circuit voice session, the protocol may be enhanced variable rate vocoder (EVRC) or IS-127. The BTS 172 in turn may be communicatively coupled to the BSC 173 and/or BSC 171. Communications transmitted across the interface connecting the BTS 172 and BSC 173 or BSC 171 may be transmitted according a protocol such as IS-707 or IS-127. Other protocols are possible as well.

BSCs 171 and 173 are also in communication with PCF 174. Communications transmitted between BSCs 171 and 173 may be transmitted according to a protocol, such as IS-2001A3/A7 or another wireless communication format. The RPI 176, which is used for packet data signaling, provides a link between PCF 174 and PDSN 178.

The RPI 176 defines two logical channels: an A10 channel for data and A11 channel for signaling. A11 signaling is based on Mobile IP messages including Registration Request ("RRQ") and Registration Reply ("RRP"), Registration Update ("RUP") and Registration Acknowledge ("RACK"). Data from the wireless mobile node 78 may be encapsulated in GRE packets and tunneled from the PCF 174 to the PDSN 178 over an A10 channel, where it is un-encapsulated and processed further.

The PDSN 178 is in communication with the source gateway 181 via a Pi interface 189. Communications exchanged over the Pi interface 189 may be use Mobile IP or other protocol. Data sent over the Pi interface 189 may be transmitted as IP; however, other transmission protocols may be used. The source gateway 181 is in communication with the packet data network (PDN) 193. Communications exchanged between the source gateway 181 and PDN 193 may use IP 48, and/or other protocols.

The wireless mobile node 78 may establish a PPP 45 data link 182 that terminates at the PDSN 178 as is explained below. The PPP 45 data link 182 is used to help provide a "keep-alive" point-to-point-data link for higher-level application services 62 such as VoIP, and/or H.323.

PDN 193 is in communication with the home network 140. Similar to the Pi interface 189, communications exchanged between the PDN 193 and the home network 140 may use IP, and/or other transmission protocols. The home network 140 may contain HA 76, and a home-network-access-control device (H-NACD) 191. The H-NACD 191 may comprise one or more network-access servers that communicate according to the RADIUS protocol or the DIAMETER protocol. The H-NACD 191, however, may use other protocols. The H-NACD 191 may have access to and/or maintain wireless mobile node 78 packet-data-provisioning information. This packet-data provisioning information may be stored in a user profile record (hereinafter referred to as "user profile") in a data store that is accessible to the H-NACD 191 Further, the H-NACD 191 may authenticate and determine the parameters of a wireless mobile node's 78 packet-data session.

In one embodiment, the user profile contains account information for pre-paid mobile services based on individual or combinations of the measurement methods provided for the different type of services available. Some examples of measurement methods are listed in Table 1 below. However, more, fewer or other pre-paid mobile services can also be used.

TABLE 1

Time: Subscribers can purchase a specific amount of transmit and/or receive time during which they can use wireless data services. Note that since 3G services can be always on, time spent in active state may be counted towards usage as well as time spent in dormant state may be counted, depending on the plan purchased.
Bytes Received: Subscribers can purchase a package (as determined by the carrier) that entitles them to access wireless data services and receive a specific number of data bytes received.
Bytes Transmitted: Subscribers can purchase a package (as determined by the carrier) that entitles them to access wireless data services and transmit a specific number of data bytes transmitted.
Packets Received: Subscribers can purchase a package (as determined by the carrier) that entitles them to access wireless data services and receive a specific number of data packets received.
Packets Transmitted: Subscribers can purchase a package (as determined by the carrier) that entitles them to access wireless data services and transmit a specific number of data packets transmitted.

Broker network 142 is also in communication with the PDN 193. Communications exchanged between the PDN 193 and broker network 142 may use Mobile IP, UDP over IP and/or other transmission protocols. Broker network 142 may contain a broker-home agent 195 and a broker-network-access-control device (B-NACD) 196. The B-NACD 196 may comprise one or more network-access servers that communicate according to the RADIUS protocol or the DIAMETER protocol. The B-NACD 196, however, may use other protocols. Like the H-NACD 191, the B-NACD 196 may have access to and/or maintain wireless mobile node 78 packet-data-provisioning information. Further, the B-NACD 191 may authenticate and de-terminate the parameters of a wireless mobile node's 78 packet-data session.

When roaming into a coverage area of a foreign or visited network 146, the wireless mobile node 78 communicates over an air interface to RAN 183. Communications transmitted over this air interface may conform to an air interface protocol of for the wireless communication format, such as EVRC. Other protocols are possible as well.

RAN 183 is also in communication with the foreign PCF/RPI 180. Communications transmitted between RAN 183 and PCF/RPI 180 may be transmitted according to a protocol such as G.711 or other wireless communication format. The PFC/RPI 180, which provides packet data signaling and packet data transport, provides a link between RAN 183 and PDSN 185.

The PCF/RPI 180 may use an A10 channel for data and A11 channel for signaling. The A11 signaling is based on Mobile IP messages. Data from the wireless mobile node 78 may be encapsulated in GRE or other protocol packets and tunneled from the PCF/RPI 180 to the PDSN 185 over an A11 channel, where it is un-encapsulated and processed further.

The PDSN 185 is in communication with the foreign gateway 187 via a second Pi interface 177. Communications exchanged over the second Pi interface 177 may use IP, and/or other transmission protocols. The foreign gateway 187 is in communication with the PDN 193. Communications exchanged between the foreign gateway 187 and PDN 193 may be sent according to IP 48, or other transmission protocol.

While in the coverage area of the foreign or visited network 146, the wireless mobile node 78 may establish a PPP 45 data link 203 that terminates at the PDSN 185 as is explained below. This PPP 45 data link 203 is used to help provide a "keep-alive" point-to-point-data link for higher-level application services 62.

PDSN 178 is in communication with PDSN 185. Communications passed between PDSN 178 and PDSN 185 may be sent according to a PDSN-to-PDSN (P-P) protocol, such as TIA/EIA IS-835-B. Communications over this link may be transmitted according to other transmission protocols as well.

Figure 11:
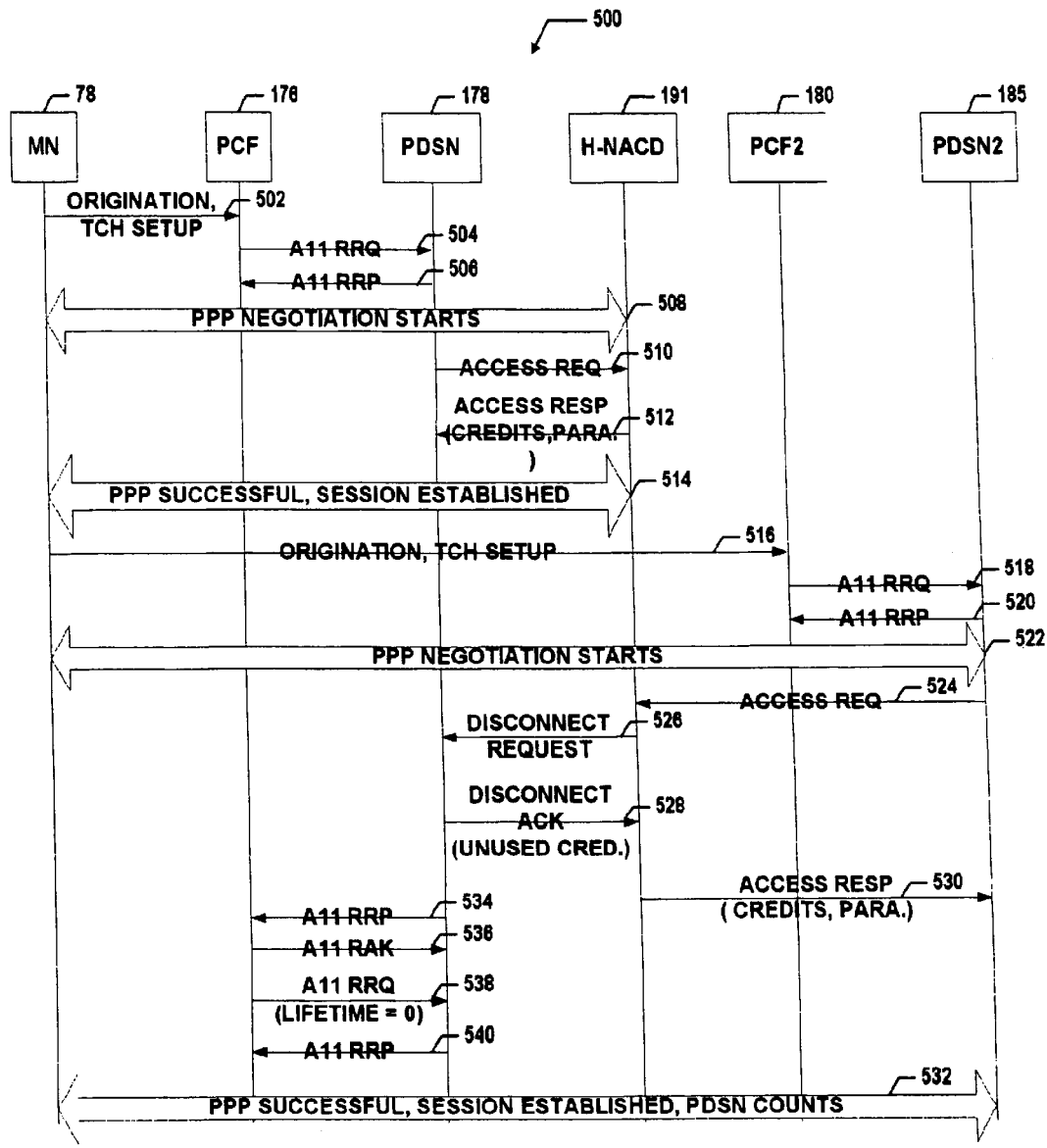
FIG. 11 is a first call flow diagram illustrating an exemplary message flow for handing-off of a wireless prepaid call of a wireless mobile node roaming on a 3G network according to an exemplary embodiment.

7. Support for Prepaid Billing for Wireless Mobile Nodes on a Third Generation Network FIG. 11 is a call flow diagram illustrating an exemplary message flow 500 for hand-off of a wireless prepaid call of mobile node 78 roaming on 3G network 108 in accordance with an exemplary embodiment. Referring to FIG. 11, the PSDN 178 provides network access, establishes a PPP 45 session, and performs prepaid billing for session activity of the wireless communication session.

In an exemplary embodiment, providing network access and establishing a PPP 45 session may be accomplished by the wireless mobile node 78 initiating a communication session by sending a Traffic CHannel ("TCH") setup message 502 to the PCF 174. The PCF 174 sends a A11 registration request 504 to PDSN 178 on an A11 channel to request registration of the wireless mobile node 78 on network 108. The PDSN 178 responds with a Mobile IP registration response message 506 on an A11 channel. The wireless mobile node 78 begins PPP 45 negotiations 508 with the H-NACD 191 to establish a PPP 45 session 182.

The PDSN 178 sends a RADIUS access-request message 510 for the PPP 45 session 182 over an A11 channel to the H-NACD 191. The H-NACD 191 responds with a RADIUS access-response message 512 that includes a first block of credits, and may include one or more measurement-method parameters. The wireless mobile node 78 successfully negotiates PPP 45 with the H-NACD 191 and establishes the PPP 45 session 182 activity at 514.

Also at 514, after session activity is established, PDSN 178 monitors usage of the PPP 45 session 182 activity and periodically measures the usage in terms of the measurement-method parameters, such as those listed in table 1 above. The PDSN 178 then debits the measured usage from first block of credits. When the number of credits in the block of credits reaches a predetermined threshold, for example, when the PDSN 178 runs out of credits, the PDSN 178 sends to the H-NACD 191 a RADIUS access-request message (not shown) for re-authentication of the PPP 45 session 182. The H-NACD 191 responds with a RADIUS access-response message (not shown), and an additional block of credits, if enough credits are available. The H-NACD 191 may also send one or more measurement-method parameters.

More information regarding an exemplary block-credit approach for wireless prepaid billing is provided by another U.S. Patent Application filed concurrently with this document, naming the same inventors, and entitled "Prepaid Billing System For Wireless Data Networks," which is fully incorporated herein by reference.

At some point the wireless mobile node 178 roams into the coverage area of the PDSN 185. The wireless mobile node 78 initiates a hard hand-off by sending a second TCH setup message 516 to the foreign PCF/RPI 180. The foreign PCF/RPI 180 in turn sends aa A11 registration request 518 to PDSN 185 on an A11 channel to request registration of the wireless mobile node 78. The PDSN 185 responds with an A11 registration response message 520 on an A11 channel. The wireless mobile node 78 begins PPP 45 negotiations 522 with the PDSN 185 to establish a PPP 45 session 203. The PDSN 185 sends a RADIUS access-request message 524 for the PPP 45 session 203 over an A11 channel to the H-NACD 191.

The H-NACD 191 sends an indication, such as a RADIUS disconnect request message 526, to terminate the session activity on PDSN 178, and terminate the draw-down of the block of credits for the hand-off of the session activity. In response to the RADIUS disconnect request message 526, the PDSN 178 sends a RADIUS disconnect acknowledgement message 528. This RADIUS disconnect acknowledgement message 528 may contain credits that the PDSN 178 did not use. Alternatively, the PDSN 178 and the H-NACD 191 may exchange messages separate from the RADIUS disconnect acknowledgement message 528 for returning any unused credits.

The H-NACD 191 sends to the PDSN 185 a RADIUS access-response message 530 that includes a second block of credits, and may include one or more measurement-method parameters. The wireless mobile node 78 successfully negotiates PPP 45 with the H-NACD 191 and establishes the PPP 45 session 203 activity in the second coverage area at 532.

Also at 532, after session activity is established, PDSN 185 monitors usage of the PPP 45 session 203 activity and periodically measures the usage of the PPP 45 session 203 activity in terms of the measurement-method parameters. These measurement-method parameters may differ from the measurement-method parameters sent to PDSN 178 when the wireless mobile node 78 is in the coverage area of the PDSN 178.

In an alternative embodiment, the PDSN 185 may be associated with the broker network 142. In such case, when wireless mobile node 178 roams into the second coverage area instead of the PDSN 185 sending a RADIUS access-request message 524 for the PPP 45 session 203 to the H-NACD 191, the PDSN sends the RADIUS access-request message 524 to the B-NACD 196 (not shown).

The B-NACD 196 (possibly via the H-NACD 191) may send an indication, such as a RADIUS disconnect request message, to terminate the session activity on PDSN 178, and terminate the draw-down of the block of credits for the hand-off of the session activity. In response to the RADIUS disconnect request message, the PDSN 178 sends a RADIUS disconnect acknowledgement message. This RADIUS disconnect acknowledgement message may contain any unused credits, which in turn may be appended to the cache of available credits by the B-NACD 196.

The B-NACD 196 may send to the PDSN 185 a RADIUS access-response message that includes a first block of credits, and may include one or more measurement-method parameters. The wireless mobile node 78 successfully negotiates PPP 45 with the B-NACD 191 and establishes the PPP 45 session activity.

After session activity is established, PDSN 185 monitors usage of the PPP 45 session activity and periodically measures the usage of the PPP 45 session activity in terms of the measurement-method parameters. The measurement-method parameters may differ from the measurement-method parameters sent to PDSN 178 when the wireless mobile node 78 is in the coverage area of the PDSN 178. For instance, the measurement-method parameters sent to the PDSN 185, assuming PDSN 185 is associated with the broker network 142, may cause the PDSN 185 to charge twice or some other multiple of the amount of credits for the same amount of usage of session activity on the PDSN 178.

Referring back to step 532, the PDSN 185 debits the measured usage from second block of credits. When the number of credits in the block of credits reaches a predetermined threshold, it sends to the H-NACD 191 (or the B-NACD 196) a RADIUS access-request message (not shown) for re-authentication of the PPP 45 session 203. The H-NACD 191 (or B-NACD 196) responds with a RADIUS access-response message (not shown), and an additional block of credits. The H-NACD 191 (or B-NACD 196) may also send one or more measurement-method parameters.

After sending the disconnect acknowledgement message 528, the PDSN 178 sends to the PCF 174 on an A11 channel an A11 registration update message 534. The PCF 174 responds to the request by sending to the PDSN 178 on an A11 channel an A11 request acknowledgment message 536. The PCF 174 then sends an A11 registration update message 538 on an A11 channel to the PDSN 178 with a lifetime timer set equal to zero indicating that the wireless mobile node 78 should be de-registered. The PDSN 178 sends to the PCF 174 an A11 registration response message 540 on an A11 channel confirming the de-registration of the mobile node 78.

The foregoing call flow diagram illustrates exemplary message flow 500 for a hand-off of a wireless prepaid call on a 3G network. The foregoing description indicates carrying out a hand-off of a wireless prepaid call on a 3G network for one wireless communication session. However, hand-offs may be carried out for multiple, simultaneous wireless communications sessions as well. Since each wireless communication session is considered a separate communication session, hand-offs may be carried out for each wireless communication session in the identical or similar manner as described above. The hand-offs may be carried out in other ways as well.

Various other implementations of handing off a session activity are possible. In the foregoing description the (i) network-access-control device, (ii) the H-NACD 191, and/or (iii) the B-NACD 196 may communicate according to the client/server based RADIUS protocol and/or the peer-to peer DIAMETER protocol.

As noted above, the RADIUS AAA protocol may be used for providing authentication, association, and accounting functionality to wireless packet data networks. Devices that employ the RADIUS AAA protocol are based on client/server architecture. Consequently, the server must wait until a client sends it a request before being able to notify the client of events. In other words, a RADIUS AAA server cannot notify the client of events asynchronously. The DIAMETER protocol enhances many of the features of the RADIUS protocol. One important enhancement is that the DIAMETER protocol supports peer-to-peer architecture. This type of architecture allows one network device to asynchronously notify another network device and initiate an inter-peer communication at any point in time.

Figure 12:
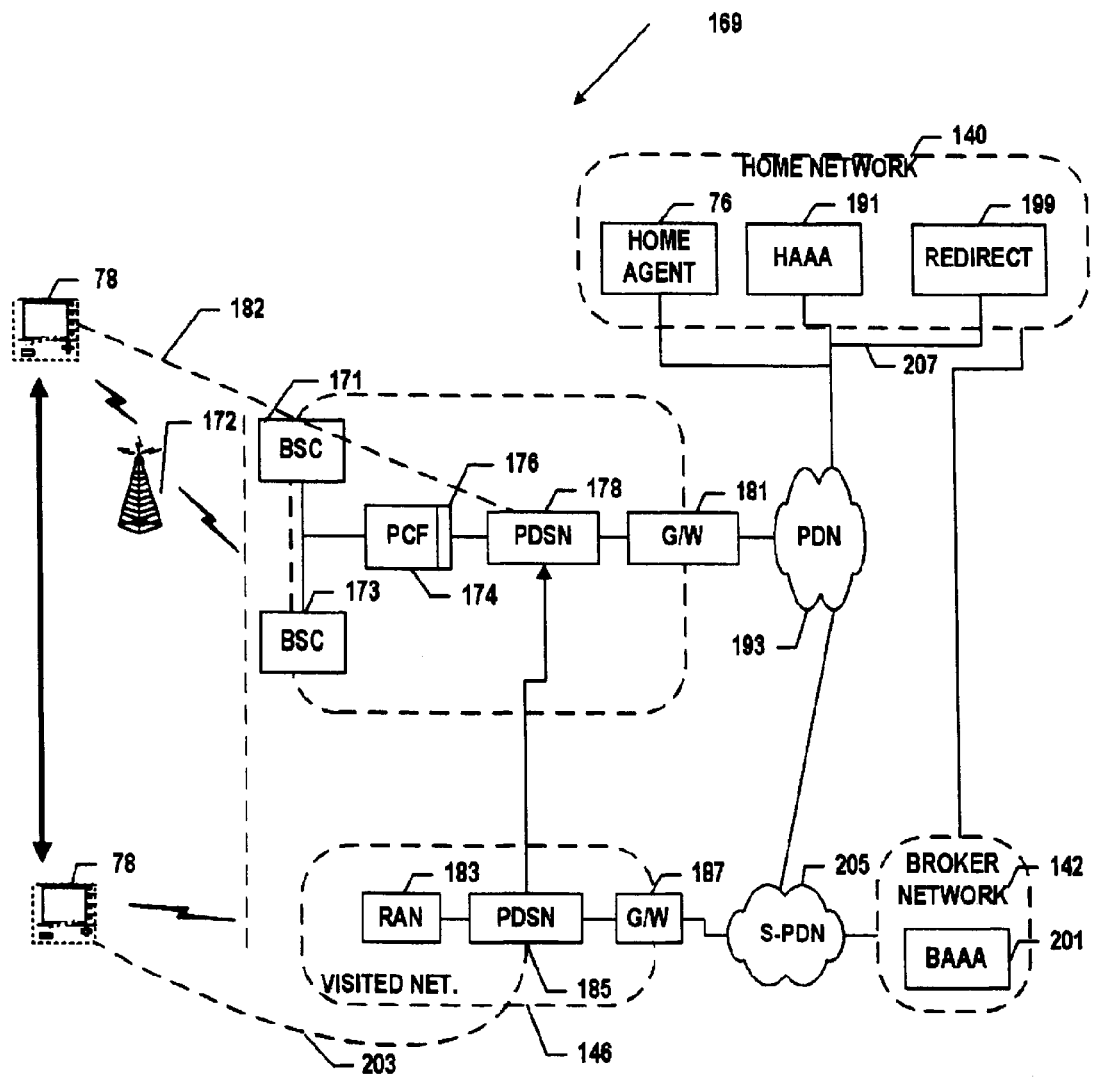
FIG. 12 is a seventh block diagram illustrating an exemplary portion of the 3G network using the DIAMETER protocol for AAA services according to an exemplary embodiment.

FIG. 12 is a block diagram illustrating an exemplary portion 169 of the 3G network 108 using the DIAMETER protocol for AAA services. FIG. 12 shows exemplary portion 169, which is similar to exemplary portion 170 (FIG. 10).

Paralleling portion 170, the portion 169 includes a wireless mobile node 78, a base station ("BTS") 172, base station controllers ("BSC") 171 and 173, a PCF 174, a radio packet interface ("RPI") 176, a source PSDN 178, a source gateway 181, a radio access network ("RAN") 183, a foreign PDSN 185, a foreign gateway 187, a home network 140, a HA 76, a home AAA server 191, a broker network 142, a broker AAA server 201, and PDN 193.

Portion 169 also includes both a home AAA server (HAAA) 191 and a broker AAA server (BAAA) 201 are configured to carry out communications according to the DIAMETER protocol. Further included in portion 169 are Redirect Server 199, and a second packet data network (S-PDN) 205. The S-PDN 205, like PDN 193, may be the Internet, and/or a public or private intranet/extranet. Thus, the S-PDN 205 may be, but need not be, the same network as PDN 193.

As described above, HA 76 is in communication with PDN 193. Between these network nodes, communication may be transmitted according to the IP, or any other packet data transmission protocol. HAAA 191 is also in communication with the PDN 193. Communications exchanged between the PDN 193 and the HAAA 191 are sent according to the DIAMETER protocol. Similarly, broker network 142 is in communication with the S-PDN 205 and home network 140. Among these nodes, communications can be exchanged according to the DIAMETER protocol.

Also shown in FIG. 12 is Redirect server 199 in communication with both PDN 193 and the S-PDN 205. Communication sent over the Ri interface 207 may be sent according to a protocol that may be based on IP, a variation of IP, Mobile IP, a variation of Mobile IP, and/or other packet data transport protocol.

When roaming on a foreign or visited network 146, mobile node 78 may be in communication with RAN 183. In turn, the RAN 183 may be in communication with PDSN 178. PDSN 178 is in communication with the BAAA 201, which in turn may be in communication with a HAAA 191. Communications between the HAAA 191 and BAAA 201 may be sent according to the DIAMETER protocol, as well as other protocols. Alternatively, the PDSN 178 may communicate directly with the HAAA 191.

The following example call flow diagrams illustrate implementations using the exemplary architecture shown in FIG. 12.

Figure 13:
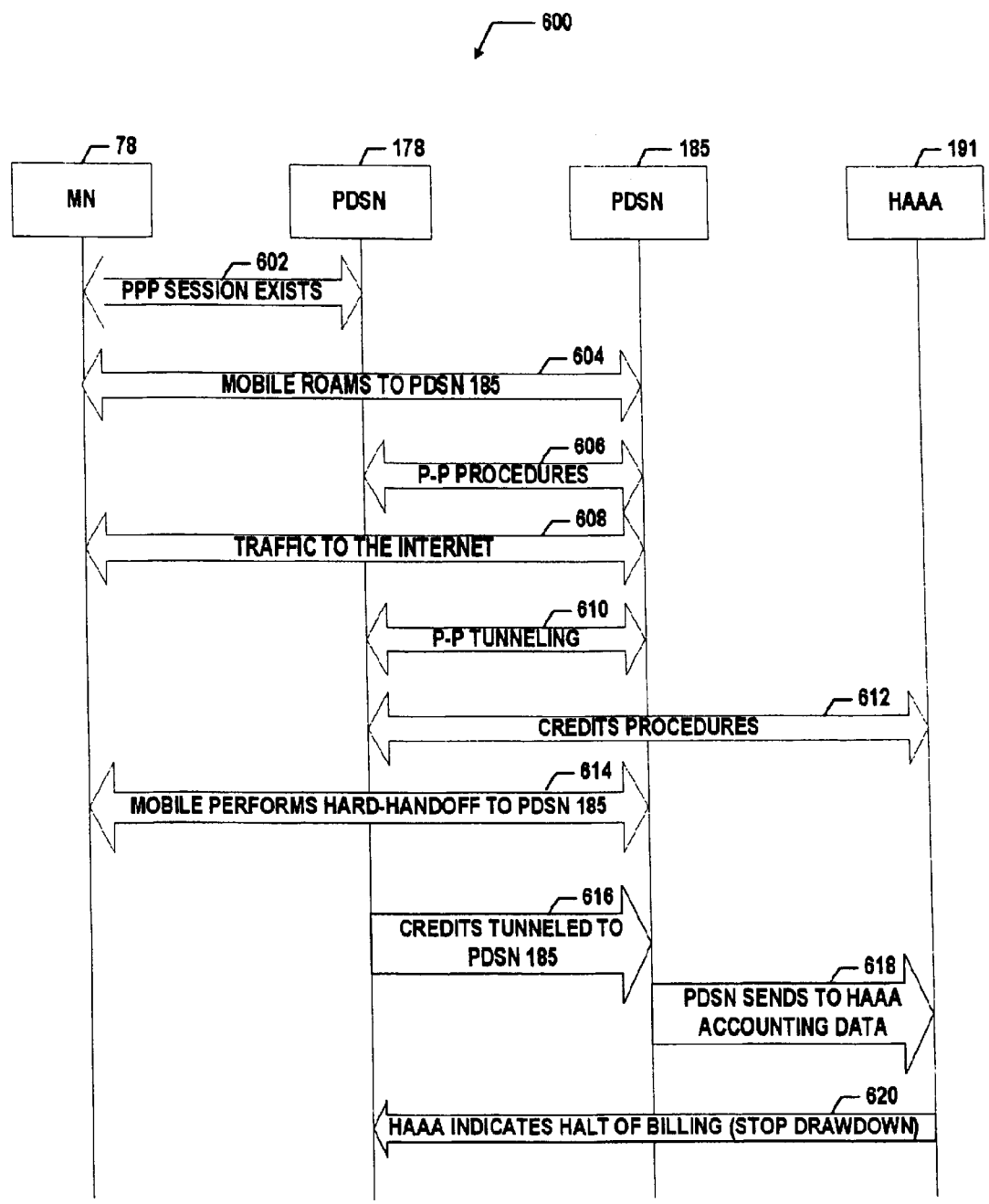
FIG. 13 is a second call flow diagram illustrating an exemplary message flow for an inter-PDSN hand-off of a wireless prepaid call for a wireless mobile node roaming on a 3G network according to an exemplary embodiment.

FIG. 13 is a call flow diagram illustrating an exemplary message flow 600 for P-P hand-off a wireless prepaid call for mobile node 78 roaming on network portion 169 of 3G network 108 using the DIAMETER protocol in accordance with an exemplary embodiment. Referring to FIG. 13, the PSDN 178 provides network access, establishes a PPP 45 session, and performs prepaid billing for session activity of the wireless communication session, as shown in 602.

In an exemplary embodiment, the wireless mobile node 78 begins PPP 45 negotiations with the PDSN 178 to establish a PPP 45 session 182. The PDSN 178 sends to the HAAA 191 a DIAMETER Auth-Request message for the PPP 45 session 182.

The Auth-Request message sent from the PDSN 178 to the HAAA 191 is used for authenticating and authorizing the PPP 45 session 182, which may use Challenge Handshake Authentication Protocol (CHAP) or Password Authentication Protocol (PAP) for security purposes. If the Auth-Request message is sent to the BAAA 201, it, in turn, will forward the Auth-Request request to the HAAA 191. The Auth-Request message may contain information to identify the user that is requesting service.

The HAAA 191 queries the user profile (either locally or in a remote data store), and sends to the PDSN 178 an Auth-Accept message, which contains a first block of credits, and may include one or more measurement-method parameters and/or credit rating information. The measurement-method parameters in the Auth-Accept message may contain user profile information including usage units for subscribed services. For instance, the Auth-Accept message may contain DIAMETER attribute value pairs (AVPs) for (i) indicating that the usage should be applied on some number of bytes of use, (ii) notifying the user (via the wireless mobile 78) of the number of bytes of credit that are available, (iii) notifying the user (via the wireless mobile node 78) of the number bytes that remain, (iv) indicating that the user should be sent to Redirect server 199, and/or (v) notifying the user (via the wireless mobile node 78) that usage updates may be sent at some selected frequency.

The mobile node 78 successfully negotiates PPP 45 with the HAAA 191 and establishes the PPP 45 session 182 activity. Data may be sent via the Internet and/or any other packet data network. After session activity is established, PDSN 178 monitors usage of the PPP 45 session 182 activity and periodically measures the usage of the PPP 45 session 182 activity in terms of the measurement-method parameters. The PDSN 178 debits the measured usage from the first block of credits.

At some point, the wireless mobile node 178 roams into the coverage area of the PDSN 185, as shown in 604. After the wireless mobile node 78 sends to the PDSN 185 a registration request, the PSDN 185 initiates fast hand-off procedures according to the IS-835 protocol, as shown in 606. The fast hand-off may be carried out by sending a P-P registration request message to the PDSN 178. In response, the PDSN 178 sends a P-P registration reply message to PDSN 185 to confirm the request to tunnel the session activity of the wireless communication session to the PDSN 185. Other PDSN to PDSN protocols may be used as well.

Once the P-P communication is established, session activity of the wireless communication session is passed between the PDSN 178 and PDSN 185, as shown in 610. Also after the P-P communication is established, PDSN 178, performs session activity monitoring, measuring, and accounting as if the session activity is not tunneled to the PDSN 185, as shown in 612. Accordingly, the PDSN 178 monitors usage of the PPP 45 session 182 activity tunneled to the PDSN 185. The PDSN 178 also periodically measures the usage of the PPP 45 session 182 activity tunneled to the PDSN 185 in terms of the measurement-method parameters. The PDSN 178 then debits the measured usage of tunneled session activity from the first or additional block of credits received by the PDSN 178.

As shown in 614, the mobile node 78 performs a hard hand-off to the PDSN 185, causing the PDSN 178 to terminate any session activity and return unused credits to the HAAA 191, so that the unused credits may be returned to the cache of available credits.

Alternatively, the PDSN 178 sends to the PDSN 185 unused credits, if any such credits remain, as shown in 616. In an exemplary embodiment, the PDSN 185 sends a P-P registration request message containing a request for unused credits. In reply, the PDSN 178 may send to the PDSN 185 a P-P registration reply message containing the unused credits. The PDSN 185 debits the measured usage from unused credits and/or the second block of credits.

At 618, the PDSN 185 may send to HAAA 191 accounting data after hand-off. During a state transition, such as such as when the session activity goes from active to dormant state, from an active to inactive state, or any other state transition, the PDSN 185 may effectuate an exemplary hand-off procedure by establishing independent session activity at 618. In an exemplary embodiment, the wireless mobile node 78 begins PPP 45 negotiations with the PDSN 185 to establish a PPP 45 session 203. The PDSN 185 sends to the HAAA 191 a DIAMETER Auth-Request message for the PPP 45 session 203.

The HAAA 191 queries the user profile (either locally or in a remote data store), and if eligible for wireless prepaid service, the HAAA 191 sends to the PDSN 185 an Auth-Accept message, which may contain a second block of credits, and may include one or more measurement-method parameters or credit rating information. The measurement-method parameters in the Auth-Accept message may contain user profile information including usage units for subscribed services. The Auth-Accept message may contain DIAMETER attribute value pairs (AVPs) for (i) indicating that the usage should be applied on some number of bytes or some measure of time of use, (ii) notifying the user (via the mobile node 78) of the number credits that are available, (iii) notifying the user (via the mobile node 78) of the number bytes or amount of time that remain, (iv) indicating that the user should be sent to redirect server 199, and/or (v) notifying the user (via the mobile node 78) that usage updates may be sent at some selected frequency.

The mobile node 78 successfully negotiates PPP 45 with the HAAA 191 and establishes the PPP 45 session 203 activity via PDSN 185. Data may be sent via the Internet and/or any other packet data network. After session activity is established, PDSN 185 monitors usage of the PPP 45 session 203 activity and periodically measures the usage of the PPP 45 session 203 activity in terms of the received measurement-method parameters.

At 620, the HAAA 191 sends a halt indication to the PDSN 178, which causes the PDSN 178 to terminate any monitoring and measuring of the session activity. Further the halt indication may also cause the PDSN 178 to stop debiting any usage of the session activity and return unused credits to the HAAA 191, so that the unused credits may be returned to the cache of available credits.

Figure 14:
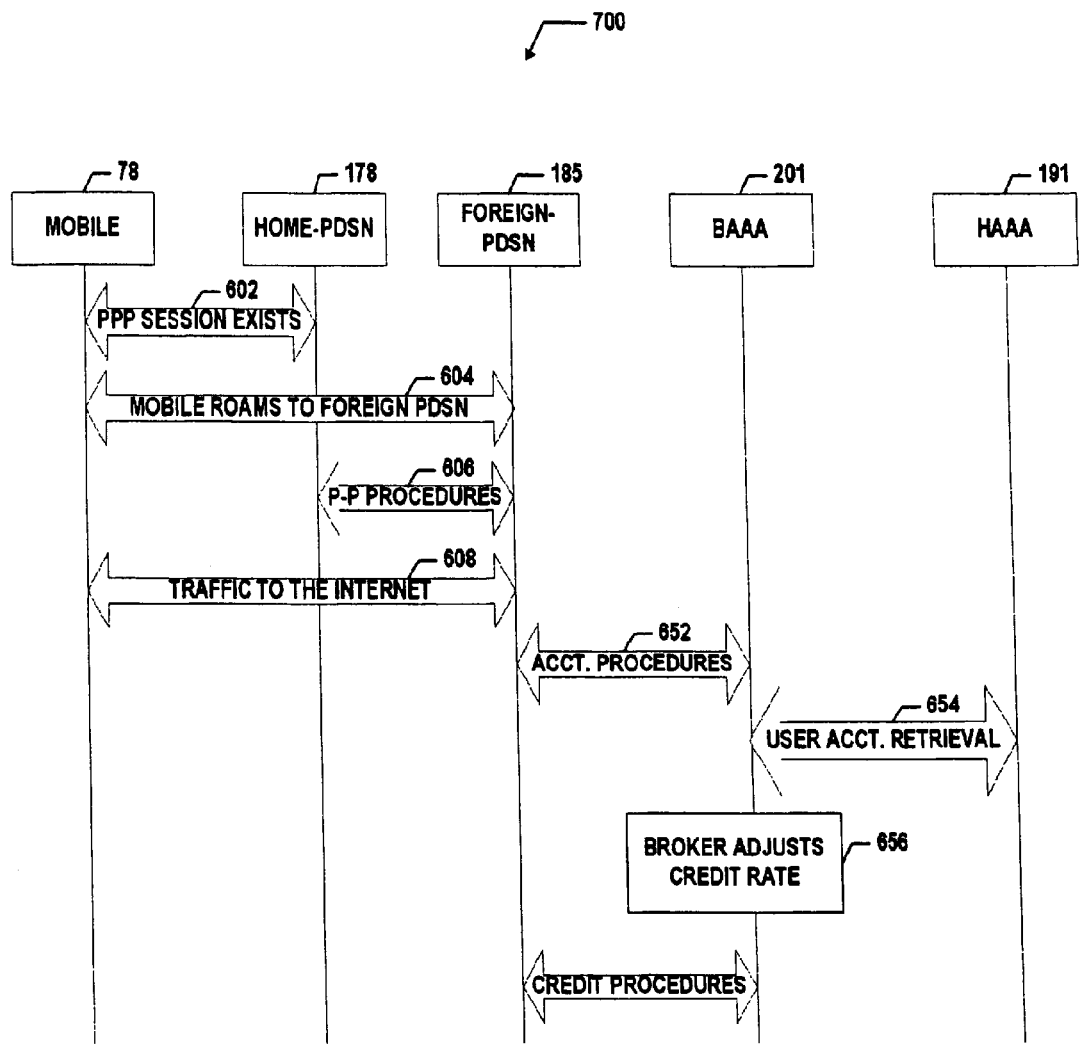
FIG. 14 is a third call flow diagram illustrating an exemplary message flow for inter-PDSN hand-off a wireless prepaid call for a wireless mobile node roaming on a 3G network according to an exemplary embodiment.

FIG. 14 is a call flow diagram illustrating an exemplary message flow 700 for P-P hand-off a wireless prepaid call for mobile node 78 roaming on network portion 169 3G network 108 using the DIAMETER protocol in accordance with an exemplary embodiment. FIG. 14 shows the exemplary message flow 700, which is similar to the exemplary message flow 600, except as described herein.

If associated with BAAA 201, the PDSN 185 and the BAAA 201 perform accounting procedures after establishing independent session activity, as shown in 652. These accounting procedures may be performed over a secure link, such as a SSL link, according to the DIAMETER protocol. The accounting procedures, however, may be carried out in other ways. Exemplary accounting procedures may include (i) replenishing used credits, and (ii) purchasing new credits for prepaid services. At 654, the BAAA 201 sends a DIAMETER Auth-Request message for the to the HAAA 191 over the secure link. The DIAMETER Auth-Request message may request prepaid billing information from the user profile for the wireless mobile node.

The HAAA 191 queries the user profile (either locally or in a remote data store), and if eligible for wireless prepaid service, the HAAA 191 sends to the BAAA 201 an Auth-Accept message, which may contain a second block of credits, and may include one or more measurement-method parameters and/or credit rating information. The measurement-method parameters in the Auth-Accept message may contain user profile information including usage units for subscribed services. The Auth-Accept message may contain DIAMETER attribute value pairs (AVPs), as described above.

Alternatively, the BAAA 201 may act as a proxy to the HAAA 191, which allows the BAAA 201 to appear as the HAAA 191 to the PDSN 185. Thus, as a proxy, the BAAA 201 allows for replenishing used credits and purchasing new credits for prepaid services by the PDSN 185 as if the BAAA 201 is the HAAA 191. That is, the BAAA 201 can act with transparency to the PDSN 185, and allows for seamless roaming in with accurate measuring of session activity usage. As noted above, exemplary accounting procedures may be found in another U.S. Patent Application filed concurrently with this document, naming the same inventors, and entitled "Prepaid Billing System For Wireless Data Networks."

As shown in 656, the BAAA 201 may use alternative measurement-method parameters for measuring the usage of the session activity. For example, the user profile for the wireless mobile node 78 may contain a subscription to basic wireless prepaid service in which the measurement-methods parameters while carrying on a session activity in home network 140 draws down credits at rate C(h), The basic wireless prepaid service contained in the user profile may require that credit draw-down in a broker network 142 is performed at rate C(v). When a BAAA 201 receives a request for a block of credits from PDSN 185, the BAAA 201 may be provided with or have measurement-method parameters that contain an algorithm that adjusts for difference between C(h) and C(v). For example, the measurement-method parameters may contain an indication that specifies that each credit of the block of credits sent to the PDSN 185 are applied at half the value. Other algorithms may also apply.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

Preferred and alternative embodiments of the present invention have been illustrated and described. It will be understood, however, that changes and modifications may be made to the invention without deviating from its true spirit and scope, as defined by the following claims.

What is claimed is:

1. A method for providing hand-offs for wireless prepaid services on a data network using prepaid billing, the method comprising:
    a first-network-access device carrying on session activity of a wireless communication session with a wireless mobile node within a first coverage area;
    a second-network-access device establishing connectivity with the wireless mobile node after the wireless mobile node moves into a second coverage area;
    responsive to the second-network-access device establishing connectivity with the wireless mobile node, the first-network-access device tunneling the session activity to the second-network-access device;
    the first-network-access device receiving from a network-access-control device a block of credits;
    the first-network-access device periodically measuring usage of the session activity; and
    the first-network-access device debiting the usage of the session activity from the block of credits.

2. The method of claim 1, further comprising the first-network-access device receiving from the network-access-control device measurement-method parameters.

3. The method of claim 2, wherein the first-network-access device contains a plurality of predetermined-measurement methods, and further comprising:
    the first-network-access device selecting one of the predetermined-measurement methods in response to receiving the measurement-method parameters.

4. The method of claim 2, wherein the measurement-method parameters are selected from the group consisting of an algorithm, and a conversion factor, wherein the algorithm may be any of time based, active time based, byte based, and a combination of any of time, active time and byte based.

5. The method of claim 2, wherein the step of the first-network-access device periodically measuring usage of the session activity comprises:
    the first-network-access device measuring the usage of the session activity while in the first coverage area in terms of a first of the measurement-method parameters; and
    the first-network-access device measuring the usage of the session activity tunneled to the second-network-access device in terms of a second of the measurement-method parameters.

6. The method of claim 5, wherein the first of the measurement-method parameters and the second of the measurement-method parameters are the same.

7. The method of claim 2, further comprising:
    the first-network-access device receiving an additional block of credits from the network-access-control device; and
    the first-network-access device debiting the usage of the wireless communication session from the additional block of credits.

8. The method of claim 7, further comprising:
    the first-network-access device requesting the additional block of credits.

9. The method of claim 8, wherein the step of the first-network-access device requesting the additional block of credits is performed at a predetermined threshold.

10. The method of claim 9, further comprising:
    the first-network-access device receiving from the network-access-control device the measurement-method parameters in conjunction with the additional block of credits.

11. The method of claim 10, wherein the step of the first-network-access device periodically measuring usage of the session activity comprises:
    the first-network-access device measuring the usage of the session activity while in the first coverage area in terms of a first of the measurement-method parameters; and
    the first-network-access device measuring the usage of the session activity tunneled to the second-network-access device in terms of a second of the measurement-method parameters.

12. A method for providing hand-offs for wireless prepaid services on a data network using prepaid billing, the method comprising:
    a first-network-access device carrying on session activity for a wireless communication session with a wireless mobile node within a first coverage area;
    the first-network-access device receiving from the network-access-control device a first block of credits;
    the first-network-access device periodically measuring usage of the session activity;
    the first-network-access device debiting the usage of the session activity from the first block of credits;
    a second-network-access device requesting from the network-access-control device network access for the session activity of the wireless communication session after the wireless mobile node moves into a second coverage area of the second-network access device;
    the second-network-access device establishing the session activity for the wireless communication session;
    the second-network-access device receiving from the network-access-control device a second block of credits;
    the second-network-access device periodically measuring usage of the session activity; and
    the second-network-access device debiting the usage of the session activity from the second block of credits.

13. The method of claim 12, further comprising:
    after the second-network-access device establishes the session activity for the wireless communication session, the first-network-access device receiving from the network-access-control device a first indication that causes the first-network-access device to stop debiting the usage of the session activity from the first block of credits.

14. The method of claim 13, wherein the first indication is selected from the group consisting of a stop accounting message, a terminate session activity message, and, a disconnect message.

15. The method of claim 12, further comprising the first-network-access device receiving from the network-access-control device measurement-method parameters in conjunction with receiving the first block of credits.

16. The method of claim 15, further comprising the second-network-access device receiving from the network-access-control device the measurement-method parameters in conjunction with receiving the second block of credits.

17. The method of claim 12, further comprising the second-network-access device receiving from the network-access-control device measurement-method parameters in conjunction with receiving the second block of credits.

18. The method of claim 17, wherein the second-network-access device contains a plurality of predetermined-measurement methods, and further comprising:
the second-network-access device selecting one of the predetermined-measurement methods in response to receiving the measurement-method parameters.

19. The method of claim 18, wherein the measurement-method parameters are selected from the group consisting of an algorithm, and a conversion factor, wherein the algorithm may be time based, active time based, byte based, and any combination of any of time, active time and byte based.

20. The method of claim 16, wherein the step of the first-network-access device measuring the usage of the session activity comprises:
the first-network-access device measuring the usage of the session activity in terms of a first of the measurement-method parameters; and
wherein the step of the second-network-access device measuring the usage of the session activity comprises:
the second-network-access device measuring the usage of the session activity in terms of a second of the measurement-method parameters.

21. The method of claim 20, wherein the first of the measurement-method parameters and the second of the measurement-method parameters are the same.

22. The method of claim 12, further comprising:
the second-network-access device receiving an additional block of credits from the network-access-control device; and
the second-network-access device debiting the usage of the wireless communication session from the additional block of credits.

23. The method of claim 22, further comprising:
the second-network-access device requesting the additional block of credits.

24. The method of claim 23, wherein the step of the second-network-access device requesting the additional block of credits is performed at a predetermined threshold.

25. The method of claim 23, further comprising:
the second-network-access device receiving from the network-access-control device the measurement-method parameters in conjunction with the additional block of credits.

26. The method of claim 25, wherein the step of the second-network-access device periodically measuring the usage of the session activity comprises:
the second-network-access device periodically measuring the usage of the session activity in terms of a third of the measurement-method parameters.

27. The method of claim 20, further comprising:
the second-network-access device requesting an additional block of credits;
the second-network-access device receiving the additional block of credits from the network-access-control device; and
the second-network-access device receiving from the network-access-control device the measurement-method parameters in conjunction with the additional block of credits,
wherein the step of the second-network-access device periodically measuring usage of the session activity further comprises:
the second-network-access device measuring the usage of the session activity in terms of a third of the measurement-method parameters.

28. The method of claim 27, further comprising:
the second-network-access device debiting the usage of the wireless communication session from the additional block of credits.

29. The method of claim 28, wherein the first of the measurement-method parameters, the second of the measurement-method parameters, and third of the measurement-method parameters are the same.

30. The method of claim 12, further comprising:
after the second-network-access device establishes the session activity, the first-network-access device receiving from the network-access-control device a second indication that causes the first-network-access device to return any remaining credits to the network-access-control device.

31. The method of claim 12, further comprising:
after the second-network-access device establishes the session activity for the wireless communication session, the first-network-access device receiving from the network-access-control device a second indication that causes the first-network-access device to transfer any remaining credits to the second-network-access device.

32. The method of claim 12, further comprising:
after the second-network-access device establishes the session activity for the wireless communication session, the first-network-access device requesting an additional block of credits.

33. The method of claim 32, further comprising:
the first-network-access device receiving from the network-access-control device a first indication that causes the first-network-access device to stop debiting the usage of the session activity from the first block of credits.

34. The method of claim 33, further comprising:
the first-network-access device receiving from the network-access-control device a second indication that causes the first-network-access device to return any remaining credits to the network-access-control device.

35. The method of claim 32, further comprising:
the first-network-access device not receiving from the network-access-control device a responsive indication to the request for additional block of credits, wherein upon expiry of remaining credits, session activity on the first-network-access device terminates.

36. The method of claim 32, further comprising:
the first-network-access device not receiving from the network-access-control device a responsive indication to the request for additional block of credits;
responsive to not receiving the responsive indication, the first-network-access device terminating session activity; and
the first-network-access device returning any remaining credits to the network-access-control device.

37. A method for providing hand-offs for wireless prepaid services on a data network using prepaid billing, the method comprising:

a first-network-access device carrying on session activity of a wireless communication session with a wireless mobile node within a first coverage area;

the first-network-access device receiving from a network-access-control device a first block of credits;

the first-network-access device periodically measuring usage of the session activity;

the first-network-access device debiting the usage of the session activity from the first block of credits;

a second-network-access device establishing connectivity with the wireless mobile node after the wireless mobile node moves into a second coverage area;

responsive to the second-network-access device establishing connectivity with the wireless mobile node, the first-network-access device tunneling the session activity and any remaining portion of the first block of credits to the second-network-access device; and the second-network-access device debiting the usage of the tunneled session activity from the tunneled remaining portion of the first block of credits.

38. The method of claim 37, further comprising:

the second-network-access device requesting from the network-access-control device network access for the session activity of the wireless communication session;

the second-network-access device receiving from the network-access-control device network access for the session activity;

the second-network-access device receiving from the network-access-control device a second block of credits;

the second-network-access device providing network access for the session activity;

the second-network-access device periodically measuring usage of the session activity; and the second-network-access device debiting the usage of the session activity from the second block of credits.

39. The method of claim 38, wherein the second-network-access device requests from the network-access-control device network access for the session activity after a state transition in the session activity.

40. The method of claim 39, further comprising:

after the state transition, the first-network-access device receiving from the network-access-control device a first indication that causes the first-network-access device to stop debiting the usage of the session activity from the first block of credits.

41. The method of claim 40, wherein the first indication is selected from the group consisting of a stop accounting message, a terminate session activity message, and a disconnect message.

42. The method of claim 38, further comprising the first-network-access device receiving from the network-access-control device measurement-method parameters in conjunction with receiving the first block of credits.

43. The method of claim 42, further comprising the second-network-access device receiving from the network-access-control device the measurement-method parameters in conjunction with receiving the second block of credits.

44. The method of claim 38, further comprising the second-network-access device receiving from the network-access-control device measurement-method parameters in conjunction with receiving the second block of credits.

45. The method of claim 44, wherein the second-network-access device contains a plurality of predetermined-measurement methods, and further comprising:

the second-network-access device selecting one of the predetermined-measurement methods in response to receiving the measurement-method parameters.

46. The method of claim 45, wherein the measurement-method parameters is selected from the group consisting of an algorithm, and a conversion factor.

47. The method of claim 44, wherein the step of the first-network-access device measuring the usage of the session activity comprises:

the first-network-access device measuring the usage of the session activity in terms of a first of the measurement-method parameters; and wherein the step of the second-network-access device measuring the usage of the session activity comprises:

the second-network-access device measuring the usage of the session activity comprises in terms of a second of the measurement-method parameters.

48. The method of claim 47, wherein the first of the measurement-method parameters and the second of the measurement-method parameters are the same.

49. The method of claim 38, further comprising:

the second-network-access device receiving an additional block of credits from the network-access-control device; and the second-network-access device debiting the usage of the wireless communication session from the additional block of credits.

50. The method of claim 49, further comprising:

the second-network-access device requesting the additional block of credits.

51. The method of claim 50, wherein the step of the second-network-access device requesting the additional block of credits is performed at a predetermined threshold.

52. The method of claim 19, further comprising:

the second-network-access device receiving from the network-access-control device the measurement-method parameters in conjunction with the additional block of credits.

53. The method of claim 52, wherein the step of the second-network-access device periodically measuring the usage of the session activity comprises:

the second-network-access device periodically measuring the usage of the session activity in terms of a third of the measurement-method parameters.

54. The method of claim 47, further comprising:

the second-network-access device requesting an additional block of credits;

the second-network-access device receiving the additional block of credits from the network-access-control device; and the second-network-access device receiving from the network-access-control device the measurement-method parameters in conjunction with the additional block of credits, wherein the step of the second-network-access device periodically measuring usage of the session activity further comprises:

the second-network-access device measuring the usage of the session activity in terms of a third of the measurement-method parameters.

55. The method of claim 54, further comprising:

the second-network-access device debiting the usage of the wireless communication session from the additional block of credits.

56. The method of claim 55, wherein the first of the measurement-method parameters, the second of the measurement-method parameters, and third of the measurement-method parameters are the same.

57. The method of claim 37, further comprising:
after the second-network-access device provides network access for the session activity, the first-network-access device requesting an additional block of credits.

58. The method of claim 38, further comprising:
the first-network-access device receiving from the network-access-control device a first indication that causes the first-network-access device to stop debiting the usage of the session activity from the first block of credits.

59. The method of claim 57, further comprising:
the first-network-access device not receiving from the network-access-control device a responsive indication to the request for additional block of credits, wherein upon expiry of remaining credits, session activity on the first-network-access device terminates.

60. The method of claim 57, further comprising:
the first-network-access device not receiving from the network-access-control device a responsive indication to the request for additional block of credits; and
responsive to not receiving the responsive indication, the first-network-access device terminating session activity.

61. A method for providing hand-offs for wireless prepaid services on a data network using prepaid billing, the method comprising:
a first-network-access device carrying on session activity for a wireless communication session with a wireless mobile node within a first coverage area;
the first-network-access device receiving from the network-access-control device a block of credits;
the first-network-access device periodically measuring usage of the session activity;
the first-network-access device debiting the usage of the session activity from the block of credits;
a second-network-access device requesting from the network-access-control device network access to support a hand-off of the wireless communication session after the wireless mobile node moves into a second coverage area of the second-network access device;
the second-network-access device establishing hand-off session activity for the wireless communication session;
the network-access-control device retrieving from the first-network-access device at least some of the block of credits;
the second-network-access device receiving from the network-access-control device a second block of credits;
the second-network-access device periodically measuring usage of the session activity; and
the second-network-access device debiting the usage of the session activity from the second block of credits.

62. The method of claim 61 wherein the network-access-control device retrieving from the first-network-access device at least some of the block of credits includes retrieving all unused credits from the block of credits.

63. The method of claim 62 and further comprising:
the first-network-access device determining that the block of credits are depleted and requesting from the network-access-control device additional credits;
and wherein retrieving all unused credits from the block of credits includes retrieving all unused credits from the additional credits.

64. The method of claim 61 and further comprising:
the first-network-access device terminating the session activity within the first coverage area in combination with returning unused credits to the network-access-control device.

* * * * *

UNITED STATES PATENT AND TRADEMARK OFFICE
CERTIFICATE OF CORRECTION

PATENT NO. : 6,829,473 B2
DATED : December 7, 2004
INVENTOR(S) : Sundar Raman et al.

It is certified that error appears in the above-identified patent and that said Letters Patent is hereby corrected as shown below:

Title page,
Item [73], Assignee, change "Utstarcom" to -- UTStarcom --.

Column 39,
Line 29, change "device;" to -- device. --.

Column 43,
Line 9, change "credits;" to -- credits. --.

Signed and Sealed this

Twenty-first Day of June, 2005

JON W. DUDAS
*Director of the United States Patent and Trademark Office*

US006829473C1

(12) INTER PARTES REEXAMINATION CERTIFICATE (539th)
United States Patent
Raman et al.

(10) Number: US 6,829,473 C1
(45) Certificate Issued: Feb. 22, 2013

(54) ROAMING AND HAND OFF SUPPORT FOR PREPAID BILLING FOR WIRELESS DATA NETWORKS

(75) Inventors: Sundar Raman, Arlington Heights, IL (US); Michael Borella, Naperville, IL (US); Chandra Warrier, Schaumburg, IL (US)

(73) Assignee: UTStarcom, Inc., Alameda, CA (US)

Reexamination Request:
No. 95/000,269, Jun. 21, 2007

Reexamination Certificate for:
Patent No.: 6,829,473
Issued: Dec. 7, 2004
Appl. No.: 10/322,027
Filed: Dec. 17, 2002

Certificate of Correction issued Jun. 21, 2005.

Related U.S. Application Data

(60) Provisional application No. 60/398,859, filed on Jul. 25, 2002, provisional application No. 60/398,877, filed on Jul. 25, 2002, provisional application No. 60/398,881, filed on Jul. 25, 2002.

(51) Int. Cl.
*H04M 15/00* (2006.01)
*H04M 11/00* (2006.01)
(52) U.S. Cl. .................. 455/406; 455/414; 455/432.1; 379/114.2
(58) Field of Classification Search .......... 455/405–408; 379/114.01, 114.15, 114.17, 114.2; 370/352
See application file for complete search history.

(56) References Cited

To view the complete listing of prior art documents cited during the proceeding for Reexamination Control Number 95/000,269, please refer to the USPTO's public Patent Application Information Retrieval (PAIR) system under the Display References tab.

*Primary Examiner* — Quoc D Tran

(57) ABSTRACT

A method and apparatus for providing roaming and hand-off support for prepaid billing for wireless prepaid services on a data network may be provided by a first-network-access device carrying on session activity of a wireless communication session with a wireless-mobile node within a first coverage area. The first-network-access device receives blocks of credits drawn from a user account having a cache of available credits for the prepaid-services.

The first-network-access device periodically measures usage of the session activity in terms of a first of a plurality of measurement-method parameters. The first-network-access device debits the usage of the session activity from the blocks of credits.

After entering its coverage area, the second-network-access device establishes connectivity with the wireless-mobile node. The first-network-access device tunnels to the second-network-access device the session activity and any unused credits. The second-network-access device periodically measures usage of the tunneled session activity in terms of tunneled measurement-method parameters. The second-network-access device debits the usage of the tunneled session activity from the tunneled unused credits.

The second-network-access device then establishes independent network access for the session activity. The second-network-access device receives blocks of credits. The second-network-access device periodically measures the usage of the session activity in terms of another of the plurality of measurement-method parameters. The second-network-access device debits the usage of the session activity from the blocks of credits it receives.

After hand-off, the first-network-access device may receive from indications to terminate session activity, to stop debiting the usage of the session activity, and/or to return unused credits.

At the time of issuance and publication of this certificate, the patent remains subject to pending reissue application number 11/636,350 filed Dec. 7, 2006. The claim content of the patent may be subsequently revised if a reissue patent is issued from the reissue application.

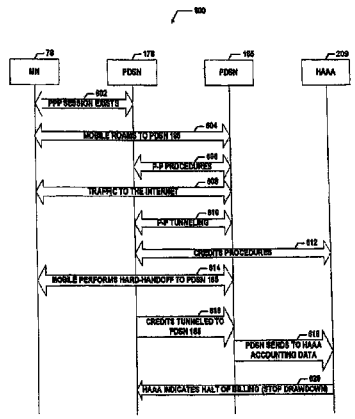

(Amended)

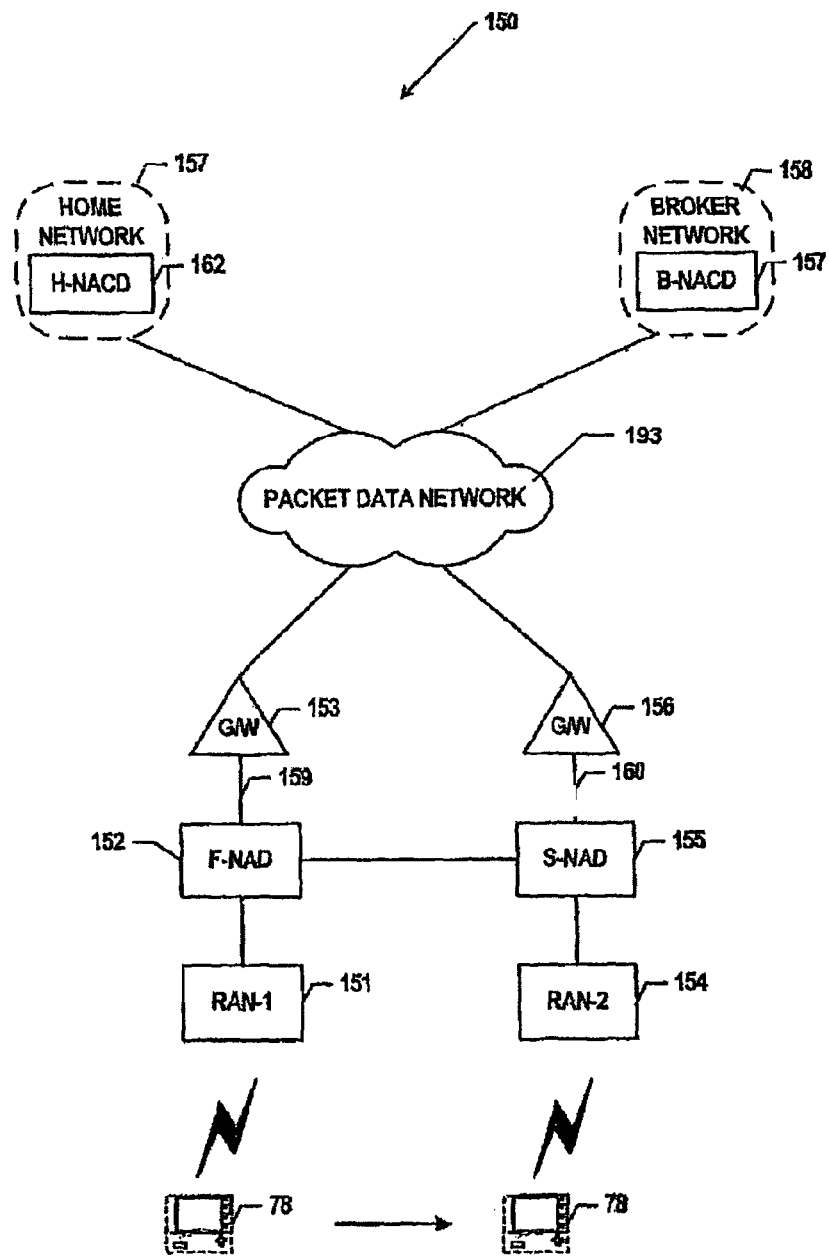
FIGURE 5
(Amended)

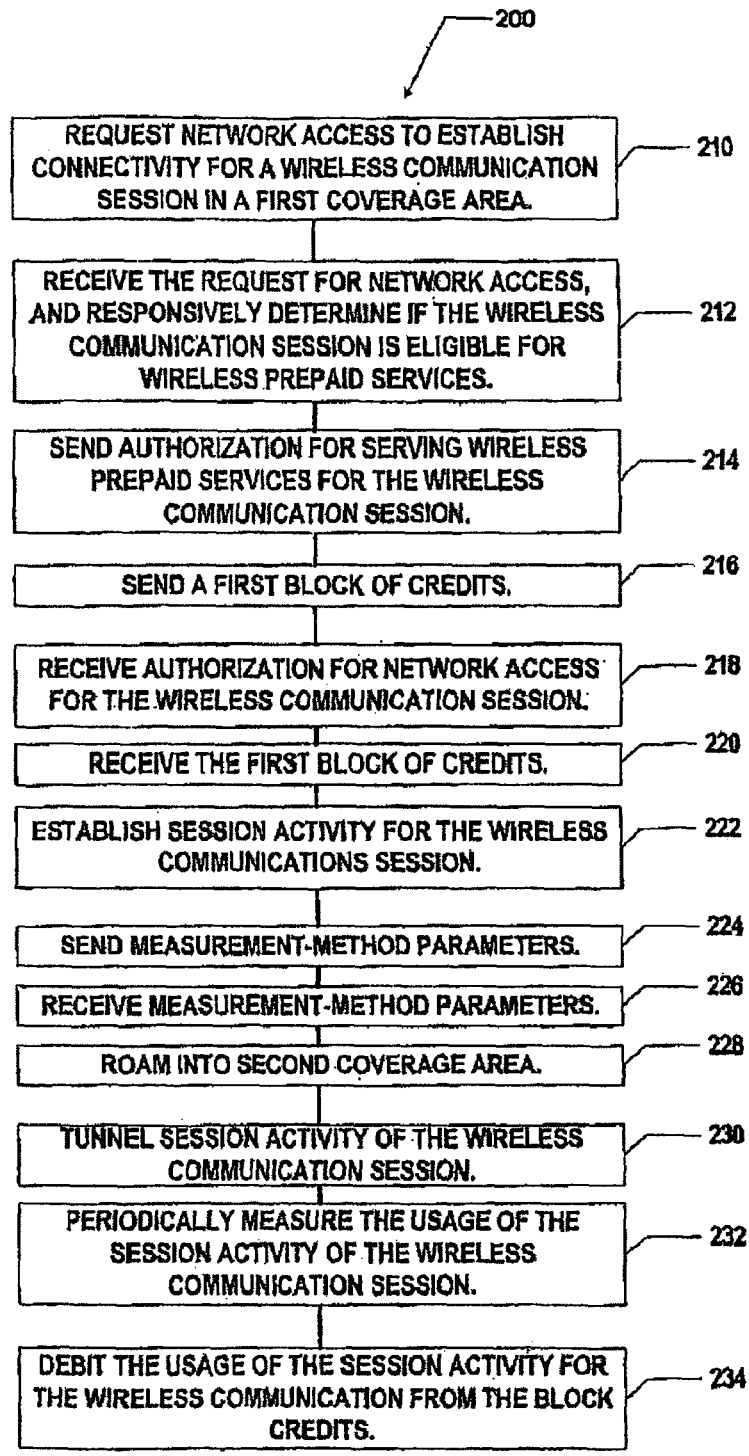
FIGURE 6
(Amended)

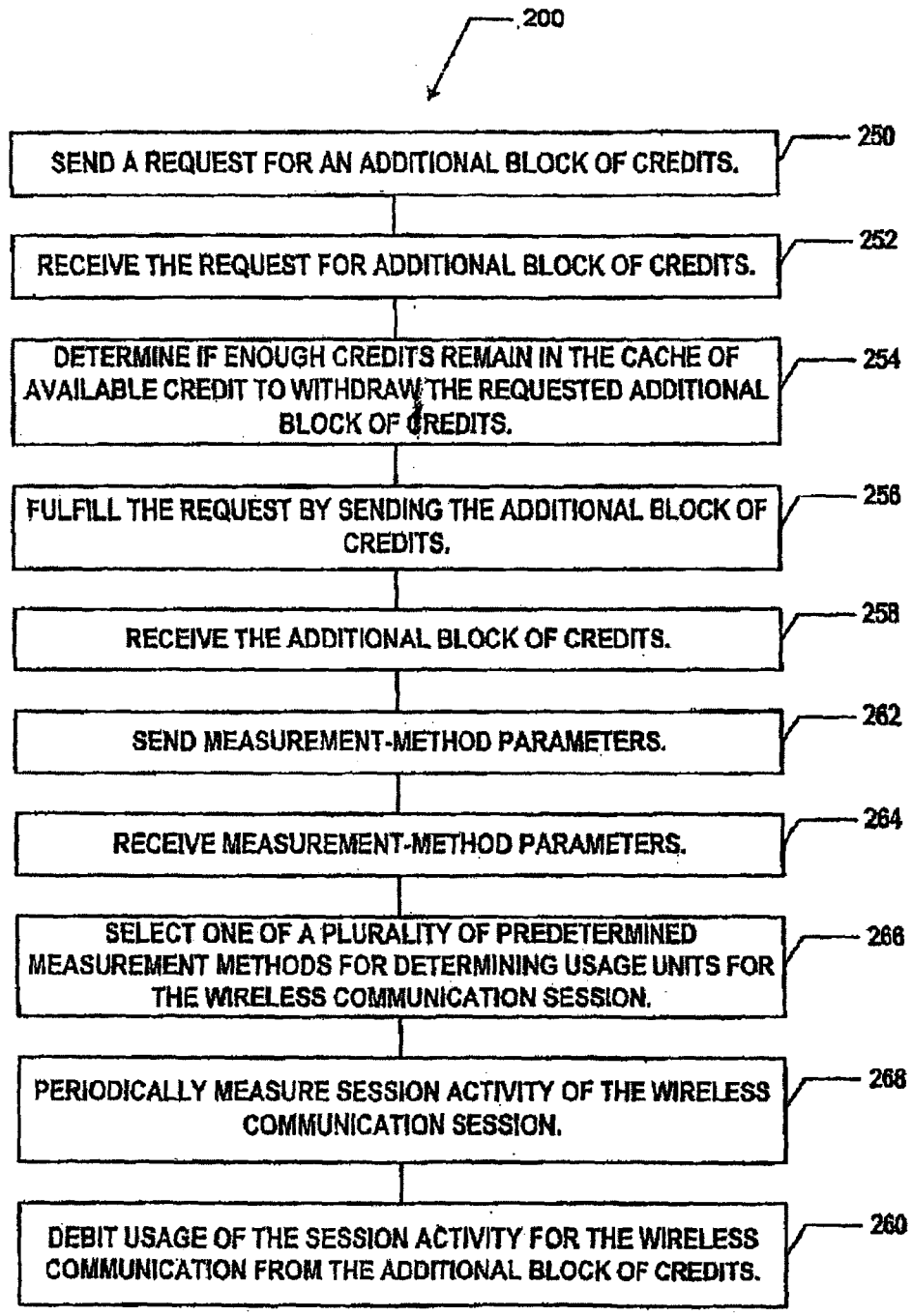
FIGURE 7
(Amended)

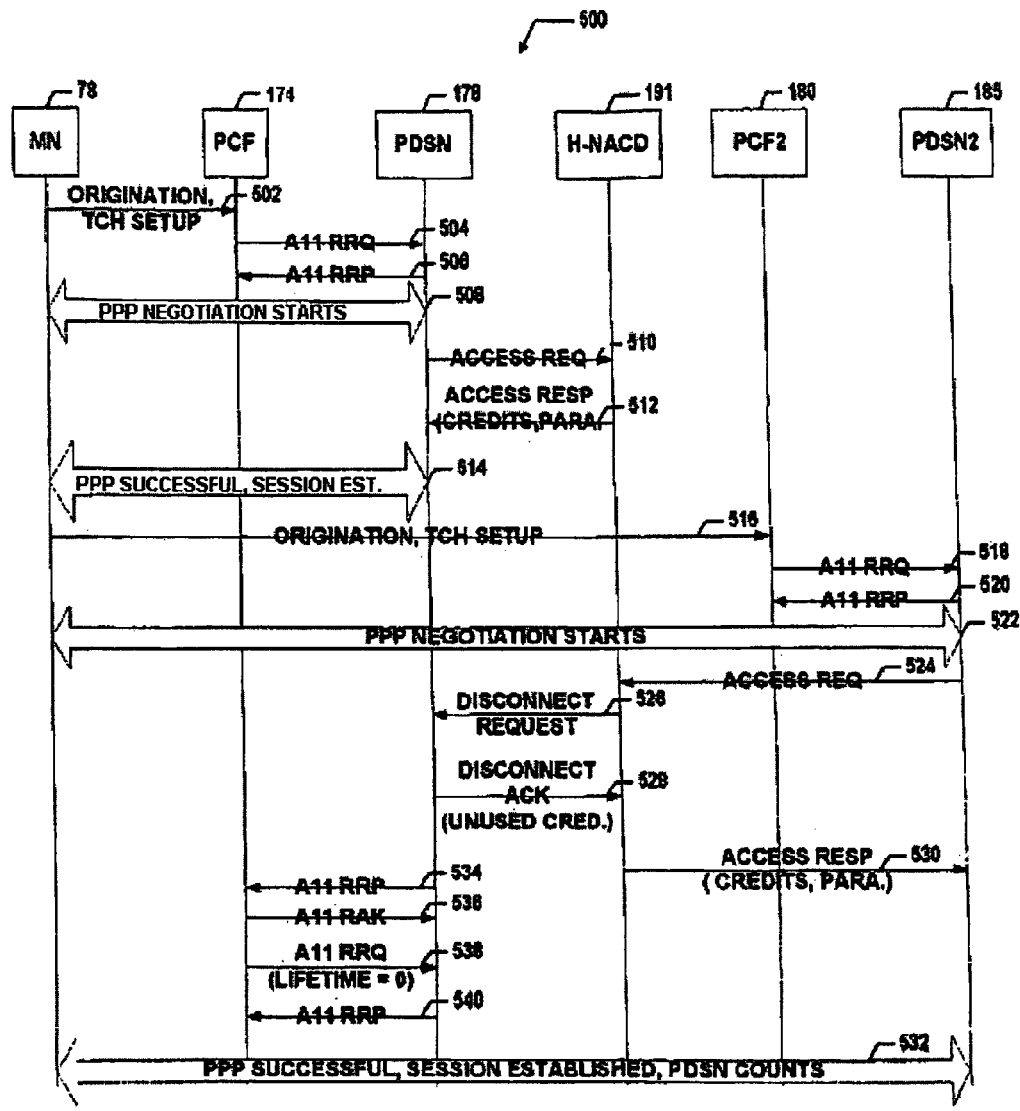
FIGURE 11
(Amended)

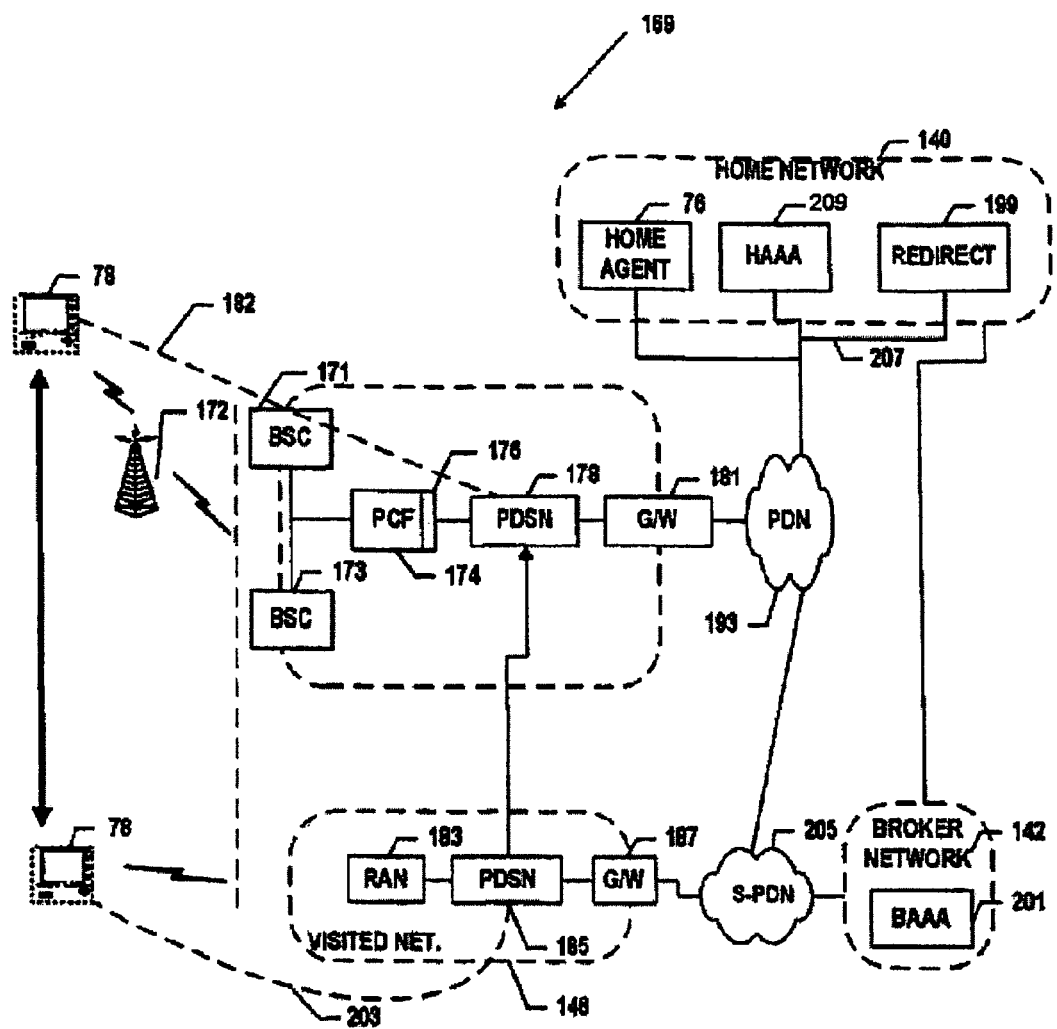
FIGURE 12
(Amended)

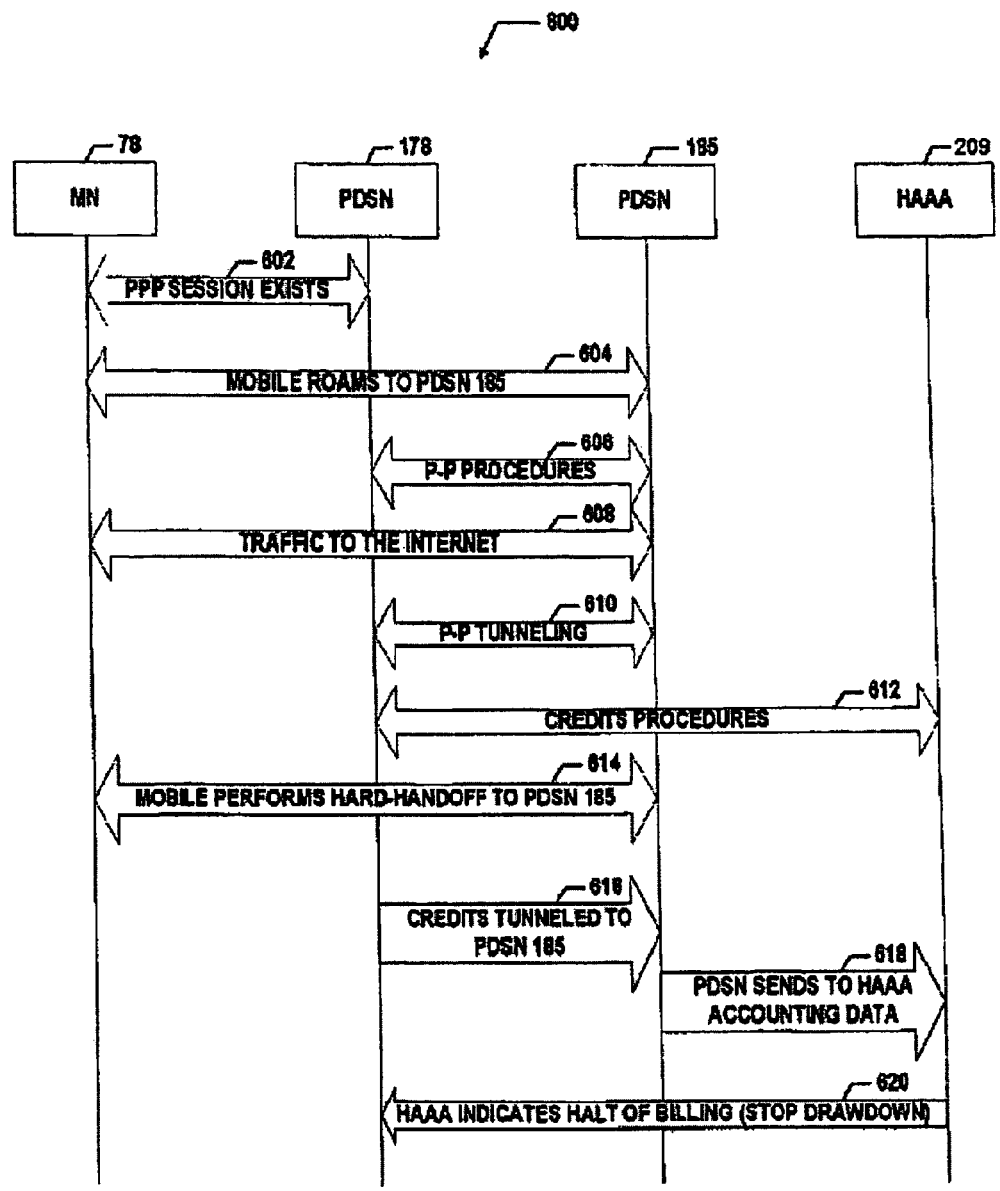
FIGURE 13
(Amended)

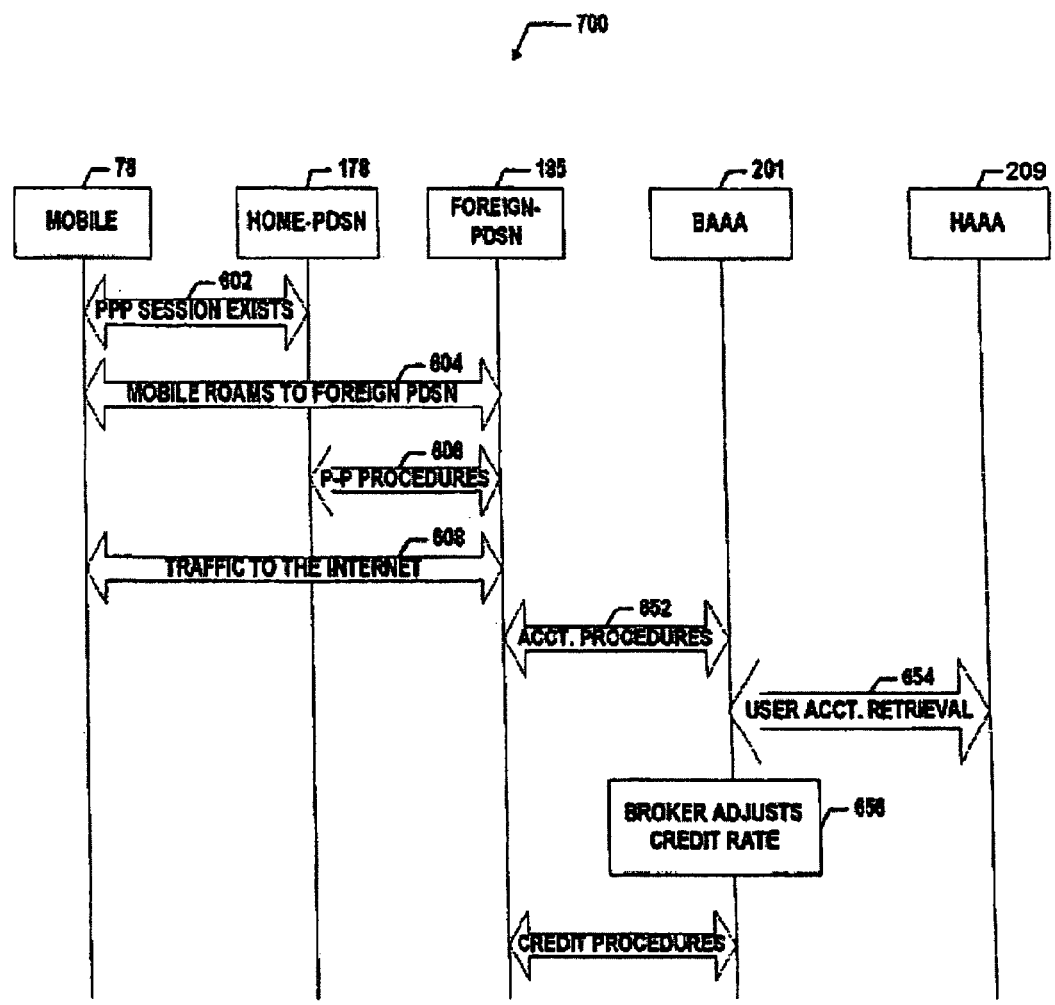
FIGURE 14
(Amended)

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 20-28:

In legacy prepaid billing scenarios, control of user access to the network is performed by elements of the Signaling System 7 (SS7) network. To enable such services, wired networks have adopted [te] *the* advanced intelligent network ("AIN") approach. The AIN approach provides for centrally located call control information and call processing logic, including the logic for prepaid billing, and a set of standardized messages between the network elements for accessing and using prepaid services, among other things.

Column 1, lines 29-42:

Wireless telecommunications networks have been developed on a similar model. In some legacy wireless networks, the switching of calls and the signaling for call control may be performed by mobile switching centers (MSCs). Each MSC typically controls one or more base stations or base transceiver stations (BTSs), sometimes via one or more base station controllers ([MSCs]*BSCs*). Each BTS provides a wireless coverage area within which wireless mobile nodes, such as mobile phones, personal digital/data assistants, and other mobile devices[,] can communicate with the BTS over an air interface. Alternatively, the functions of the MSC may be integrated into or integral to the BSC, thereby eliminating the MSC. In such case, the functions performed by the MSC may be performed by one or more BSCs.

Column 2, lines 13-19:

This is acceptable for voice services [since-the] *since the* Home Location Register (HLR) controls authorization of voice services. Units of use in the voice networks are typically time-based. And since voice activity inherently involves the SS7 network, the draw down of the usage units is reported to the HLR on a regular basis, which can provide for reasonable accounting of the usage.

Column 3, lines 22-34:

However, there are several problems associated with establishing voice, video or data calls on 3G networks. One problem is that users currently cannot easily buy, use or replenish prepaid services, such as pre-paid calling accounts on mobile nodes *in* some 3G networks. Such problems occur when legacy billing systems do not work on 3G networks, or the provider of the 3G network[s] access will not undertake providing 3G services to high-risk users. Further, without prepaid billing systems, large delays in receiving payments and/or bills can result in suspension or discontinuation of a user's 3G network services. And after fees are paid, it may be difficult for users of mobile nodes [on] to re-establish service, when pre-paid billing systems are not implemented.

Column 3, lines 35-48:

Moreover, without a prepaid billing system in 3G networks, providers may have difficulty in disconnecting active users of mobile nodes when outstanding fees are owed. This difficulty is further complicated when the active users of the mobile nodes are constantly roaming from one foreign network to another because usage on each of the foreign networks may not be reported until a later date. In such case, it is possible for a user to overuse the amount of allotted network services. Conversely, users may be overcharged for actual usage if multiple network elements charge[r] for the same service. While the aforementioned issues are common to both the data and voice services, the growth of data services and the demand for prepaid services in global markets will result in a need to satisfy these deficiencies.

Columns 6-7, lines 3-64:

In addition, the second-network-access device may also receive one or more measurement-method parameters with each block of credits. Like the measurement-method parameters received by the first-network-access device, if any, these parameters [the] may include an indication for determining the usage units for the wireless communication session.

Column 8, lines 47-50:

FIG. 8c_is a fifth flow diagram illustrating a method for providing hand-offs for wireless prepaid services on a data network using prepaid billing according to an exemplary embodiment;

Column 10, lines 14-27:

FIG. 2 is a block diagram illustrating an exemplary layered-protocol stack for communication sessions originating and terminating from mobile and non-mobile network devices used in the exemplary network system 10 (FIG. 1) and in the exemplary mobile network system illustrated in FIG. 3. The layered-protocol stack 40 is described with respect to *an* Internet Protocol (IP) [suites] *suite* comprising from lowest-to-highest, a link, a network, a transport and an application layer. The layered-protocol stack 40, however, may contain more or fewer layers [may be used]. Layer designations other than those of the IP suite may be used for the layers in the protocol stack 40, as well. For example, layering based on the seven layer Open Systems Interconnection ("OSI") model may be used.

Column 10, lines 58-65:

Above the link layer 42 is a network layer 46 (also called the "Internet Layer" for an Internet Protocol [suites] *suite*). The network layer 46 includes an [internet protocol] *Internet Protocol* ("IP") layer 48, which uses an IP addressing protocol designed to route traffic within a network and between networks. IP layer 48 (referred to hereinafter IP 48) is described in IETF RFC-791, and is fully incorporated herein by reference. As will be described below, the IP 48 contains support for Mobile IP.

Column 11, lines 12-18:

The network layer 46 may also include a Generic Routing Encapsulation ("GRE") layer (not illustrated). GRE is a protocol for performing encapsulation of data from one arbitrary network layer protocol in another arbitrary network layer protocol. Details regarding GRE may be found in IETF RFC-1701-1702, which [is] *are* fully incorporated herein by reference.

Column 11, lines 46-51:

In one embodiment, the [application layer 60] *stack* includes [a] Mobile IP [application program 62]. For Details regarding Mobile IP see "Mobile IP: The Internet Unplugged," by J. D. Solomon, Prentice-Hall, 1998, ISBN-0-13-856246-6. See also
Mobile IP, as defined by IETF RFCs 2002-2006, all of which are incorporated herein by reference.

Column 11, lines 60-67:

The application layer 60 may also include a Service Location Protocol ("SLP") application program 62, which provides a scalable framework for the discovery and selection of network services. Using SLP, network devices using the Internet need little or no static configuration of network services for network-based applications. For more information on SLP see IETF RFC-2608, which is fully incorporated herein by reference.

Column 12, lines 45-63:

H.323 terminals may be LAN-based end terminals for voice transmission. H.323 terminals may support real-time, two-way voice communications. H.323 terminals implement voice transmission functions and may include at least one voice Coder-Decoder ("CODEC") for sending and receiving packetized voice. Examples of such CODECs include (i) Pulse Code Modulation (PCM), (ii) Adaptive Differential Pulse Code Modulation (ADPCM), (iii) Code-Excited Linear Predictive (CELP), (iv) Adaptive Code-Excited Linear Predictive (ACELP), (v) Relaxed Code-Excited Linear Predictive (RCELP), (vi) Selective Mode Vocoder (SMV), (vii) Linear Predictive Coding (LPC), (viii) Sinusoidal Transform Coder (STC), (ix) Improved Multiband Excitation (IMBE), (x) CDMA Qualcomm Code-Excited Linear Predictive (QCELP), (xi) CDMA[4]2000-SMV, (xii) Adaptive Multirate GSM (AMR-GSM), (xiii) Federal Standard 1017, (xiv) IS-54, (xv) IS-641, and/or other CODEC, such as those found in ITU-T CODECS, G.711, G.723, G.726, G.728, G.729.

Column 13, lines 25-37:

In one embodiment, one or more of network devices may be configured as act [as] *to* an application server by distributing one or more of the application programs 62 among the network devices. In another embodiment, a single network device may be the application server. Examples of such application servers include SIP servers, H.323 servers, AAA servers, DNS servers, VoIP servers, and/or any other type server. In such an embodiment, network devices may include only an application program layer (e.g., SIP) that communicates with an application program (e.g., SIP) running on the stand-alone application server to provide application functionality. Other or equivalent embodiments may be used as well.

Column 13, lines 40-55:

Mobile IP allows "mobile" nodes to transparently move between different IP sub-networks. Mobile IP allows a mobile node to dynamically change its network connectivity in a manner that is transparent to protocol layers above the network layer 46 (e.g., TCP 56 or UDP 58). In an exemplary embodiment, support for Mobile IP [application programs 62] *program* or Mobile IP [application layers] *layer* is included in the IP 48 layer.

FIG. 3 is a block diagram illustrating an exemplary Mobile IP system 64. The Mobile IP system 64 [includes] *may include* one or more "non-mobile" network devices 66, 68, 70, 72, 74, 76, and a mobile node 78. Hereinafter the mobile node 78 is called "mobile node 78." The Mobile IP System 64, however, may include hundreds or thousands of mobile nodes. More or fewer non-mobile network devices and more mobile nodes may be used as well.

Columns 13-14, lines 53-65:

When mobile node 78 "roams" 84 from its home subnet 80, it periodically transmits Mobile IP "agent solicitation" messages to foreign agents, such as foreign agent ("FA") 86 [via external network 82]. The FA 86 is foreign with respect to home subnet 80 and resides on a foreign subnet 88 [along with] *and may include* one or more foreign non-mobile network devices such as non-mobile network device 90 and 92. The foreign subnet 88 may also include one or more mobile nodes (not illustrated). Like the HA 76, the FA 86 provides a gateway router function for the foreign subnet 88. The foreign non-mobile network devices 90 and 92 are assigned network addresses, such as IP 48 addresses, on the foreign subnet 88.

In addition to transmitting "agent solicitation" messages while roaming, mobile node 78 listens for Mobile IP "agent advertisement" messages from foreign agents, [such as] *such* as FA 86. When roaming, mobile node 78 receives an agent advertisement message from FA 86 indicating that it is now on a foreign subnet 88. At some point, the mobile [nodes] *node* 78 registers with the FA 86 and the HA 76. By registering with the HA 76, the mobile node 78 notifies the HA 76 that it has roamed 84 away from its home subnet 80.

On home subnet 80, mobile node 78 has a network address, such as IP 48 address 11.0.0.4[.], and the HA 76 has a network address, such as IP 48 address 11.0.0.7. Mobile and non-mobile network devices having network addresses beginning with a network access prefix of 11.0.0 and a prefix length of 24 bits (i.e., 11.0.0.X/24) belong to home subnet 80. Since the HA 76 is advertising a route to the home subnet 80 at 11.0.0.X/24, it will accept data packets from external network 82 for network addresses with the network access prefix 11.0.0.X/124. For example, the HA 76 may accept data packets for the mobile node 78, given that the home network address of the mobile node 78 is of 11.0.0.4.

The FA 86, on the other hand, has a network address of 12.0.0.4 on the foreign subnet 88. The FA 86 advertises a route to the foreign subnet 88 with network access prefix length of 12.0.0.Y/24. Thus, FA 86 will accept data packets that have a network address of 12.0.0.Y/24 on the foreign subnet 88. For example, the FA 86 will accept data packets for the non-mobile network devices 90 and 92 having a network address of 12.0.0.1. and 12.0.0.2[.], respectively.

The mobile node 78 uses its home network address of 11.0.0.4 on the home subnet 80 to register with the FA 86 and the HA 76. After registration of the mobile node 78, the FA 86 will also accept data packets for the mobile node 78 at the specific home network address 11.0.0.4 as well as data packets that have a network prefix of 12.0.0/2.

4. Third Generation Mobile Architecture

Third-generation ("3G") [architecture, supports] *architectures supports* data rates ranging from about 114K bits-per-second to about 2M bits-per-second[.] ("bps") packet switched services. As noted above, 3G networks encompass a range of wireless technologies including Code Division Multiple Access ("CDMA"), Universal Mobile Telecommunications Service ("UMTS") Wide-band CDMA ("WCDMA"), and others.

Column 15, line 8-35:

FIG. 4 is a block diagram illustrating an exemplary 3G system 108. The exemplary 3G system 108 includes a foreign gateway network 110, a foreign services network 112, a foreign DNS application 114, a foreign SIP application 116 and a foreign AAA application 118. The exemplary 3G system 108 also includes a home DNS application 120, a home SIP application 122, a home AAA application 124, a tunnel server ("TS") 126 and a [correspondence] *correspondent* node ("CN") 128. Other embodiments having more, fewer or other components may also be used in 3G system 108.

The home DNS application 120, home SIP application 122, home AAA application 124, tunnel server 126 and [correspondence] *correspondent* node 128 are illustrated as separate components. In other embodiments, all or selected ones of these components may be combined into a single or smaller number of components. For example, some of the other components may be integrated into HA 76.

The foreign gateway network 110 and foreign services network 112 are illustrated as separate from foreign network 88. The foreign gateway network 110 may include an IP 48 network or other network, the foreign services network 112 may include (i) an IP 48 network, (ii) a Public Switched Telephone Network ("PSTN"), (iii) a packet data serving node ("PDSN"), and/or ([iii] *iv*) other network or network device. In one embodiment, the FA 86 is associated with a PDSN. Other types of foreign agents may be used. Further, the foreign gateway network 110 and the foreign services network 112 may all be integral to foreign network 88.

Column 15, lines 44-54:

[Generally,] *While* a PDSN is *sometimes* a required component in [most, but not all] 3G networks 108, *it is not always required*. For mobile node 78, a PDSN is the point of entry into the wireless packet data network. The PDSN performs two basic functions: (1) it exchanges packets with mobile node 78 over a wireless network; and (2) it exchanges packets with other IP 48 networks. The PDSN uses associated AAA servers for user authentication and traffic management. Further, the PDSN forwards traffic to a gateway router/home agent (GR/HA) at the designated IP network. Other network access devices or servers may carry out the functionality of a PDSN[,] as well.

Columns 15-16, lines 8-60:

The exemplary 3G system 108 also includes a virtual tunnel 130, a default communications path 132, a new communications path 134[,] and a tunnel server communications path 136. The default communications path 132 includes a communications path from the foreign services applications 114, 116, 118 on a foreign network to the HA 76 on the home network 80 to the FA 86 on the foreign network 88, and on to the mobile node 78 on the foreign network 88. The new communications path 134 includes a communications path from the foreign services applications 114, 116, 118 to the tunnel server 126 on a foreign network to the FA 86, and on to the mobile node 78 on the foreign network 88. The tunnel-server-communications path 136 includes a communications path or a reverse communications *path* between the foreign service applications 114, 116, 118 and the tunnel server 126.

Columns 16-17, lines 7-20:

In one embodiment, the exemplary 3G system 108 includes an all IP 48 network comprising of an IP 48 radio access network ("IP-RAN"), a PDSN, a PCF and an IP Mobility Core Network 82. Other embodiments with more or fewer components may also be used. These exemplary networks may support 2G, 2.5G and 3G wireless interface technologies including Code Division Multiple Access 95 and 2000 ("CDMA95" and "CDMA2000"), Global System for Mobile Communications, ("GSM"), [Generic] *General* Packet Radio Services ("GPRS"), Personal Communications Services ("PCS"), a Cellular Digital Packet Data ("CDPD"), Wireless Application Protocol ("WAP"), Digital Audio Broadcasting ("DAB"), Bluetooth, 802.11a, Wireless LAN, Wifi/802.1b, or other types of wireless network interfaces. These multigenerational wireless interface technologies support telephony, Short Message Services ("SMS"), paging, voice mail, call forwarding, faxing, caller ID, Internet access, and e-mail, to name a few of the services available.

[4] 5. Mobile Node Communication in a Data Network

FIG. 5 is a block diagram illustrating an exemplary portion 150 of the data network 108, which provides support for communication between wireless mobile node 78 and the data network 108. The portion includes the wireless mobile node 78, a first radio access network ("RAN[1]*1*") 151, a first-network-access device 152, a first gateway 153, a second radio access network ("RAN2") 154, a second-network-[access] *access* device 155, a second gateway 156, a home network 157, and a broker network 158.

Although FIG. 5 shows only two RANs, i.e., RAN[1]*1* 151 and RAN2 154, the portion 150 of the data network 108 typically includes a large number of RANs. Moreover, although FIG. 5 shows only two network-access devices, i.e., first-network-access device 152, and second-network-access device 155, more, or less network- [network-] access devices may be included in portion 150.

The wireless mobile node 78 is communicatively coupled with the RAN[1]*1* 151 via an air interface. Communications transmitted across the air interface conform to an air interface protocol of the wireless communication format. The RAN[1]*1* 151 in turn may be communicatively coupled to the first-*network*-access[-control] device 152. Communications transmitted across the interface connecting the RAN[1] *1* 151 and first-network-access device 152 may be transmitted according a protocol, such as IS-2001 A10/A11 or other wireless communication formats.

RAN*1* 151 may also provide packet data signaling. This packet data signaling may *be* separated from the data using two logical channels, such as an A10 channel for data and A11 channel for signaling. The A11 signaling may be based on Mobile IP messages or other signaling system messages. Data from the wireless mobile node 78 may be encapsulated in GRE packets and tunneled to the first-network-access device *152* over the A10 channel, where it is un-encapsulated and processed further.

Columns 17-18, lines 57-60:

The first-network-access [control] device 152 is in communication with second-network-access device 155. Communications passed between first-network-access [control] device 152 and the second-network-access device [153] 155 may be sent and received according to an inter-network-access-device protocol. Communications over this link may be passed according to other transmission protocols as well.

[5] 6. Support for Prepaid Billing for Wireless Mobile Nodes on a Data Network

FIG. 6 is a flow diagram illustrating a method 200 for providing hand-offs for wireless prepaid services on network portion 150 of data network 108 using prepaid billing in accordance with an exemplary embodiment. In FIG. 6, at step 210, the first-network-access device [151] 152, requests network access from the H-NACD 162, to establish connectivity for a wireless communication session for mobile node [98] 78 within the coverage area of the first-network-access device [151] 152. At step 212, the [HNACD] H-NACD 162 receives the request for network access from the first-network-access device [151] 152, and in response, determines if the wireless communication session is eligible for wireless prepaid services.

If eligible, at step 214, the H-NACD 162 sends to the first-network-access device [151] 152 authorization or other approval for serving wireless prepaid services to the mobile [NODE] node 78 device for the wireless communication session. In addition, at step 216, the H-NACD 162 sends to the first-network-access device [151] 152 a first block of credits, withdrawn from a user account having a cache of available credits.

The size of the first block of credits and any other block of credits sent from the network-access-control device may vary. For example, the block of credits may contain fractional credits, whole credits, or some combination of the [factional] fractional and whole credits. Moreover, the number of credits may vary from block to block. In one instance, the H-NACD 162 may send (as the first block of credits) a block of credits containing a plurality of whole credits. In another instance, the H-NACD 162 may send (as the first block[)] of credits) a block of credits containing only a fraction of a credit.

The H-NACD 162 may vary the size of the blocks of credits based on a supply of available credits contained in a cache of available credits. Alternatively, the H-NACD 162 may vary the size of the blocks of credits based on the type of session activity for the wireless communication session. For example, voice content may use one block size, while non-voice data may use another block size. Other conditions may cause the H-NACD 162 [may] to vary the size of the blocks of credits as well.

At step 218, the first-network-access device [151] 152 receives the authorization or other approval for network access for the wireless communication session. And in addition to receiving the authorization or other approval, at step 220, the first-network-access device [151] 152 receives from the H-NACD 162 the first block of credits After receiving authorization for the wireless communication session, the network-access device [151] 152, at step 222, establishes session activity for the wireless communication session. In an exemplary embodiment, the first-network-access device [151] 152 is in the path of the wireless communication session. Being in the path of the wireless communication session allows the first-network access device [151] 152 to directly monitor the usage of the wireless prepaid service used by the wireless communication session. The first-network-access device [151] 152, however, need not be in the path of the wireless communication session. In such case, the first-network-access device [151] 152 indirectly monitors the usage of the wireless communication session. For example, the first-network-access device [151] 152 may receive the usage of the wireless communication session from another network-access device (e.g., another PDSN).

Columns 19-20, lines 1-44:

In an alternative embodiment, the network-access device may contain its own predetermined-measurement-method parameters. In such case, the [network-access control device 151] H-NACD 162 might not send the measurement-method parameters. However, despite having the predetermined-measurement-method parameters, the H-NACD 162 may still send the measurement-method parameters to the first-network-access device [151] 152. Doing so, leaves open the option of changing the measurement methods for determining usage of a prepaid wireless communication session.

The measurement-method parameters passed to the first-network-access device [151] 152 from the H-NACD 162 may include an indication for determining which of the plurality of predetermined-measurement methods the first-network-access device [151] 152 should select for determining the usage units for the wireless communication session. For instance, the measurement-method parameters may include one or more bits, bytes, pointers, algorithms, instructions, and/or other indicators that the network-access device may use for selecting one or more of the plurality of predetermined-measurement methods. Each of the plurality of predetermined-measurement methods may include methods for measuring the session activity of the wireless communication session in terms of time used, time connected, bytes received, bytes transmitted, packets received, packets transmitted, and/or any other measurement method for wireless communication services.

In another alternative, the measurement-method parameters passed to the first-network-access device [151] 152 from the H-NACD 162 may include an algorithm, conversion factor, and/or other instruction for determining the usage units for the wireless communication session. Similar to the plurality of predetermined-measurement methods contained within first-network-access device [151] 152, these measurement-method parameters may provide the first-network-access device [151] 152 with one or more methods for measuring the session activity of the wireless communication session. The methods for measuring the session activity may be in terms of the time used, the time connected, the number of bytes received, the number of bytes transmitted, the number of packets received, the number of packets transmitted, and/or any other measurement method for wireless communication services.

For example, the first-network-access device [151] 152 may receive from the H-NACD 162 as one of the measurement-method parameters an algorithm that applies different usage units to the session activity of the wireless communication session depending on the type of data being passed. By processing the algorithm, the first-network-access device [151] 152 may use a first type of usage units for a first type of data, a second type of usage unit for a second type of data, and $n^{th}$ type usage unit for an $n^{th}$ type of data (where n is any integer) for the data being passed in the wireless communication session.

At step 228, the mobile node 78 roams or otherwise moves into the coverage area of a second-network-access device 155, which in turn establishes connectivity with the mobile node 78. In response to moving into the coverage area of the second-network access device 155, the first-network-access device [151] *152*, at step 230, tunnels the session activity to the second-network-access device 155.

At step 232, the first-network-access device [151] *152* periodically measures the usage of the session activity for the wireless communication session. Periodically measuring usage of the session activity may include the first-network-access device [151] *152* measuring the usage of the session activity while in the first coverage area in terms of a first of the measurement-method parameters. Alternatively, periodically measuring the usage of the session activity may include the first-network-access device [151] *152* measuring the usage of the session activity tunneled to the second-network-access device 155 in terms of a second of the measurement-method parameters.

In one embodiment, the first of the measurement-method parameters and the second of the measurement-method parameters are the same. These measurement-method parameters, however, may vary. For instance, the second-network-access device might not belong to the home network 157 of the mobile node 78. In such case, *the* second-network-access device 155 may be part of the broker network 158. In this broker network 158, the broker network policies may determine which of the measurement-method parameters to use for the session activity. These measurement-method parameters may be multiples of the measurement-method parameters used for the session activity in the first coverage area. For instance, the measurement-method parameters for the session activity on the broker network 158 may be used to measure usage at twice the rate of the session activity in the first coverage area. This scalability allows for continued connectivity of the session activity when the mobile node 78 roams into areas not covered by the mobile node's 78 home network.

At step 234, the first-network-access device [151] *152* debits the usage of the session activity for the wireless communication from the first block of credits. The first-network-access [151] *152* device may debit the usage of the session activity from the first block of credits for the session activity occurring in the first coverage area and for the session activity that the first-network-access device tunnels to the second-network-access device 155.

Columns 20-21, lines 55-64:

At step 250, the first-network-access device [151] *152* sends to the H-NACD 162 a request for an additional block of credits. The first-network-access device [151] *152* may make the request at a predetermined threshold, for example, when a predetermined number of the credits remain in the block of credits. The first-network-access device [151] *152* may make the request for additional credits proactively. That is, the first-network-access device [151] *152* may make the request at any time before depletion of the block of credits. Alternatively, the first-network-access device [151] *152* may make the request for additional credits when [the] no credits remain in the block. In another alternative, the first-network-access device [151] *152* may make the request for additional credits based on an algorithm that insures that as long as available credits remain, it will receive additional blocks of credits. Other algorithms are possible, as well.

The H-NACD 162, at step 252, receives from the first-network-access device [151] *152* the request for the second or additional block of credits. At step 254, the H-NACD 162 determines if enough credits remain in the cache of available credits to withdraw the requested additional block of credits. If available credits remain, at step 256, the H-NACD 162 fulfills the request by sending to the first-network-access device the additional block of credits.

At step 258, the first-network-access device [151] *152* receives from the H-NACD 162 the additional block of credits. [At step 260, the first-network-access device 151 debits the usage of the session activity for the wireless communication session from the additional block of credits. In an exemplary embodiment, the first-network-access device 151 is in the path of the wireless communication session. Because the network-access device 151 may be in the path of the wireless communication session, it may directly measure the usage of the wireless prepaid service used by the wireless communication session.]

At step 262, H-NACD 162 may also send to the first-network-access device [151] *152* one or more measurement-method parameters. These measurement-method parameters may vary from the measurement-method parameters sent to the first-network-access device [151] *152* in conjunction with the first block of credits. In an exemplary embodiment, the measurement-method parameters are local-measurement-method parameters. Alternatively, the measurement-method parameters sent to the first-network-access device may be global-measurement-method parameters.

Step 262 may be omitted if, for example, the H-NACD 162 sent to the first-network-access device [151] *152* the global-measurement-method parameters in conjunction with [the] sending the first block of credits, and the measurement-method parameters for the additional block of credits are also global-measurement-method parameters. In yet another alternative, step 262 may be omitted if, for example, the first-network-access-device [151] *152* contains a plurality of its predetermined-measurement methods, and the H-NACD 162 has already selected one of a plurality of its predetermined-measurement methods for determining usage units for the wireless communication session. Step 262 may be omitted for various other reasons as well.

At step 264, the first-network-access device [151] *152* may receive from the H-NACD 162 the measurement-method parameters. As noted above, the measurement-method parameters may be either local-measurement-method parameters or global-measurement-method parameters. Depending on the type of measurement-method parameters received, the method by which the network-access device determines the usage units for the session activity may vary.

In the local-measurement-method parameter case, the measurement-method parameters may differ from the measurement-method parameters received by the first-network-access device [151] *152* in conjunction with receiving the first block of credits. The difference between the measurement-method parameters received in step 226 (FIG. 6) and those received in step 264 may include different algorithms, conversion factors, and/or other instructions for determining the usage units for the wireless communication session.

Column 22, lines 9-45:

Alternatively, at block 266, in response to receiving one or more measurement- method parameters, the first-network-access device [151] *152* may select one of a plurality of its predetermined-measurement methods for determining usage units for the wireless communication session. Paralleling step 226, the measurement-method parameters passed to the first-network-access device [151] *152* from the H-NACD 162 may include an indication for determining which of the plurality of predetermined-measurement methods that the first-network-access device [151] *152* should select for determining the usage units for the wireless communication session. These indications may include one or more bits, bytes, pointers, algorithms, instructions, and/or other indicators that the first-network-access device [151] *152* may use in selecting a particular (e.g., the first) predetermined-measurement methods.

The global-measurement-method parameter case is similar to the local-measurement-method parameter case except that the measurement-method parameters passed to the first-network-access device [151] *152* from H-NACD 162 in conjunction with the additional block of credits do not differ from those passed in conjunction with the first block of credits. Step 266 might be omitted if the measurement-method parameters are global-measurement-method parameters.

At step 268, the first-network-access device [151] *152* periodically measures usage of the session activity. This may include [the] measuring the usage of the session activity while in the first coverage area in terms of a first of the measurement-method parameters and measuring the usage of the session activity tunneled to the second-network-access device 155 in terms of a second of the measurement-method parameters. In one embodiment, the first of the measurement-method parameters and the second of the measurement-method parameters may be the same. These measurement-method parameters, however, may vary.

*At step 260, the first-network-access device 152 debits the usage of the session activity for the wireless communication session from the additional block of credits. In an exemplary embodiment, the first-network-access device 152 is in the path of the wireless communication session. Because the network-access device 152 may be in the path of the wireless communication session, it may directly measure the usage of the wireless prepaid service used by the wireless communication session.*

Column 22, lines 50-67:

FIGS. 8*a*, 8b, and 8c are flow diagrams illustrating a method 300 for providing hand-offs for wireless prepaid services on network portion 150 *of* data network 108 using prepaid billing in accordance with another exemplary embodiment. FIGS. 8*a*, 8b, and 8c show exemplary method 300, which is similar to exemplary method 200, except as described herein.

In FIG. 8*a*, at step 302, the first-network-access device [151] *152* engages in session activity for a wireless communication session with the mobile node 78 within the first coverage area. At some point, (e.g., during registration with the H-NACD 162) the first-network-access device [151] *152* receives from the H-NACD 162 a first block of credits, as illustrated in step 304. At step 306, the first-network-access device [151] *152* may thereafter periodically [measures] *measure* usage of the session activity. In turn, at step 308, the first-network-access device [151] *152* debits the usage of the session activity from the first block of credits.

Column 23, lines 12-31:

At step 312, the H-NACD 162 receives the request for network access from the second-network-access device 155, and in response, determines if the wireless communication session is eligible for wireless prepaid services. The H-NACD 162 may determine whether the session activity is a new communication or whether the request for network access is a hand-off of the ongoing session activity originally carried by the first-network-access device [151] *152*.

Alternatively, the second-network-access device [151] *155* may send to the H-NACD 162 information indicative of the session activity. This information may contain indications that inform the H-NACD 162 that the session activity is either session activity for a new communication or the session activity that is handed-off. Details for an exemplary hand-off mechanism for informing the H-NACD 162 are provided by the commonly assigned, and co-pending U.S. application Ser. No. 10/097796, filed on Mar. 14, 2002, and titled "Method and System for Re-Direction and Hand-off for Pre-Paid Mobile Services in Third Generation Networks."

Column 23, lines 38-43:

At step 318, the H-NACD 162 may also send to the second-network-access device 155 measurement-method parameters in conjunction with *the* second block of credits. These measurement-method parameters may be local-measurement-method parameters or may be global-measurement-method parameters.

Column 23-24, line 3-60:

The measurement-method parameters passed to the second-network-access device 155 from H-NACD 162 may include an indication for determining which of the plurality of predetermined-measurement methods the second-network-access device 155 should select for determining the usage units for the wireless communication session. In one exemplary embodiment, the measurement-method parameters may include one or more bits, bytes, pointers, algorithms, instructions, and/or other indicators that the second-network-access device may use for selecting one of the plurality *of* predetermined-measurement methods.

Column 24, lines 10-25:

In another alternative, the measurement-method parameters passed to the second-network-access device 155 may include an algorithm, conversion factor, and/or other instruction for determining the usage units for the wireless communication session. Similar to the plurality of predetermined-measurement methods contained within first-network-access device *152*, these measurement-method parameters may provide the second-network-access device 155 with one or more methods for measuring the session activity of the wireless communication session. These methods may be in terms of the time used, the time connected, the number of bytes received, the number of bytes transmitted, the number of packets received, the number of packets transmitted, and/or any other measurement method for wireless communication services.

Columns 24-25, lines 37-61:

The second-network-access device 155 may use different measurement-method parameters than those used or received by the first-network-access device [151] *152* before the session activity is handed-off. The second-network-access device 155, however, may use the same measurement-method parameters. As noted above, the second-network-access device 155 might not belong to the home network 157 of the wireless mobile node. In such case, the second-network-access device 155 can be part of a broker network 158. The broker network policies may determine which of the measurement-method parameters to use for the handed-off session activity. These measurement-method parameters may be multiples of the measurement-method parameters used for the session activity in the first coverage area. At step 328, the second-network-access device 155 debits the usage of the session activity from the second block of credits.

Referring to FIG. 8*b*, at some time after the second-network-access device 155 establishes the session activity for the wireless communication session, the H-NACD 162, at 330, sends to the first-network-access device [151] *152* a first indication that will cause[s] the first-network-access device [151] *152* to stop debiting the usage of the session activity. At 332, the first-network-access device [155] *152* receives from the H-NACD 162 the first indication. In response, at 334, the first-network-access device [151] *152* stops debiting the usage of the session activity from the first block of credits. This first indication may include a stop accounting message, a terminate session activity message, a disconnect message or another type of message.

In addition to the sending to the first-network-access device [151] *152* the first indication, after the second-network-access device 155 establishes the session activity, H-NACD 162, at step 336, sends to the first-network-access device [151] *152* a second indication that causes the first-network-access device [151] *152* to return any remaining credits to the H-NACD 162. The first-network-access device [151] *152*, at step 338, receives this second indication, and at step 340, returns any remaining credits to the H-NACD 162. This second indication may include a stop accounting message, a terminate session activity message, a disconnect message or another type of message.

In another alternative, at step 342, after the second-network-access device 155 establishes the session activity for the wireless communication session, the H-NACD 162 sends to the first-network-access device [151] *152* a third indication that causes the first-network-access device [151] *152* to transfer any remaining credits to the second-network-access device 155 or other network-access device. At step 344, the first-network-access device [151] *152* receives from the H-NACD 162 this [second] *third* indication. At step 346, the first-network-access device [151] *152* transfers any remaining credits to the second-network-access device 155 or other network-access device. The second-network-access device 155 or other network-access device may debit the usage of session activity of the wireless communication session or other eligible wireless communication session from these transferred credits.

Referring to FIG. 8*c*, in yet another alternative, the first-network-access device [151] *152*, at step 348, requests an additional block of credits after the second-network- access device 155 establishes the session activity for the wireless communication session. The first-network-access device [151] *152* may make the request after transferring the remaining credits to the second-network-access device 155. Alternatively, the first-network-access device [151] *152* may make the request at a predetermined threshold.

At step 350, in response to receiving the request for *an* additional block of credits, the H-NACD 162 sends to the first-network-access device [151] *152* an indication that will cause the first-network-access device [151] *152* to stop debiting the usage of the session activity from the first block of credits. The first-network-access device [151] *152*, at step 352, receives from the H-NACD 162 this indication. Responsive to receiving the indication, the first-network-access device [151] *152* stops debiting the usage of the session activity from the first block of credits. At step 354, the first-network-access device [151] *152* returns any unused credits to the H-NACD 162.

In another alternative, at step 358, in response to receiving the request for *an* additional block of credits, the H-NACD 162 does not send a response to the request. At step 360, upon not receiving a [responsive] *response*, the session activity on the first-network-access device [151] *152* terminates when the remaining credits expire. In another alternative, upon not receiving a response to the request for additional credits, the first-network-access device[, 151] *152* at step 362 may stop debiting the usage of the session activity from the first block of credits. And at step 364, the first-network-access device [151] *152* (i) may return any remaining credits to the network-access-control device, (ii) may send any remaining credits to the second-network-access device 155, and/or (iii) may send to [the] another network-access device any remaining credits.

Column 26, lines 6-16:

Referring back to FIG. 7, at step 250, the second-network-access device 155 may request from the H-NACD 162 an additional block of credits after hand-off *of* the session activity. The second-network-access device *155* may make the request at a predetermined threshold. Further, the second-network-access device 155 may make the request (i) proactively, i.e., at any time before depletion of the block of credits; (ii) when [the] no credits remain in the block; (iii) based on an algorithm that [insures] *ensures* that as long as available credits remain, the second-network-access device *155* will receive additional blocks of credits; and/or (iv) based on other algorithms.

Column 26, lines 31-40:

At step 262, the H-NACD 162 may also send to the second-network-access device 155 one or more measurement-method parameters. These measurement-method parameters may vary from the measurement-method parameters sent to the first-network-access device [151] *152* in conjunction with the first block of credits, and those sent to the second-network-access device in conjunction with the second block of credits. The measurement-method parameters may be local-measurement-method parameters or may be global-measurement-method parameters.

Column 27, lines 15-37:

Referring to FIG. 9, at step 402, the first-network-access device [151] *152* engages in session activity of a wireless communication session with mobile node 78 within a first coverage area. At step 404, after granting network access for the session activity, [a] *an* H-NACD 162 sends to the first-network-access device [151] *152* a first block of credits. At step, 406, first-network-access device [151] *152* receives from the H-NACD 162 the first block of credits. The first-network-access device [151] *152* periodically measures usage of the session activity at step 408. The first-network-access device [151] *152* then debits the usage of the session activity from the first block of credits at step 410.

At some point, the mobile node 78 roams or moves into a second coverage area, and at step 412, the second-network-access device 155 establishes connectivity with the mobile node 78. In response to *the mobile node 78* roaming into the coverage area of the second-network access device 155, at step 414, the first-network-access device [155] *152* tunnels the session activity and unused credits to the second-network-access device 155. Then, the second-network-access device 155 debits the usage of the tunneled session activity from the tunneled unused credits at step 416.

Column 27, lines 47-54:

At step 420, the H-NACD 162 receives the request for network access from the second-network-access device 155, and in response, determines if the wireless communication session is eligible for wireless prepaid services. The *H-NACD* 162 may determine whether the session activity is a new communication or whether the network access is a hand-off of the ongoing session activity originally carried by the first-network-access device [151] *152*.

Columns 27-28, lines 8-62:

After determining that the wireless communication session is eligible for wireless prepaid services, at step 422, the H-NACD 162 sends to the second-network-access[- control] device 155 a second block of credits. At step 424, the second-network-access device 155 receives the second block of credits.

At step 426, the H-NACD 162 may also send to the second-network-access device 155 one or more measurement-method parameters. These measurement-method parameters may vary from the measurement-method parameters sent to the first-network-access device [151] *152* in conjunction with the first block of credits, and may be local-measurement-method parameters or may be global-measurement-method parameters.

Columns 28-29, lines 35-36:

At step 430, the second-network-access device 155 provides independent network access for the session activity. At step [430] *432*, the second-network-access device 155 periodically measures usage of the session activity. This may include measuring the usage of the handed-off session activity in terms of a [third] *second* of the measurement-method parameters. These measurement-method parameters may be, but need not be, different from those received in conjunction with the first-block of credits. At step 434, the second-network-access device 155 debits the usage of the handed-off session activity from the second block of credits.

After the second-network-access device 155 establishes independent network access, the H-NACD 162, at step 436, may send to the first-network-access device [151] *152* an indication [that it] to stop debiting the usage of the session activity from the first block of credits, if any credits remain. The H-NACD 162 may send the indication in response to determining that the session activity now carried by the second-network-access device 155 results from a hand-off. At step 438, the first-network-access device [151] *152* receives from the H-NACD 162 the first indication, and stops debiting the usage of the session activity from the first block of credits. This indication may be a stop accounting message, a terminate session activity message, a disconnect message or another type of message. In addition to the sending to the first-network-access device [151] *152* the first indication and after the second-network-access device 155 establishes the session activity, the H-NACD 162, at step 440, sends to the first-network-access device [151] *152* a second indication that causes [the] it to return any remaining credits. The first-network-access device [151] *152*, at step 442, receives the second indication, and returns any remaining credits to the H-NACD 162. This second indication may include a stop accounting message, a terminate session activity message, a disconnect message or another type of message.

Referring back to FIG. 8*c*, at step 348, the first-network-access device [151] *152* requests an additional block of credits after the second-network-access device 155 establishes the session activity for the wireless communication session. The first-network-access device [151] *152* may make the request after transferring the remaining [credit] *credits* to the second-network-access device *155*. Alternatively, the first-network-access device [151] *152* may make the request at a predetermined threshold.

At step 350, in response to receiving the request for additional block of credits, the H-NACD 162 sends to the first-network-access device [151] *152* an indication that will cause it to stop debiting the usage of the session activity from the first block of credits. The first-network-access device [151] *152*, at step 352, receives this indication. [Responsive] *In response* to receiving the indication, the first-network-access device [151] *152* stops debiting the usage of the session activity from the first block of credits. At step 354, the first-network-access device*152* to returns any remaining credits to the H-NACD 162.

In another alternative, at step 358, in response to receiving the request for additional block of credits, the H-NACD 162 sends no response to the request. At step 360, upon not receiving a [responsive indication] *response* to the request, the session activity on the first-network-access device [151] *152* terminates when the remaining credits expire. In another alternative, upon not receiving a response to the request for additional credits, the first-network-access device [151] *152*, at step 362, may stop debiting the usage of the session activity from the first block of credits. And at step 364, the first-network-access device *152* (i) may return any remaining credits, (ii) may send any remaining credits to the second-network-access device 155, and/or (iii) may send to another network-access device any remaining credits.

Column 30, lines 4-14:

[6]*7*. Mobile Node Communication in A 3G Network

FIG. 10 is a block diagram illustrating an exemplary portion 170 of the 3G network 108, which provides support for communication between wireless mobile node 78 and the 3G network 108. The portion 170 includes a wireless mobile node 78, a base station ("BTS") 172, base station controllers ("BSC") 171 and 173, a PCF 174, a radio packet interface ("RPI") 176, a source [PSDN] *PDSN* 178, a source gateway 181, a radio access network ("RAN") 183, a foreign PCF/RPI 180, a foreign PDSN 185, a foreign gateway 187, a home network 140, and a broker network 142.

Column 30, lines 23-34:

The wireless mobile node 78 is communicatively coupled with the BTS 172 over an air interface. Communications transmitted across the air interface conform to the air interface protocol [of] for the wireless communication format. For instance, in a CDMA circuit voice session, the protocol may be enhanced variable rate vocoder (EVRC) or IS-127. The BTS 172 in turn may be communicatively coupled to the BSC 173 and/or BSC 171. Communications transmitted across the interface connecting the BTS 172 and BSC 173 or BSC 171 may be transmitted according *to* a protocol such as IS-707 or IS-127. Other protocols are possible as well.

Columns 30-31, lines 13-64:

PDN 193 is in communication with the home network 140. Similar to the Pi interface 189, communications exchanged between the PDN 193 and the home network 140 may use IP, and/or other transmission protocols. The home network 140 may contain HA 76, and a home-network-access-control device (H-NACD) 191. The H-NACD 191 may comprise one or more network-access servers that communicate according to the RADIUS protocol or the DIAMETER protocol. The H-NACD 191, however, may use other protocols. The H-NACD 191 may have access to and/or maintain wireless mobile node 78 packet-data-provisioning information. This packet-data provisioning information may be stored in a user profile record (hereinafter referred to as "user profile") in a data store that is accessible to the H-NACD 191. Further, the H-NACD 191 may authenticate and determine the parameters of a wireless mobile node's 78 packet-data session.

Column 31, lines 39-65:

Broker network 142 is also in communication with the PDN 193. Communications exchanged between the PDN 193 and broker network 142 may use Mobile IP, UDP over IP and/or other transmission protocols. Broker network 142 may contain a broker-home agent 195 and a broker-network-access-control device (B-NACD) 196. The B-NACD 196 may comprise one or more network-access servers that communicate according to the RADIUS protocol or the DIAMETER protocol. The B-NACD 196, however, may use other protocols. Like the H-NACD 191, the B-NACD 196 may have access to and/or maintain wireless mobile node 78 packet-data-provisioning information. Further, the B-NACD [191] *196* may authenticate and [de-terminate] *determine* the parameters of a wireless mobile node's 78 packet-data session.

When roaming into a coverage area of a foreign or visited network 146, the wireless mobile node 78 communicates over an air interface to RAN 183. Communications transmitted over this air interface may conform to an air interface protocol [of] for the wireless communication format, such as EVRC. Other protocols are possible as well.

RAN 183 is also in communication with the foreign PCF/RPI 180. Communications transmitted between RAN 183 and PCF/RPI 180 may be transmitted according to a protocol such as G.711 or other wireless communication format. The [PFC] *PCF*/RPI 180, which provides packet data signaling and packet data transport, provides a link between RAN 183 and PDSN 185.

Columns 32-33, lines 20-45:

[7] *8*. Support for Prepaid Billing for Wireless Mobile Nodes on a Third Generation Network FIG. 11 is a call flow diagram illustrating an exemplary message flow 500 for hand-off of a wireless prepaid call of mobile node 78 roaming on 3G network 108 in accordance with an exemplary embodiment. Referring to FIG. 11, the [PSDN] *PDSN* 178 provides network access, establishes a PPP 45 session, and performs prepaid billing for session activity of the wireless communication session.

In an exemplary embodiment, providing network access and establishing a PPP 45 session may be accomplished by the wireless mobile node 78 initiating a communication session by sending a Traffic Channel ("TCH") setup message 502 to the PCF 174. The PCF 174 sends a All registration request 504 to PDSN 178 on an A11 channel to request registration of the wireless mobile node 78 on network 108. The PDSN 178 responds with a Mobile IP registration response message 506 on an A11 channel. The wireless mobile node 78 begins PPP 45 negotiations 508 with the [H-NACD 191] *PDSN 178* to establish a PPP 45 session 182.

The PDSN 178 sends a RADIUS access-request message 510 for the PPP 45 session 182 over an A11 channel to the H-NACD 191. The H-NACD 191 responds with a RADIUS access-response message 512 that includes a first block of credits, and may include one or more measurement-method parameters. The wireless mobile node 78 successfully negotiates PPP 45 with the [H-NACD 191] *PDSN 178* and establishes the PPP 45 session 182 activity at 514.

Also at 514, after session activity is established, PDSN 178 monitors usage of the PPP 45 session 182 activity and periodically measures the usage in terms of the measurement-method parameters, such as those listed in [table] *Table* 1 above. The PDSN 178 then debits the measured usage from *the* first block of credits. When the number of credits in the block of credits reaches a predetermined threshold, for example, when the PDSN 178 runs out of credits, the PDSN 178 sends to the H-NACD 191 a RADIUS access-request message (not shown) for re-authentication of the PPP 45 session 182 . The H-NACD 191 responds with a RADIUS access-response message (not shown), and an additional block of credits, if enough credits are available. The H-NACD 191 may also send one or more measurement-method parameters.

Column 33, lines 27-39:

At some point the wireless mobile node [1] 78 roams into the coverage area of the PDSN 185. The wireless mobile node 78 initiates a hard hand-off by sending a second TCH setup message 516 to the foreign PCF/RPI 180. The foreign PCF/RPI 180 in turn sends [aa] *an* A11 registration request 518 to PDSN 185 on an A11 channel to request registration of the wireless mobile node 78. The PDSN 185 responds with an A11 registration response message 520 on an A11 channel. The wireless mobile node 78 begins PPP 45 negotiations 522 with the PDSN 185 to establish a PPP 45 session 203. The PDSN 185 sends a RADIUS access-request message 524 for the PPP 45 session 203 over an A11 channel to the H-NACD 191.

Column 33, lines 51-57:

The H-NACD 191 sends to the PDSN 185 a RADIUS access-response message 530 that includes a second block of credits, and may include one or more measurement-method parameters. The wireless mobile node 78 successfully negotiates PPP 45 with the [H-NACD 191] *PDSN 185* and establishes the PPP 45 session 203 activity in the second coverage area at 532.

Columns 33-33, lines 5-66:

In an alternative embodiment, the PDSN 185 may be associated with the broker network 142. In such case, when wireless mobile node [1] 78 roams into the second coverage area instead of the PDSN 185 sending a RADIUS access-request message 524 for the PPP 45 session 203 to the H-NACD 191, the PDSN *185* sends the RADIUS access-request message 524 to the B-NACD 196 (not shown).

Column 34, lines 16-21:

The B-NACD 196 may send to the PDSN 185 a RADIUS access-response message that includes a first block of credits, and may include one or more measurement-method parameters. The wireless mobile node 78 successfully negotiates PPP 45 with the [B-NACD 191] *PDSN 185* and establishes the PPP 45 session activity.

Column 35, lines 1-20:

Various other implementations of handing off a session activity are possible. In the foregoing description [the] (i) [network-access-control device] *the PDSN*, (ii) the H-NACD 191, and/or (iii) the B-NACD 196 may communicate according to the client/server based RADIUS protocol and/or the peer-to peer DIAMETER protocol.

As noted above, the RADIUS AAA protocol may be used for providing authentication, [association] *authorization*, and accounting functionality to wireless packet data networks. Devices that employ the RADIUS AAA protocol are based on client/server architecture. Consequently, the server must wait until a client sends it a request before being able to notify the client of events. In other words, a RADIUS AAA server cannot notify the client of events asynchronously. The DIAMETER protocol enhances many of the features of the RADIUS protocol. One important enhancement is that the DIAMETER protocol supports peer-to-peer architecture. This type of architecture allows one network device to asynchronously notify another network device and initiate an inter-peer communication at any point in time.

Column 35, lines 26-33:

Paralleling portion 170, the portion 169 includes a wireless mobile node 78, a base station ("BTS") 172, base station controllers ("BSC") 171 and 173, a PCF 174, a radio packet interface ("RPI") 176, a source [PSDN] *PDSN* 178, a source gateway 181, a radio access network ("RAN") 183, a foreign PDSN 185, a foreign gateway 187, a home network 140, a HA 76, a home AAA server [191] *209*, a broker network 142, a broker AAA server 201, and PDN 193.

Column 35, lines 34-42:

Portion 169 also includes both a home AAA server (HAAA) [191] *209* and a broker AAA server (BAAA) 201 *that* are configured to carry out communications according to the DIAMETER protocol. Further included in portion 169 are Redirect Server 199, and a second packet data network (S-PDN) 205. The S-PDN 205, like PDN 193, may be the Internet, and/or a public or private intranet/extranet. Thus, the S-PDN 205 may be, but need not be, the same network as PDN 193.

Column 35, lines 43-52:

As described above, HA 76 is in communication with PDN 193. Between these network nodes, communication may be transmitted according to the IP, or any other packet data transmission protocol. HAAA [191] *209* is also in communication with the PDN 193. Communications exchanged between the PDN 193 and the HAAA [191] *209* are sent according to the DIAMETER protocol. Similarly, broker network 142 is in communication with the S-PDN 205 and home network 140. Among these nodes, communications can be exchanged according to the DIAMETER protocol.

Column 35, lines 53-58:

Also shown in FIG. 12 is Redirect server 199 in communication with both PDN 193 and the S-PDN 205. Communication sent over the [Ri] *Pi* interface 207 may be sent according to a protocol that may be based on IP, a variation of IP, Mobile IP, a variation of Mobile IP, and/or other packet data transport protocol.

Column 35, lines 59-67:

When roaming on a foreign or visited network 146, mobile node 78 may be in communication with RAN 183. In turn, the RAN 183 may be in communication with PDSN [178] *185*. PDSN [178] *185* is in communication with the BAAA 201, which in turn may be in communication with a HAAA [191] *209*. Communications between the HAAA [191] *209* and BAAA 201 may be sent according to the DIAMETER protocol, as well as other protocols. Alternatively, the PDSN [178] *185* may communicate directly with the HAAA [191] *209*.

Column 36, lines 4-11:

FIG. 13 is a call flow diagram illustrating an exemplary message flow 600 for P-P hand-off a wireless prepaid call for mobile node 78 roaming on network portion 169 of 3G network 108 using the DIAMETER protocol in accordance with an exemplary embodiment. Referring to FIG. 13, the [PSDN] *PDSN* 178 provides network access, establishes a PPP 45 session, and performs prepaid billing for session activity of the wireless communication session, as shown in 602.

Column 36, lines 12-17:

In an exemplary embodiment, the wireless mobile node 78 begins PPP 45 negotiations with the PDSN 178 to establish a PPP 45 session 182. The PDSN 178 sends to the HAAA [191] *209* a DIAMETER Auth-Request message for the PPP 45 session 182.

Column 36, lines 18-26:

The Auth-Request message sent from the PDSN 178 to the HAAA [191] *209* is used for authenticating and authorizing the PPP 45 session 182, which may use Challenge Handshake Authentication Protocol (CHAP) or Password Authentication Protocol (PAP) for security purposes. If the Auth-Request message is sent to the BAAA 201, it, in turn, will forward the Auth-Request request to the HAAA [191] *209*. The Auth-Request message may contain information to identify the user that is requesting service.

Column 36, lines 27-43:

The HAAA [191] *209* queries the user profile (either locally or in a remote data store), and sends to the PDSN 178 an Auth-Accept message, which contains a first block of credits, and may include one or more measurement-method parameters and/or credit rating information. The measurement-method parameters in the Auth-Accept message may contain user profile information including usage units for subscribed services. For instance, the Auth-Accept message may contain DIAMETER attribute value pairs (AVPs) for (i) indicating that the usage should be applied on some number of bytes of use, (ii) notifying the user (via the wireless mobile 78) of the number of bytes of credit that are available, (iii) notifying the user (via the wireless mobile node 78) of the number bytes that remain, (iv) indicating that the user should be sent to Redirect server 199, and/or (v) notifying the user (via the wireless mobile node 78) that usage updates may be sent at some selected frequency.

Column 36, lines 44-52:

The mobile node 78 successfully negotiates PPP 45 with the [HAAA 191] *PDSN 178* and establishes the PPP 45 session 182 activity. Data may be sent via the Internet and/or any other packet data network. After session activity is established, PDSN 178 monitors usage of the PPP 45 session 182 activity and periodically measures the usage of the PPP 45 session 182 activity in terms of the measurement-method parameters. The PDSN 178 debits the measured usage from the first block of credits.

Column 36, lines 53-63:

At some point, the wireless mobile node [1] 78 roams into the coverage area of the PDSN 185, as shown in 604. After the wireless mobile node 78 sends to the PDSN 185 a registration request, the [PSDN] *PDSN* 185 initiates fast hand-off procedures according to the IS-835 protocol, as shown in 606. The fast hand-off may be carried out by sending a P-P registration request message to the PDSN 178. In response, the PDSN 178 sends a P-P registration reply message to PDSN 185 to confirm the request to tunnel the session activity of the wireless communication session to the PDSN 185. Other PDSN to PDSN protocols may be used as well.

Column 37, lines 11-34:

As shown in 614, the mobile node 78 performs a hard hand-off to the PDSN 185, causing the PDSN 178 to terminate any session activity and return unused credits to the HAAA [191] *209*, so that the unused credits may be returned to the cache of available credits.

Alternatively, the PDSN 178 sends to the PDSN 185 unused credits, if any such credits remain, as shown in 616. In an exemplary embodiment, the PDSN 185 sends a P-P registration request message containing a request for unused credits. In reply, the PDSN 178 may send to the PDSN 185 a P-P registration reply message containing the unused credits. The PDSN 185 debits the measured usage from *the* unused credits and/or the second block of credits At 618, the PDSN 185 may send to HAAA [191] *209* accounting data after hand-off. During a state transition, such as [such as] when the session activity goes from active to dormant state, from an active to inactive state, or any other state transition, the PDSN 185 may effectuate an exemplary hand-off procedure by establishing independent session activity at 618. In an exemplary embodiment, the wireless mobile node 78 begins PPP 45 negotiations with the PDSN 185 to establish a PPP 45 session 203. The PDSN 185 sends to the HAAA [191] *209* a DIAMETER Auth-Request message for the PPP 45 session 203.

Column 37, lines 35-52:

The HAAA [191] *209* queries the user profile (either locally or in a remote data store), and if eligible for wireless prepaid service, the HAAA [191] *209* sends to the PDSN 185 an Auth-Accept message, which may contain a second block of credits, and may include one or more measurement-method parameters or credit rating information. The measurement-method parameters in the Auth-Accept message may contain user profile information including usage units for subscribed services. The Auth-Accept message may contain DIAMETER attribute value pairs (AVPs) for (i) indicating that the usage should be applied on some number of bytes or some measure of time of use, (ii) notifying the user (via the mobile node 78) of the number credits that are available, (iii) notifying the user (via the mobile node 78) of the number bytes or amount of time that remain, (iv) indicating that the user should be sent to redirect server 199, and/or (v) notifying the user (via the mobile node 78) that usage updates may be sent at some selected frequency.

Column 37, lines 53-60:

The mobile node 78 successfully negotiates PPP 45 with the HAAA [191] *209* and establishes the PPP 45 session 203 activity via PDSN 185. Data may be sent via the Internet and/or any other packet data network. After session activity is established, PDSN 185 monitors usage of the PPP 45 session 203 activity and periodically measures the usage of the PPP 45 session 203 activity in terms of the received measurement-method parameters.

Column 37, lines 61-67:

At 620, the HAAA [191] *209* sends a halt indication to the PDSN 178, which causes the PDSN 178 to terminate any monitoring and measuring of the session activity. Further the halt indication may also cause the PDSN 178 to stop debiting any usage of the session activity and return unused credits to the HAAA [191] *209*, so that the unused credits may be returned to the cache of available credits.

Column 38, lines 1-20:

FIG. 14 is a call flow diagram illustrating an exemplary message flow 700 for P-P hand-off a wireless prepaid call for mobile node 78 roaming on network portion 169 *of* 3G network 108 using the DIAMETER protocol in accordance with an exemplary embodiment. FIG. 14 shows the exemplary message flow 700, which is similar to the exemplary message flow 600, except as described herein.

If associated with BAAA 201, the PDSN 185 and the BAAA 201 perform accounting procedures after establishing independent session activity, as shown in 652. These accounting procedures may be performed over a secure link, such as a SSL link, according to the DIAMETER protocol. The accounting procedures, however, may be carried out in other ways. Exemplary accounting procedures may include (i) replenishing used credits, and (ii) purchasing new credits for prepaid services. At 654, the BAAA 201 sends a DIAMETER Auth-Request message [for the] to the HAAA [191] *209* over the secure link. The DIAMETER Auth-Request message may request prepaid billing information from the user profile for the wireless mobile node.

Column 38, lines 21-32:

The HAAA [191]*209* queries the user profile (either locally or in a remote data store), and if eligible for wireless prepaid service, the HAAA [191] *209* sends to the BAAA 201 an Auth-Accept message, which may contain a second block of credits, and may include one or more measurement-method parameters and/or credit rating information. The measurement-method parameters in the Auth-Accept message may contain user profile information including usage units for subscribed services. The Auth-Accept message may contain DIAMETER attribute value pairs (AVPs), as described above.

Column 38, lines 33-63:

Alternatively, the BAAA 201 may act as a proxy to the HAAA [191] *209*, which allows the BAAA 201 to appear as the HAAA [191] *209* to the PDSN 185. Thus, as a proxy, the BAAA 201 allows for replenishing used credits and purchasing new credits for prepaid services by the PDSN 185 as if the BAAA 201 is the HAAA [191] *209*. That is, the BAAA 201 can act with transparency to the PDSN 185, and allows for seamless roaming [in] with accurate measuring of session activity usage. As noted above, exemplary accounting procedures may be found in another U.S. Patent Application filed concurrently with this document, naming the same inventors, and entitled "Prepaid Billing System For Wireless Data Networks."

As shown in 656, the BAAA 201 may use alternative measurement-method parameters for measuring the usage of the session activity. For example, the user profile for the wireless mobile node 78 may contain a subscription to basic wireless prepaid service in which the [measurement-methods] *measurement-method* parameters while carrying on a session activity in home network 140 draws down credits at rate C(h), The basic wireless prepaid service contained in the user profile may require that credit draw-down in a broker network 142 is performed at rate C(v). When a BAAA 201 receives a request for a block of credits from PDSN 185, the BAAA 201 may be provided with or have measurement-method parameters that contain an algorithm that adjusts for difference between C(h) and C(v). For example, the measurement-method parameters may contain an indication that specifies that each credit of the block of credits sent to the PDSN 185 are applied at half the value. Other algorithms may also apply.

THE DRAWING FIGURE HAVE BEEN CHANGED AS FOLLOWS:

On FIGS. 5-7 and 11-14.

AS A RESULT OF REEXAMINATION, IT HAS BEEN DETERMINED THAT:

Claims 1-36, 57 and 59-64 are cancelled.

Claims 37, 42-46, 49, 52 and 54-56 are determined to be patentable as amended.

Claims 38-41, 47, 48, 50, 51, 53 and 58, dependent on an amended claim, are determined to be patentable.

37. A method for providing hand-offs for wireless prepaid services on a data network using prepaid billing, the method comprising:
a first-network-access device carrying on session activity of a wireless communication session with a wireless mobile node within a first coverage area;
the first-network-access device receiving from a network-access-control device a first block of credits;
the first-network-access device periodically measuring usage of the session activity;
the first-network-access device debiting the usage of the session activity from the first block of credits;
a second-network-access device establishing connectivity with the wireless mobile node after the wireless mobile node moves into a second coverage area;
responsive to the second-network-access device establishing connectivity with the wireless mobile node, the first-network-access device *requesting an additional block of credits and* tunneling the session activity and any remaining portion of the first block of credits to the second-network-access device; and
the second-network-access device debiting the usage of the tunneled session activity from the tunneled remaining portion of the first block of credits.

42. The method of claim 38, further comprising the first-network-access device receiving from the network-access-control device *one or more* measurement-method parameters in conjunction with receiving the first block of credits.

43. The method of claim 42, further comprising the second-network-access device receiving from the network-access-control device [the] *one or more* measurement-method parameters in conjunction with receiving the second block of credits.

44. The method of claim 38, further comprising the second-network-access device receiving from the network-access-control device *one or more* measurement-parameters in conjunction with receiving the second block of credits.

45. The method of claim 44, wherein the second-network-access device contains a plurality of predetermined [-] measurement-methods, and further comprising: the second-network-access device selecting one of the predetermined [-] measurement-methods in response to receiving *one or more of* the measurement-method parameters.

46. The method of claim 45, wherein *one or more of* the measurement-method parameters is selected from the group consisting of an algorithm, and a conversion factor.

49. The method of claim 38, further comprising:
the second-network-access device receiving an additional block of credits from the network-access-control device; and the second-network-access device debiting the usage of the wireless communication session from the *the block of credits or* the additional block of credits.

52. The method of claim [19] *51*, further comprising:
the second-network-access device receiving from the network-access-control device *one or more* of the measurement-method parameters in conjunction with the additional block of credits.

54. The method of claim 47, further comprising:
the second-network-access device requesting an additional block of credits; the second-network-access device receiving the additional block of credits from the network-access-control device; and the second-network-access device receiving from the network-access-control device *one or more of* the measurement-method parameters in conjunction with the additional block of credits, wherein the step of the second-network-access device periodically measuring usage of the session activity further comprises:
the second-network-access device measuring the usage of the session activity in terms of a third of the measurement-method parameters.

55. The method of claim 54, further comprising:
the second-network-access device debiting the usage of the wireless communication session from *the block of credits or* the additional block of credits.

56. The method of claim 55, wherein the first of the measurement-method parameters, the second of the measurement-method parameters, and *the* third of the measurement-method parameters are the same.

\* \* \* \* \*